(12) United States Patent
Udagawa et al.

(10) Patent No.: US 6,381,030 B1
(45) Date of Patent: Apr. 30, 2002

(54) IMAGE PROCESSING, COPYING, AND PRINTING APPARATUS HAVING A PART OF A PROCESSING UNIT AND A PART OF ANOTHER UNIT FORMED AS ONE INSEPARABLE UNIT

(75) Inventors: Yutaka Udagawa, Machida; Masahiro Funada, Yokohama; Ken-ich Ohta, Kawasaki; Yoichi Takaragi, Yokohama; Toshiyuki Kitamura, Kawasaki; Eiji Ohta, Fujisawa, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/594,481

(22) Filed: Jun. 14, 2000

Related U.S. Application Data

(62) Division of application No. 08/445,997, filed on May 23, 1995, which is a division of application No. 08/266,270, filed on Jun. 24, 1994, now Pat. No. 5,481,377, which is a division of application No. 07/858,500, filed on Mar. 27, 1992, now Pat. No. 5,363,202.

(30) Foreign Application Priority Data

| Mar. 29, 1991 | (JP) | ............................................. 3-066901 |
| Jul. 1, 1991 | (JP) | ............................................. 3-160379 |
| Jul. 1, 1991 | (JP) | ............................................. 3-160381 |
| Sep. 30, 1991 | (JP) | ............................................. 3-252218 |
| Feb. 28, 1992 | (JP) | ............................................. 4-043896 |

(51) Int. Cl.[7] ........................... G06K 15/02; H04N 1/50; H04N 1/44

(52) U.S. Cl. ..................... 358/1.14; 358/1.15; 358/501; 358/530; 399/366

(58) Field of Search ............................... 358/1.14, 1.15, 358/530, 501, 500, 401, 443, 438, 448, 468, 464, 296; 382/165, 100, 135; 399/366; 283/902

(56) References Cited

U.S. PATENT DOCUMENTS

| 3,997,873 A | 12/1976 | Thornton |
| 4,463,250 A | 7/1984 | McNeight et al. |
| 4,723,149 A | 2/1988 | Harada ........................ 399/366 |

(List continued on next page.)

FOREIGN PATENT DOCUMENTS

| DE | 32 29 616 | 2/1984 | |
| EP | 342 060 | 11/1989 | |
| GB | 2 101 376 | 1/1983 | |
| JP | 54-32322 | 3/1979 | |
| JP | 55-25020 | 2/1980 | .......... G03G/15/00 |
| JP | 59-127186 | 7/1984 | |
| JP | 61-282567 | 12/1986 | |
| JP | 62-167063 | 7/1987 | |
| JP | 63-71034 | 3/1988 | |
| JP | 63-71035 | 3/1988 | |
| JP | 63-127937 | 3/1988 | |
| JP | 64-54760 | 3/1989 | |
| JP | 1-087450 | 6/1989 | |
| JP | 1-245756 | 9/1989 | ............ H04N/1/00 |

(List continued on next page.)

OTHER PUBLICATIONS

"Hitachi–IP/200 High Performance Image Processor", Hitachi Review, vol. 38, No. 4, Tokyo, Japan, pp. 195–204, Aug., 1989.

*Primary Examiner*—Scott Rogers
(74) *Attorney, Agent, or Firm*—Fitzpatrick, Cella, Harper & Scinto

(57) ABSTRACT

An image processing apparatus having a function for detecting a specific original decides the degree of similarity between the image represented by input image signals and the image of a specific original which is not to be allowed to be copied, e.g., currency. The image processing apparatus determines the content of the image processing in accordance with the result of the decision, and processes the input image signals on the basis of the determined content.

26 Claims, 61 Drawing Sheets

U.S. PATENT DOCUMENTS

| | | | |
|---|---|---|---|
| 4,739,377 A | 4/1988 | Allen | 399/366 |
| 4,780,806 A | 10/1988 | Wada et al. | |
| 4,788,575 A | 11/1988 | Ito et al. | |
| 4,908,873 A | 3/1990 | Philibert | 382/100 |
| 4,924,328 A | 5/1990 | Endoh et al. | |
| 5,047,864 A | 9/1991 | Fujito | 358/296 |
| 5,097,348 A | 3/1992 | Suetaka | |
| 5,126,838 A | 6/1992 | Ohsawa et al. | 358/500 |
| 5,165,072 A | 11/1992 | Kurita et al. | 358/448 |
| 5,189,700 A | 2/1993 | Blanford | |
| 5,206,891 A | 4/1993 | Kishimoto | |
| 5,216,724 A | 6/1993 | Suzuki et al. | 382/135 |
| 5,227,871 A | 7/1993 | Funada et al. | 358/500 |
| 5,257,119 A | 10/1993 | Funada et al. | 358/438 |
| 5,321,470 A | 6/1994 | Hasuo et al. | 399/366 |
| 5,424,807 A | 6/1995 | Ohmura | 399/366 |
| 5,430,525 A | 7/1995 | Ohta et al. | 399/366 |
| 5,502,575 A | 3/1996 | Kai et al. | 382/135 |
| 5,621,503 A | 4/1997 | Komaki et al. | 395/366 |
| 5,633,952 A | 5/1997 | Outa et al. | 382/165 |

FOREIGN PATENT DOCUMENTS

| | | | |
|---|---|---|---|
| JP | 1-292965 | 11/1989 | H04N/1/387 |
| JP | 2-69777 | 3/1990 | |
| JP | 2-153673 | 6/1990 | |
| JP | 2-171772 | 7/1990 | G03G/15/00 |
| JP | 2-288468 | 11/1990 | H04N/1/387 |
| JP | 2-310588 | 12/1990 | |
| JP | 5-22568 | 1/1993 | H04N/1/387 |

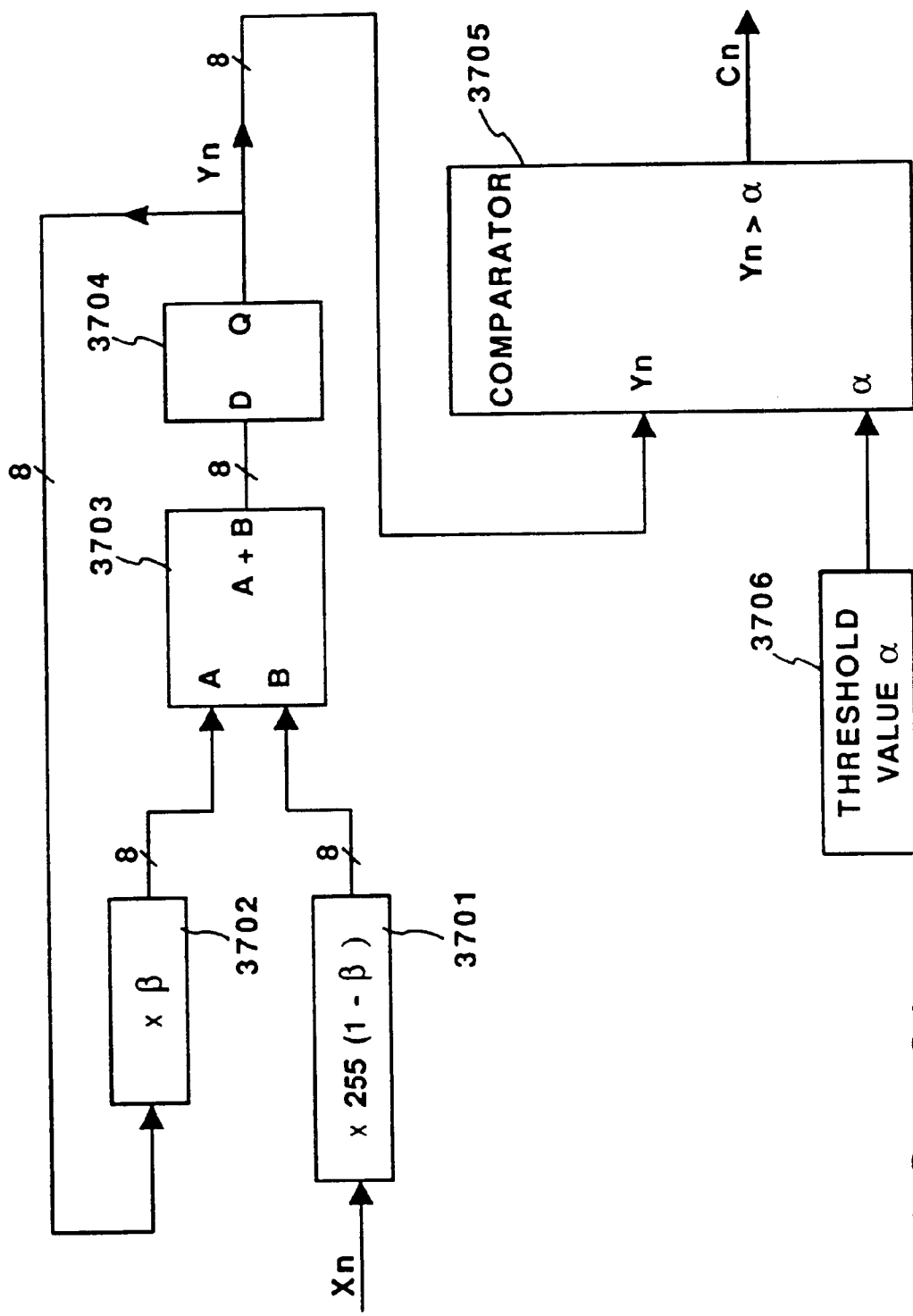
F I G. 31

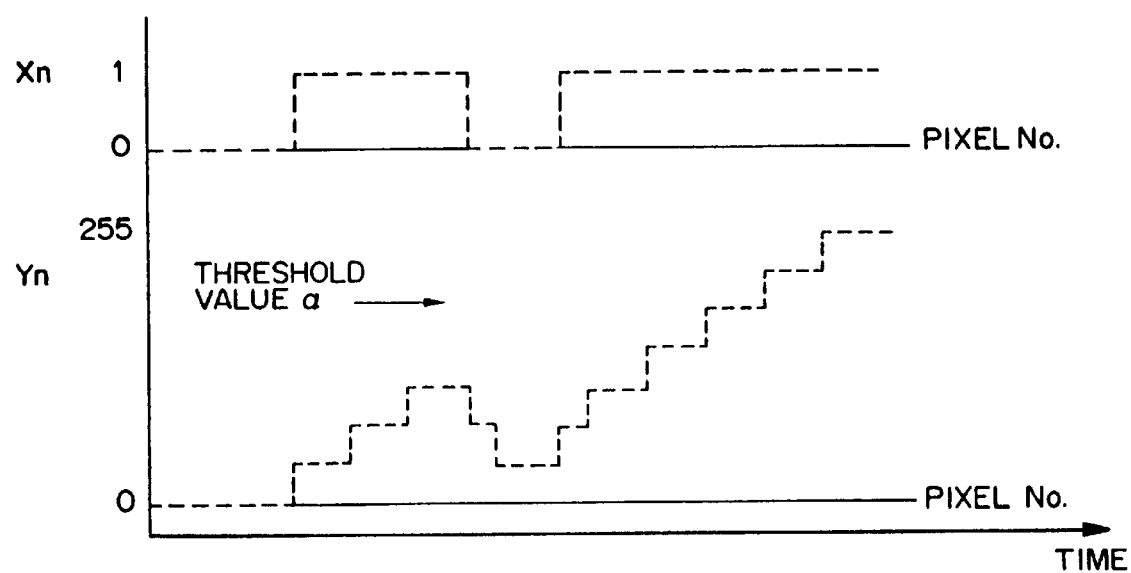
F I G. 32

ERROR ZZZ
COPY IMPOSSIBLE

FIG. 37

ORIGINAL C

SHOULD NOT COPIED

PLEASE CHECK

FIG. 38

| | IPU 3102 | HOST COMPUTER 3103 | SV 3104 | VTR 3105 |
|---|---|---|---|---|
| SEL 0 | 1 | 0 | 0 | 0 |
| SEL 1 | 0 | 1 | 0 | 0 |
| SEL 2 | 0 | 0 | 1 | 0 |
| SEL 3 | 0 | 0 | 0 | 1 |

FIG. 41

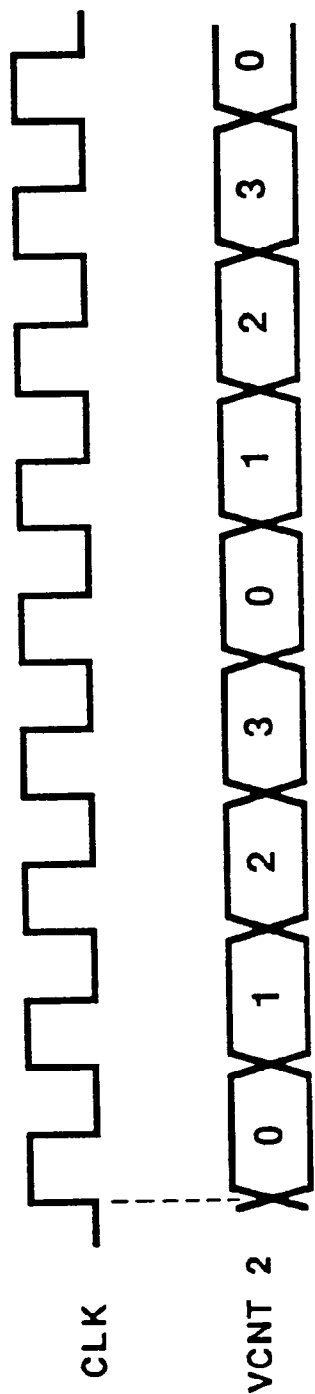
F I G. 50
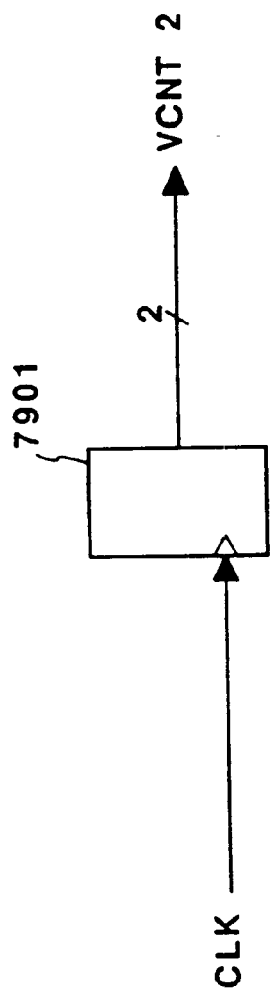
F I G. 51

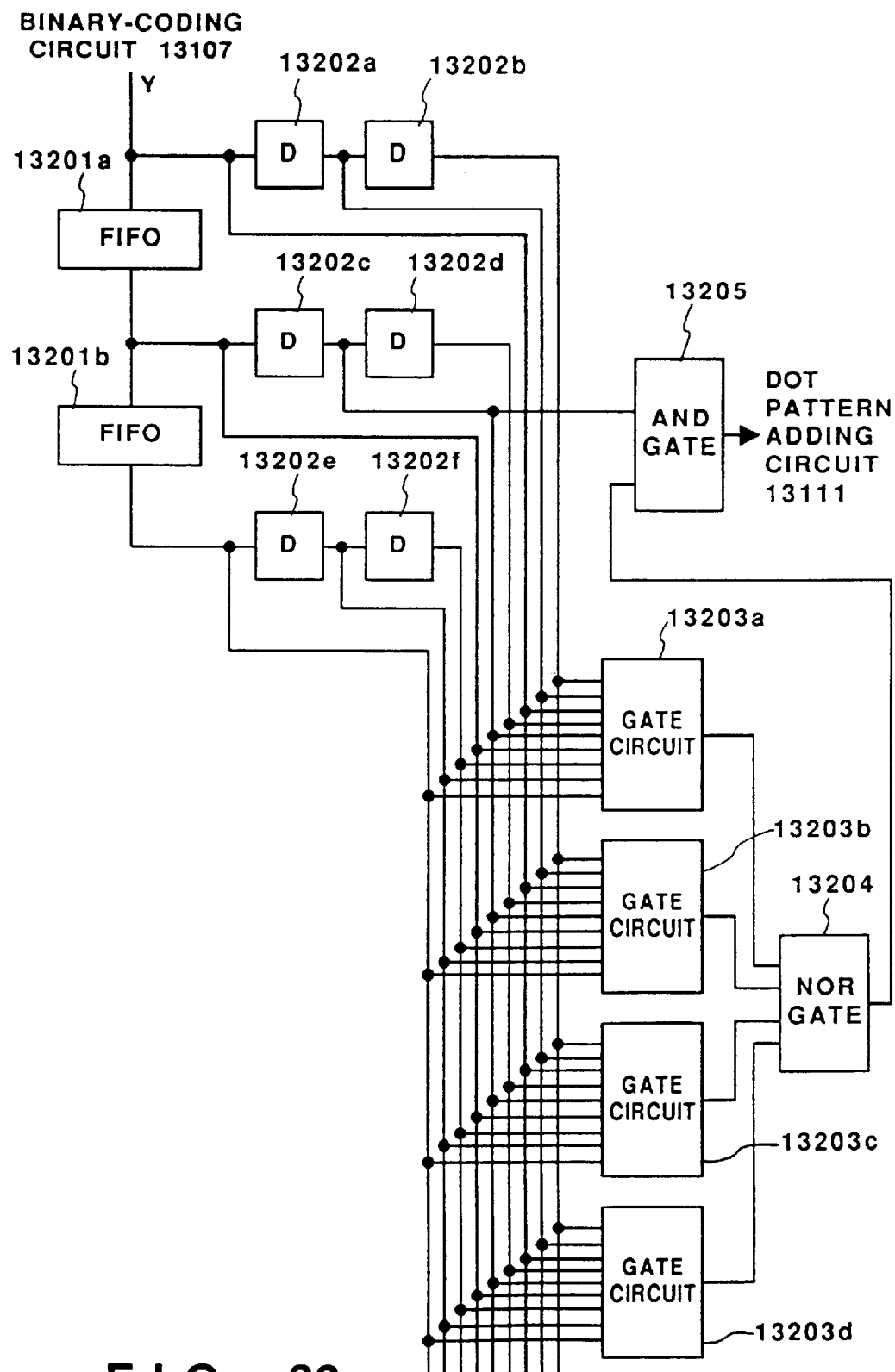
F I G. 63

| CNO SIGNAL | PRINT OUTPUT |
|---|---|
| 0 | MAGENTA (M) |
| 1 | CYAN (C) |
| 2 | YELLOW (Y) |
| 3 | BLACK (Bk) |

FIG. 66

IMAGE PROCESSING, COPYING, AND PRINTING APPARATUS HAVING A PART OF A PROCESSING UNIT AND A PART OF ANOTHER UNIT FORMED AS ONE INSEPARABLE UNIT

This application is a division of application Ser. No. 08/445,997, filed May 23, 1995, now allowed, which is a division of application Ser. No. 08/266,270, filed Jun. 24, 1994, now U.S. Pat. No. 5,481,377, which is a division of application Ser. No. 07/858,500, filed Mar. 27, 1992, now U.S. Pat. No. 5,363,202.

BACKGROUND OF THE INVENTION

1. Field of the Invention

The present invention relates to an image processing apparatus having a function for detecting originals containing specific patterns of monochromatic or color images, and also to a copying machine having such an image processing apparatus.

2. Description of the Related Art

Nowadays, copying machines are available which can produce color copies of extremely high quality, and this has given a rise to the demand for prevention of forgery of bills, securities and other valuable papers. To cope with this demand, it has been proposed to adopt pattern matching techniques in copying machines to detect and reject any original which should not be copied. In such a technique, the image pattern of the original input to a copying machine, after correction for any inclination in the orientation of the original, is compared with image patterns which have been registered in the machine, for the purpose of recognition and evaluation of matching of the pattern.

Image processing apparatus incorporated in known copying machines of the type described, however, does not have any means for deciding the state of the image recognition function. Therefore, when, for example, the image recognition function and the image processing apparatus are formed on different circuit boards, it is rather easy to demount the circuit board carrying the image recognition function, so that the copying machine performs the ordinary copying operation even when the original is a specific one which should not be copied. This undesirably allows easy forgery of papers such as bills and securities.

Under these circumstances, the assignee of the present invention has proposed techniques in which each copy is provided with information which indicates the fact that the copy is a copy and not an original.

One such techniques is to combine a specific code or a pattern with the output image. This technique employs a function for storing a specific pattern to be added and a function for combining the pattern with the output image. In a copy produced by this technique, the specific pattern is combined with the output image by a color tone or density which is not so noticeable to human eyes but is discriminatable by a specific technique.

In this type of color copying machine, there is no means for preventing replacement of the parts carrying the pattern storage and combining functions with a part which does not have such functions. After such replacement, the pattern is not added to the output image, so that forgery can easily be done by using the copying machine.

Furthermore, since the pattern is fixedly stored in such a manner as not to be changed, it is not possible for persons such as service personnel to set different patterns on different machines to enable identification of the machine from the copy produced by the machine.

The assignee of the present invention also has proposed a method for preventing illegal copying of bills, securities and so forth which is a critical problem noticed in recent years due to the high reproducibility of original images offered by current copying machines. According to this method, data concerning specific originals such as bills and securities are beforehand stored in terms of color space. Any original set on the copying machine is rejected when this original exhibits the same distribution of data in the color space as that of one of the above-mentioned specific originals. However, known copying machines realizing such forgery prevention method do not have functions for storing data concerning illegal use of the machine, e.g., type of the original illegally copied, type of the input device and identification of the operator who made such illegal use of the machine, nor a function for informing an administrator of the fact that the copying machine has been used illegally for the purpose of copying bills or the like.

Consequently, there is no means for keeping control over the copying machine against illegal copying, particularly when the copying machine is set at a place where there is no person other than the illegal user.

As explained before, various methods have been proposed for the purpose of enabling recognition of specific originals of the kind described.

In all the proposed methods, however, the image recognition is performed by an independent circuit. Therefore, it is not impossible for those who are familiar with this type of machine to modify the machine so as to enable illegal copying of bills or the like, by demounting the circuit board carrying the image recognition function.

Full-color copying machines also have been proposed in which identification information such as the serial number of the machine is added to the copy produced by the machine. Such information is given in the form of a mark of light yellow color or specific binary pattern.

All these known copying machines, however, are still unsatisfactory in that they permit easy demounting of the image recognition or detection function, due to the fact that such a function is performed by a single circuit board which is not difficult to demount.

SUMMARY OF THE INVENTION

Accordingly, a primary object of the present invention is to provide an image processing apparatus, as well as a copying machine, which can overcome the above-described problems of the known art.

Another object of the present invention is to provide an image processing apparatus, as well as a copying apparatus, wherein the apparatus itself can examine the state of the function for recognizing specific original patterns, thereby to prevent illegal copying of such specific originals.

Still another object of the present invention is to provide an image processing apparatus, as well as a copying machine, which enables free setting of pattern data to be combined with the output copy image, thus enabling identification of the copying machine by which any illegal copying was conducted.

A further object of the present invention is to provide an image processing apparatus, as well as a copying machine, which prohibits copying operation when a pattern data set in the apparatus has been lost, thereby to prevent disabling of the anti-forgery function caused by absence of such pattern data.

A still further object of the present invention is to provide an image processing apparatus, as well as a copying machine, which enables a check by a service man or an administrator for any disabling or invalidation of anti-forgery function, thus ensuring administration of the machine against illegal use such as forgery.

A still further object of the present invention is to provide an image processing apparatus, as well as a copying machine, which is constructed so as not to allow removal of the forgery detecting function.

A still further object of the present invention is to provide an image processing apparatus, as well as a copying machine, which is constructed to make it difficult to remove a circuit for adding machine identification information.

A still further object of the present invention is to provide an image processing apparatus, comprising: processing means for processing input image signals; connecting means for connecting a preventing means for preventing someone from copying a predetermined original; detecting means for detecting a state of connection between said connecting means and said preventing means; and control means for controlling the apparatus in accordance with the result of the detection made by said detecting means.

A still further object of the present invention is to provide an image processing apparatus, comprising: processing means for processing input image signals; connecting means for connecting a deciding means for deciding similarity between an image represented by said input image signals and an image of a specific original; detecting means for detecting a state of connection between said connecting means and said deciding means; and control means for controlling the apparatus in accordance with the result of the detection made by said detecting means.

A still further object of the present invention is to provide a printing apparatus having image processing means for effecting a predetermined image processing on an input image data, comprising: connecting means for connecting a pattern data generating means for generating pattern data for identifying the copying apparatus; synthesizing means for synthesizing said pattern data with said input image data; image forming means for forming an image on a recording medium in accordance with the synthesized image data; and control means for prohibiting formation of the image by said image forming means when said pattern data generating means is not connected with said connecting means.

A still further object of the present invention is to provide an image processing apparatus, comprising: input means for inputting image signals; deciding means for deciding whether an image represented by the image signal input through said input means contains an image corresponding to a predetermined specific original; memory means for storing the result of the decision made by said deciding means; and transmitting means for transmitting the result stored in said memory means to an external device.

A still further object of the present invention is to provide an image processing apparatus, comprising: deciding means for deciding whether an image represented by input image signals contain an image corresponding to a predetermined specific original; memory means for storing a plurality of sectioned decision results obtained as a result of the decision; and transmitting means for transmitting the results stored in said memory means.

A still further object of the present invention is to provide an image processing apparatus, comprising: input means for inputting image signals; deciding means for deciding whether an image represented by the image signals input through said input means contain an image corresponding to a specific original; and memory means for storing the results of the decision made by said deciding means together with other types of information.

A still further object of the present invention is to provide an image processing apparatus, comprising: image signal processing means for processing image signals for the purpose of image reproduction; deciding means for deciding degree of similarity between an image represented by said image signals and an image of a specific original; and altering means for altering the content of the processing performed by said image signal processing means, in accordance with a degree of similarity decided by said deciding means; wherein at least a part of said image signal processing means and at least a part of said image deciding means are formed as one unit with each other.

A still further object of the present invention is to provide a printing apparatus, comprising: deciding means for deciding whether a specific original is being copied; and processing means for performing a printing process; wherein at least a part of said deciding means and at least a part of said processing means are constructed as one unit with each other.

A still further object of the present invention is to provide an image processing apparatus, comprising: image processing means for obtaining density signals from input image signals; and adding means for adding a predetermined pattern to an image represented by said density signals obtained by said image processing mans; wherein at least a part of said image processing means and said adding means are formed on a common printed board.

A still further object of the present invention is to provide a printing apparatus, comprising: image processing means for obtaining density signals from input image signals; and adding means for adding a predetermined pattern to an image represented by said density signals obtained by said image processing mans; wherein at least a art of said image processing means and said adding means are formed on a common printed board.

A still further object of the present invention is to provide an image processing apparatus, comprising: image processing means for obtaining density signals from input image signals; binarizing means for binary-coding the density signals obtained by said image processing means; and adding means for adding a predetermined pattern to an image represented by the binary-coded signals; wherein said binarizing means and said adding means are formed on a common circuit board.

A still further object of the present invention is to provide a printing apparatus, comprising: image processing means for obtaining density signals from input image signals; binarizing means for binary-coding the density signals obtained by said image processing means; and adding means for adding a predetermined pattern to an image represented by the binary-coded signals; wherein said binarizing means and said adding means are formed on a common circuit board.

A still further object of the present invention is to provide a semiconductor chip, comprising: input terminal for inputting image data; decision circuit for deciding whether the image data represents a predetermined image; processing circuit for processing the image data for a reproduction; and output terminal for outputting the diciding result of said decision circuit and the processed image data.

A still further object of the present invention is to provide a semiconductor chip, comprising: input terminal for inputting image data; generating circuit for generating a pattern data representing a predetermined pattern for identifying an apparatus for which the semiconductor chip is applied; processing means for synthesizing the pattern data with the input image data; and output terminal for outputting the synthesized image data.

These and other objects, features and advantages of the present invention will become clear from the following description of preferred embodiments, as well as from the statement of claims, when the same are read in conjunction with the accompanying drawings.

BRIEF DESCRIPTION OF THE DRAWINGS

FIG. 31 is an illustration of operation of a smoothing circuit used in the fifth embodiment;

FIG. 32 is an illustration of the relationship between an input Xn and an output value Yn obtained through the smoothing operation used in the fifth embodiment;

FIGS. 37 and 38 are illustrations of copy prohibition messages produced in the fifth embodiment;

FIG. 41 is an illustration of the relationship between select signal and the input image processing device in the sixth embodiment;

FIG. 50 is a timing chart showing timings of signals HSTNC and VCNT2 in a ninth embodiment of the present invention;

FIG. 51 is a block diagram of a 2-bit counter used in the ninth embodiment;

FIG. 63 is a block diagram of a dot pattern detection and correction circuit used in the twelfth embodiment;

FIG. 66 is an illustration of the relationship between a CNO signal and printing output.

BRIEF DESCRIPTION OF THE EMBODIMENTS

The preferred embodiments of the present invention will be described in detail with reference to the accompanying drawings. Although copying machines are specifically mentioned in the following description, it is to be understood that the invention can be applied to a variety of types of apparatus. The embodiments described hereinunder are intended for preventing copying of specific originals such as bills, securities and so forth, for the purpose of prohibiting forgery.

First Embodiment

A description will now be given of the whole construction of a copying machine.

Figure 2:
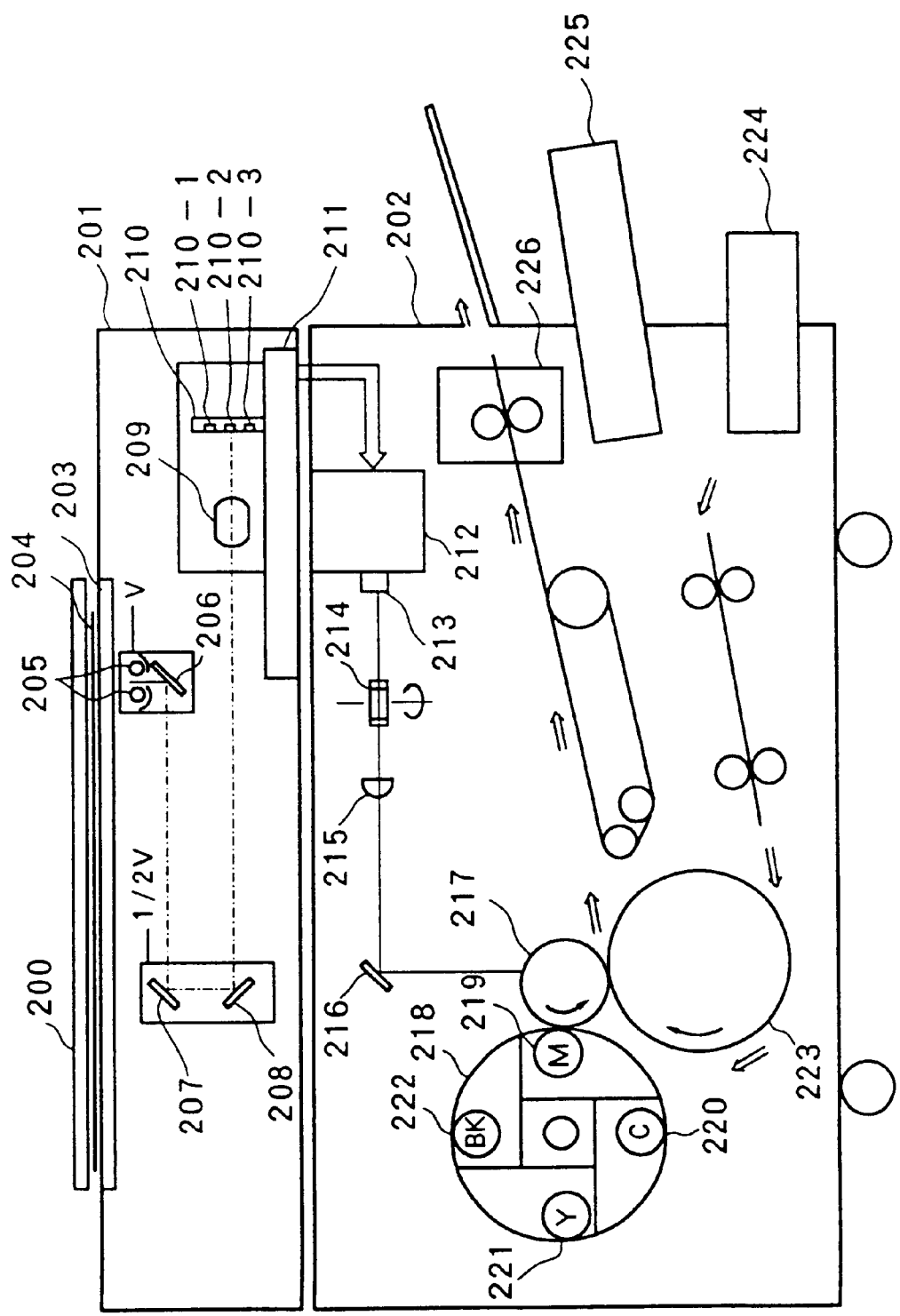
FIG. 2 is a sectional side elevational view of the embodiment of a copying apparatus in accordance with the present invention.

FIG. 2 is a sectional side elevational view of a copying machine as a first embodiment of the present invention. The copying machine has an image scanner 201 which reads an original and converts the read image into digital signals. Numeral 202 designates a printer which produces a full-color print of an image corresponding to the image of the original read by the image scanner 201.

The image scanner 201 has a pressing plate 200 with a mirror surface. An original 204 on an original table glass 203 (referred to as "platen" hereinunder) is illuminated by a lamp 205. The light reflected by the original 205 is led to mirrors 206, 207 and is focused on a line sensor 210 (referred to as "CCD", hereinafter) through a lens 209. The full-color information components red (R), green (G) and blue (B) of the image formed on the CCD are delivered to a signal processing section 211. The lamp 205 and the mirror 206 mechanically move at a velocity V in the directions perpendicular to the direction of an electric scan of the line sensor. Similarly, the mirrors 207, 208 move at a velocity V/2 in the directions perpendicular to the direction of an electric scan of the line sensor. Consequently, the entire area of the original is scanned. The signal processing section 211 electrically processes the image signals of the read original image, so as to decompose the image signals into components of magenta (M), cyan (C), yellow (Y) and black (Bk) and delivers these components to the printer 202. One of the components M, C, Y and Bk is delivered to the printer 202 per each scan performed by the image scanner 201. Thus, one printing cycle requires four cycles of scanning of the original.

The components M, C, Y and black Bk, supplied from the image scanner 201, are delivered to a laser driver 212. The laser driver 212 drives a semiconductor 213 while modulating it in accordance with the image signal. The laser beam is deflected by a polygonal mirror 21 and applied to the surface of a photosensitive drum 217 through an f-lens and a mirror 216, thereby scanning the surface of the photosensitive drum 217.

A rotary developing device 218 has a magenta developing unit 219, a cyan developing unit 220, an yellow developing unit 221 and a black developing unit 222. Four developing units are alternately and successively brought into contact with the photosensitive drum 217 so as to develop, by respective color toners, an electrostatic latent image formed on the surface of the photosensitive drum 217. Numeral 223 denotes a transfer drum for winding thereon a paper fed from a paper cassette 224 or 225 so that the image developed on the photosensitive drum is transferred to the paper.

Image components of four colors M, C, Y and Bk are successively transferred to the paper. The paper is then made to pass through a fixing unit 226 so that the transferred full-color image is fixed. The paper is then ejected.

<Image Scanner>

Figure 3:
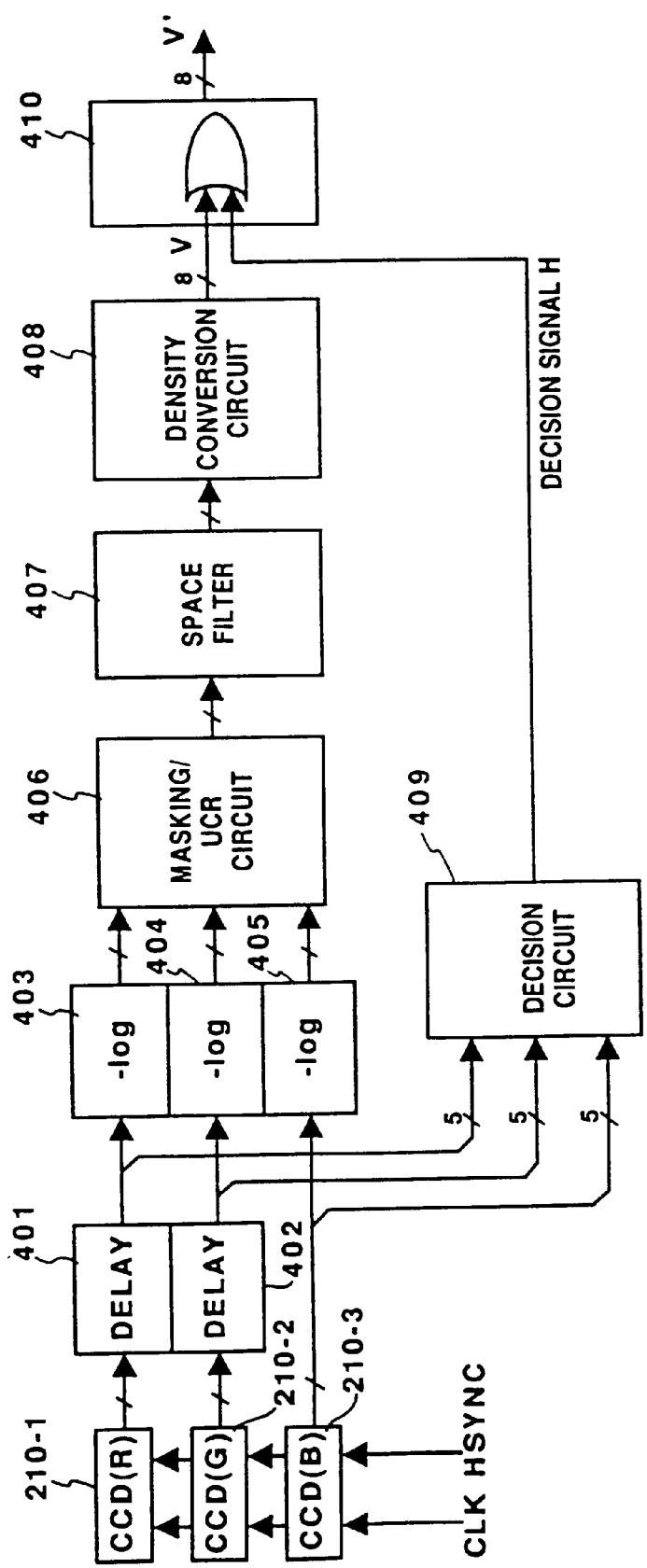
FIG. 3 is a block diagram of an image scanner unit 201 used in the first embodiment.

FIG. 3 is a block diagram showing the construction of the image scanner 201 used in the first embodiment. Referring to this Figure, the image scanner 201 has CCDs (solid state imaging devices) 210-1, 210-2 and 210-3 having red (R), green (G) and blue (B) spectro-sensitivity characteristics, respectively. Each of the CCDs produces a signal quantized into 8 bits which represent 256 vales from 0 to 255. The CCDs 210-1, 2102 and 21-3 are disposed at predetermined distances, so that delay elements 401 and 402 are used for the purpose of correcting spatial offset.

Log converters 403, 404 and 405 each is composed of a look-up table ROM or RAM, which converts an illuminance signal into a density signal. Numeral 406 denotes a masking and UCR (undercolor removal) circuit. Detailed description of this circuit is omitted since this circuit is well known in this field. This circuit, upon receipt of three primary color signals, this circuit 406 produces Y, M, C and Bk signals in the form of bit trains of a predetermined length, e.g., 8 bits, thereby forming an output.

Numeral 407 designates a space filter which also is known. This filter performs correction of space frequency of the output signals. Numeral 408 designates a density conversion circuit 408 which is used for correcting density characteristics of the printer 202. As is the case of the Log converters 403 to 405, the density conversion circuit 408 is composed of a look-up table ROM or RAM. Numeral 409 designates a decision circuit for deciding whether an original placed on the copying machine is one of the aforesaid specific originals. This circuit 409 delivers the result of the decision in the form of a decision signal H of 0 or 1 level. Namely, when the input image is determined as being the image of one of the specific originals, the decision circuit 409 produces a signal H=1, otherwise H=0.

An OR gate circuit 410 produces an OR of each 8-bit output V of the density conversion circuit 408 and the decision signal H which is the output of the decision circuit 409, thereby outputting a signal V'. When the output of the decision circuit 409 is H=1, i.e., when the original which is being read is determined as being one of the specific originals, the output of the OR gate 410 is V'=FF (H: hexadecimal), regardless of the value of the input signal V. Conversely, when the decision signal is H=0, i.e., when the original which is being read is determined an original which is difference from the specific originals, the input signal V is passed and output as an output V' from the OR circuit 410.

<Timing Chart>

Figure 5:
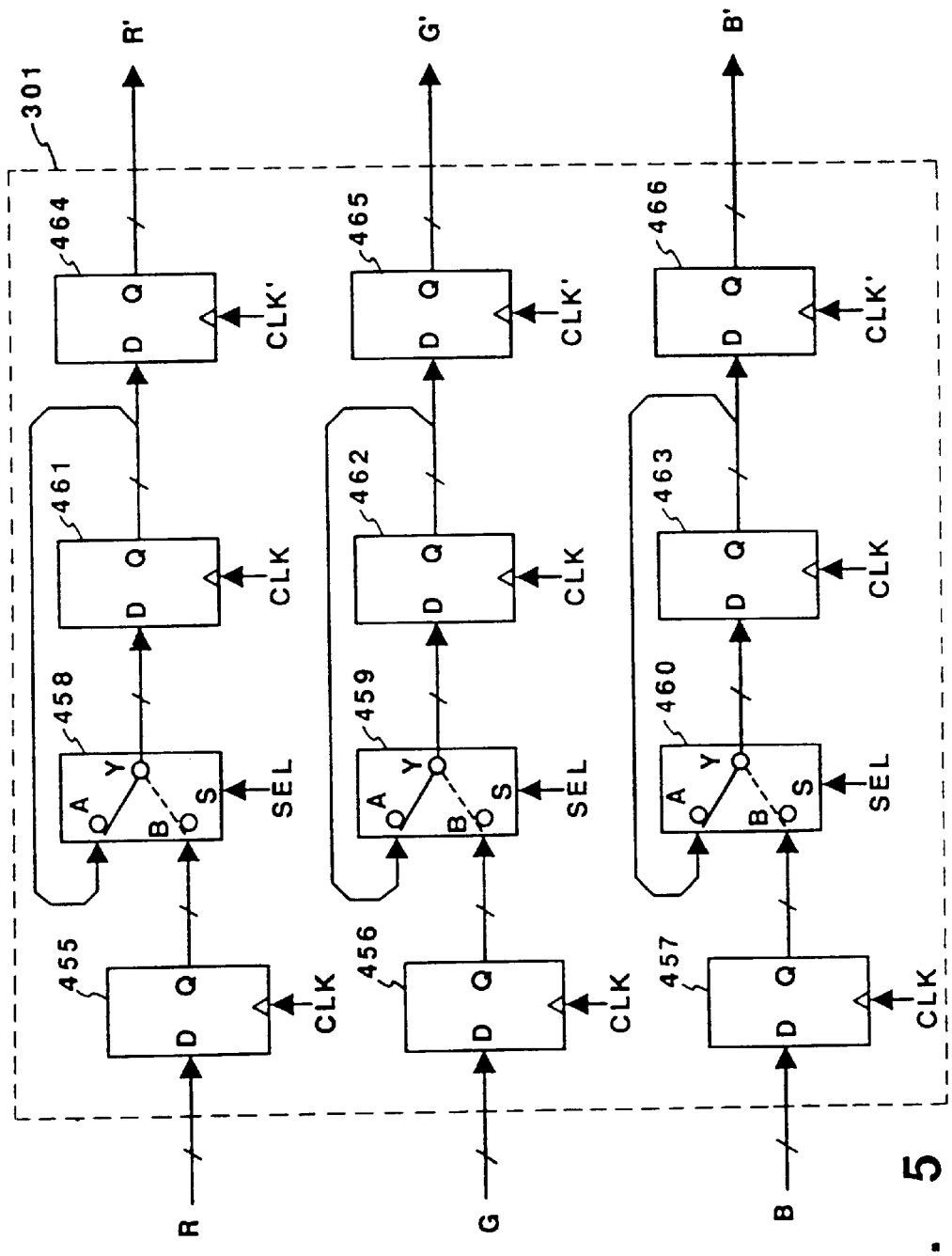
FIG. 5 is a circuit diagram of a thinning circuit used in the first embodiment.
Figure 6:
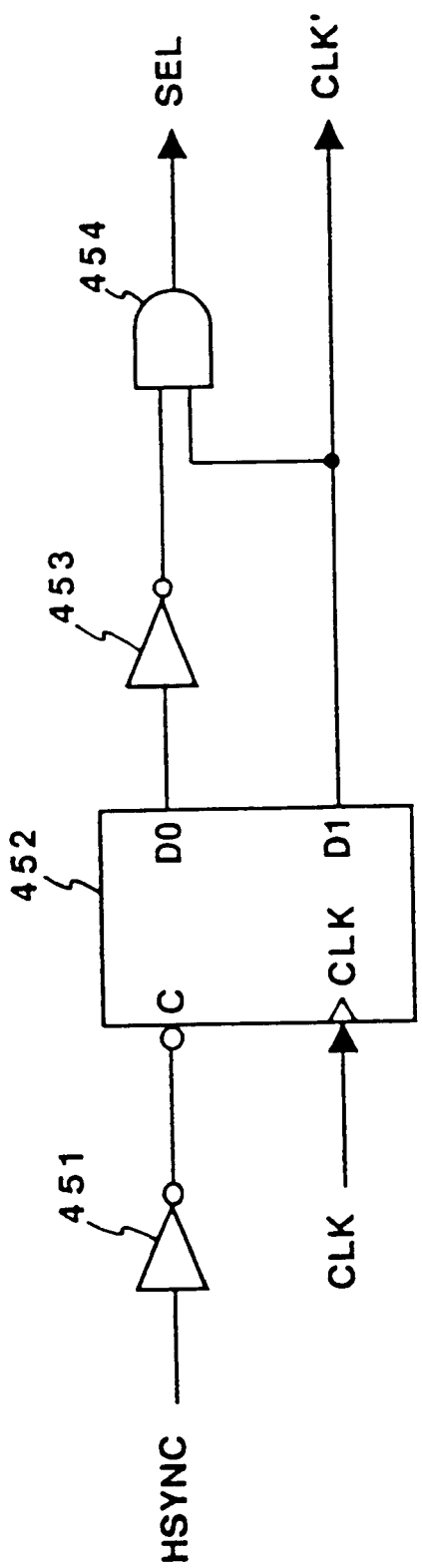
FIG. 6 is a circuit diagram of a frequency-dividing circuit used in the first embodiment.
Figure 8:
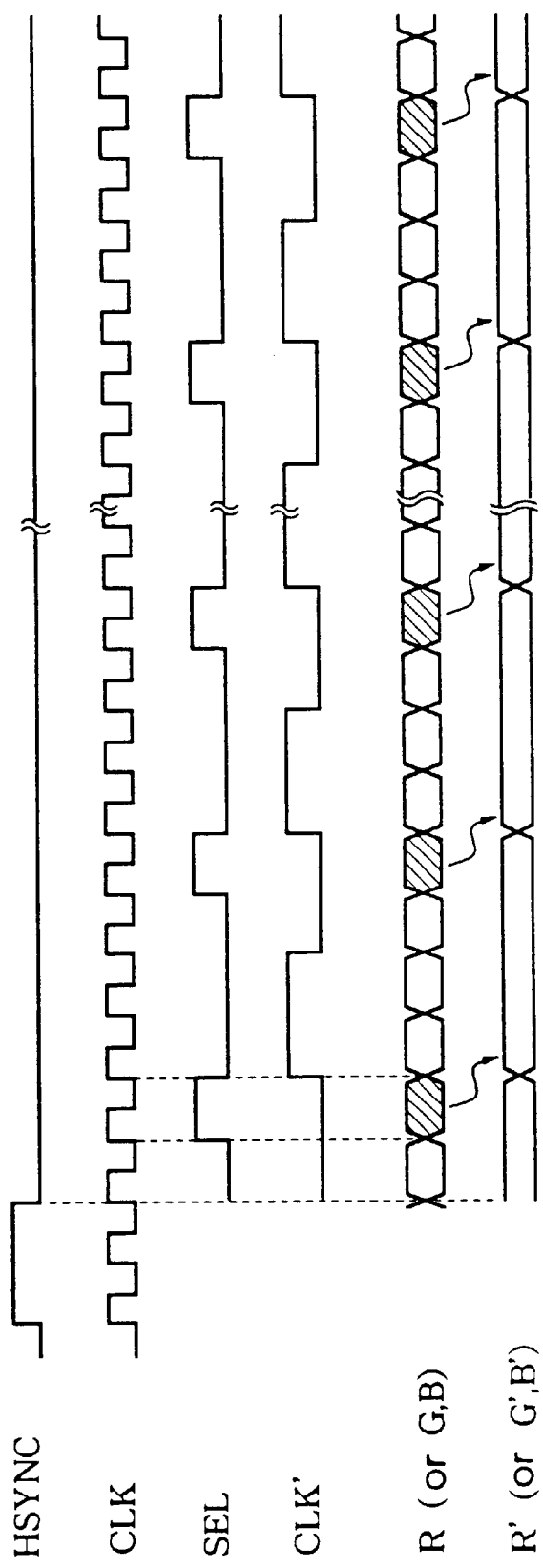
FIG. 8 is a timing chart showing timings of signals in a main scanning performed in the first embodiment.

FIG. 5 illustrates a thinning circuit used in the first embodiment, while FIG. 6 is a circuit diagram of a frequency dividing circuit used in the same. FIG. 8 is a timing signal of signals appearing in the direction of the main scan in the first embodiment. Te timing at which each main scan is commenced is determined by a man scan synchronizing signal HSYNC. CLK shows transfer clock signals in accordance with which the image signals are transferred. The clock signals CLK also are used as the basic clocks in various image processing operations performed in this embodiment. CLK' represents a signal which is obtained by ¼ demultiplication of the clock signal CLK and which is used for giving a time reference to the deciding operation performed by the decision circuit 409. A signal SEL is a timing signal used in the above-mentioned thinning circuit 301. These signals are generated by circuits shown in FIG. 6. The circuit comprises an inverter 451, a 2-bit counter 452, an inverter 453 and an AND gate 454. The 2-bit counter 452, after being cleared (initialized) by the main scanning synchronizing signal HSYNC, counts the clock signals CLK and delivers the counted value in the form of a 2-bit signal (D0, D1). The significant bit D1 is output as the clock signal CLK'. The AND of the signal obtained by inverting the less significant bit D0 and the significant bit D1 is delivered as the SEL signal.

The thinning circuit shown in FIG. 5, is constructed by flip-flops 455, 456, 457, 461, 462, 463 which hold data in accordance with the clock signal CLK, selectors 458, 459, 460, and flip-flops 464,465,466 which hold data in accordance with the clock signals CLK'. Consequently, signal R' (or G' or B') is thinned out at a rate ¼ from the signal R (or G or B) transferred in accordance with the clock signals CLK. The timing of the signal thus thinned out is synchronous with the clock signal CLK'.

<Decision circuit>

Figure 4:
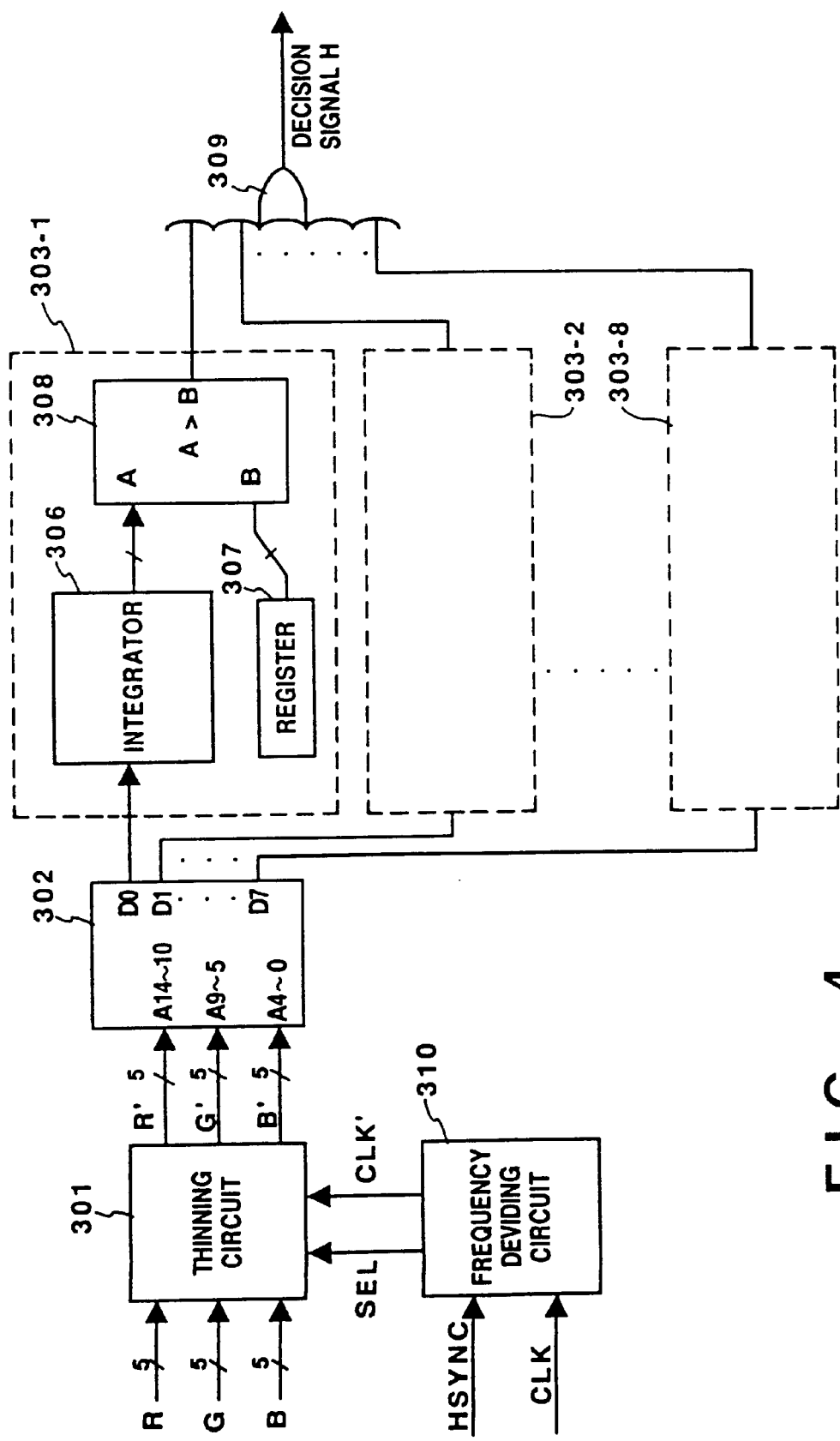
FIG. 4 is a block diagram of the decision circuit 409 used in the first embodiment.

FIG. 4 is a block diagram of the decision circuit 409 used in the first embodiment. In this Figure, numeral 301 designates a thinning circuit which has a construction as shown in FIG. 5. The thinning circuit 301 performs thinning of the data in order to reduce burden on the decision circuit. Numeral 302 designates a color taste matching look-up table (referred to as "color taste matching LUT") which performs color taste matching operation by comparing the image which is being read with a plurality of original images, i.e., the aforementioned specific originals. Numeral 303-1, 303-2 ... and 303-8 denote color-taste decision circuits which have the same hardwares. Each of the color taste decision circuit is composed of an integrator 306, a register 307 and a comparator 308, as shown in FIG. 6. Each color taste decision circuit determines whether the original which is being read contains specific color taste equal to the color taste of one of the specific originals. Different registers 307 for the color-taste decision circuits 303-1 to 303-8 hold different contents. Numeral 309 denotes an OR circuit which, when existence of the image of one of the specific originals is sensed by at least one of the color taste decision circuit 303-1 to 303-8, produces an output "0" and otherwise "1". Although in the described embodiment a 1-bit signal is used for the evaluation of the degree of similarity, this is only illustrative and the arrangement may be such that the degree of similarity is expressed by a multi-value deciding signal. To this end, a plurality of registers 307 i used for each color taste decision circuit, so as to set a plurality of slice levels.

<Integrator>

Figure 7:
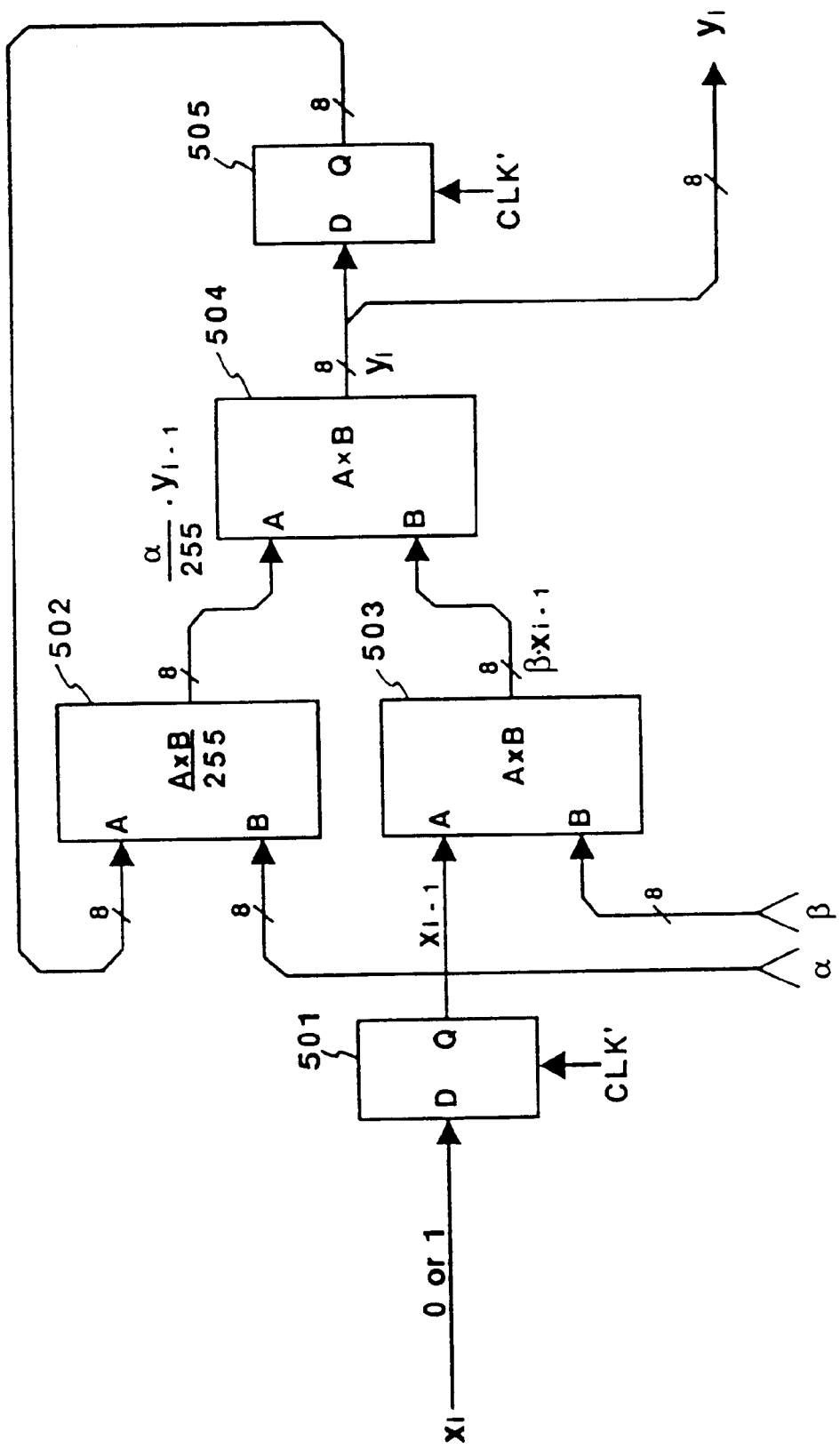
FIG. 7 is a block diagram of an integrator 306 used in the first embodiment.

FIG. 7 is a block diagram of an integrator 360 used in the first embodiment. Numerals 501 and 505 denote flip-flops which hold the data at the moment of rise of the signal CLK'. A multiplier 502 receives a pair of 8-bit input signals (A, B) and produces, as a result of the multiplication, an 8-bit signal (A×B/255). Numeral 503 also represents a multiplier which receives 1-bit input signal (A) and an 8-bit input signal so as to deliver an 8-bit output signal (A×B) as a result of the multiplication. As adder 504 receives a pair of 8-bit signals (A, B) and produces an 8-bit signal (A+B) as a result of the addition.

Consequently, this integrator produces an 8-bit output signal $y_i$ which is given by the following equation, in response to a binary input signal $x_i$:

$$y_i = (\alpha/255) \cdot y_{i-1} + \beta \cdot x_{i-1} \qquad (1)$$

Symbols $\alpha$ and $\beta$ represent constants of values which are determined beforehand. Characteristics of the integrator 306 is determined by the values of these constants.

Figure 9:
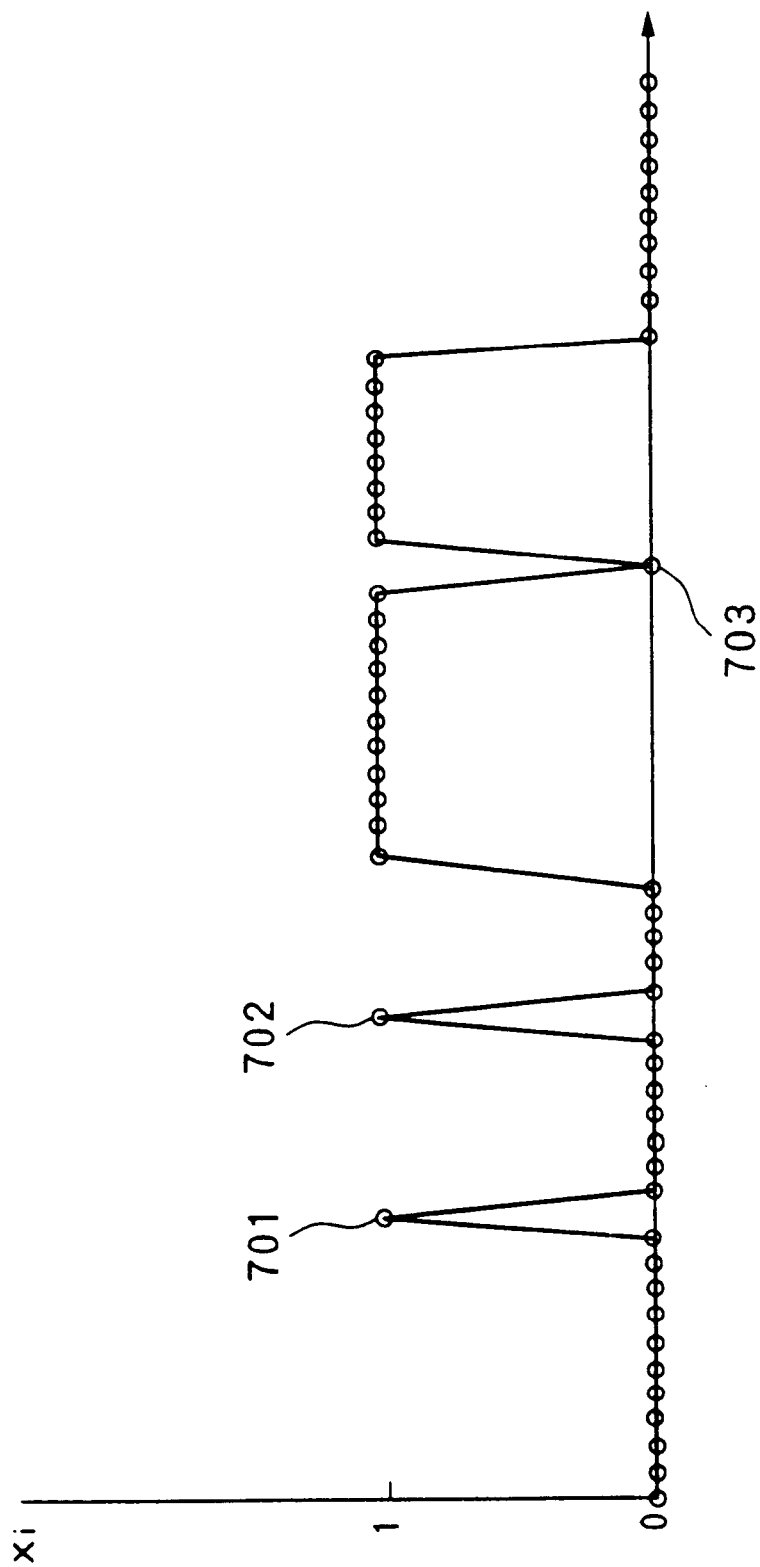
FIG. 9 is an illustration of signals input to and output from the integrator 306.
Figure 10:
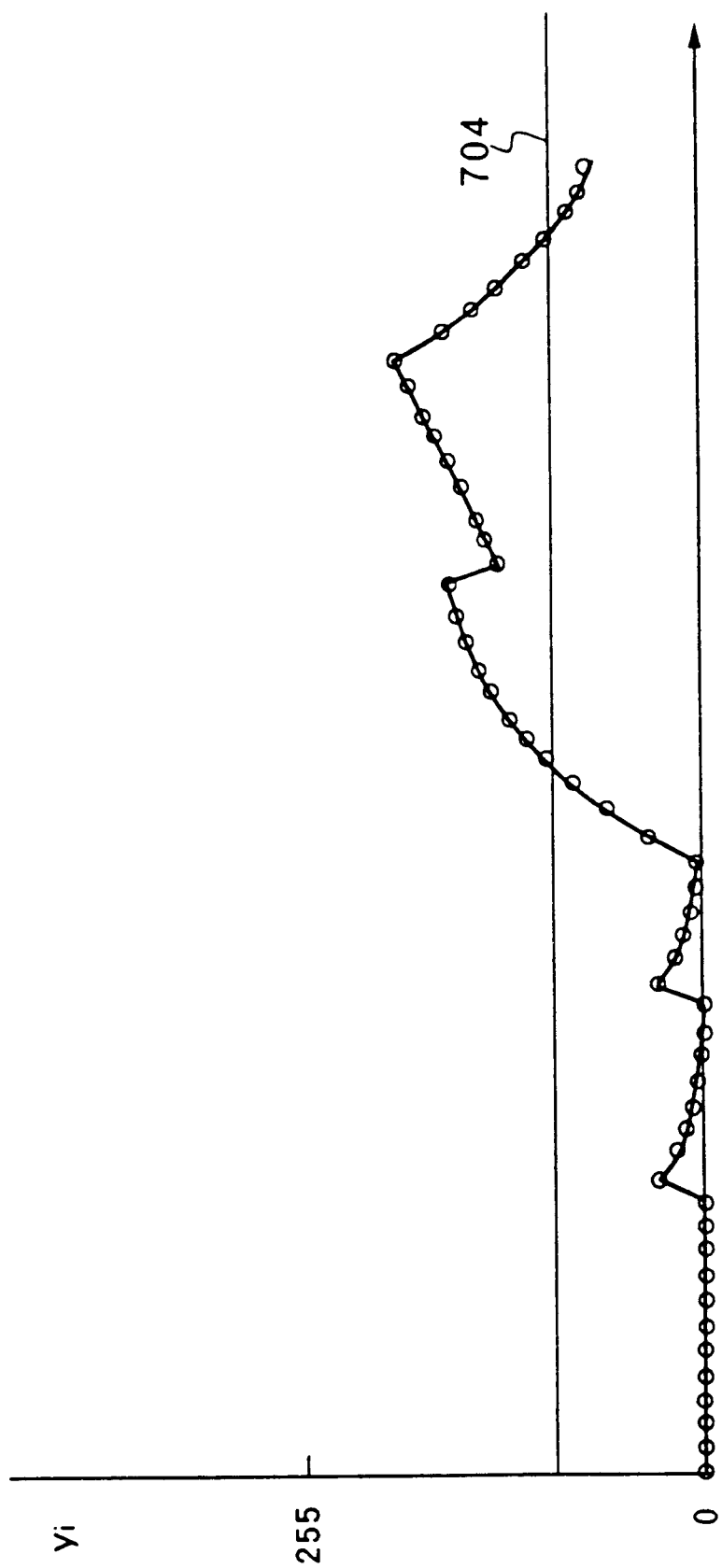
FIG. 10 is an illustration of another forms of signals input to and output from the integrator 306.

FIGS. 9 and 10 illustrate input to and output from the integrator 306 used in the first embodiment.

The integrator 308 produces an output $y_i$ shown in FIG. 10 in response to an input $x_{i-1}$ shown in FIG. 9, when the constants $\alpha$ and $\beta$ are respectively 247 and 8.

Inputs at point 701, 702 are "1" while substantially all the inputs therearound are "1". Conversely, the input at the point 703 is "0" despite the inputs at all other points therearound are "1". In such cases, the inputs at the points 701, 702 and 703 are considered as being noises. These noises are processed by the integrator 306. Namely, a threshold value as at 704 is set in the register 307 so as to binarizing the output $y_i$ of the integrator 306, thereby removing noises.

<Processing Result>

Figure 11:
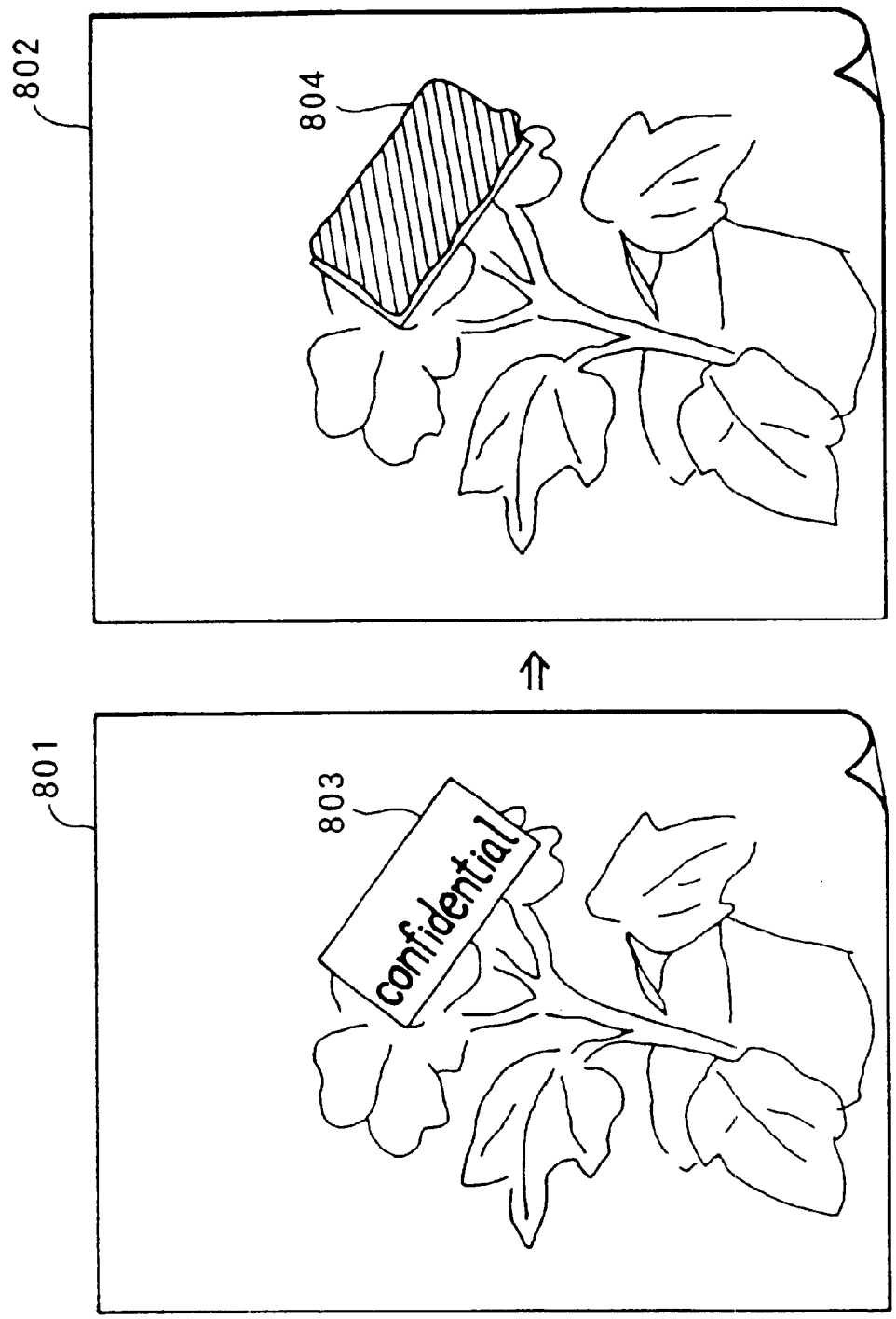
FIG. 11 is an illustration of the result of processing performed in the first embodiment.

FIG. 11 illustrates an example of the processing result. Referring to FIG. 9, numeral 801 designates an original. It is assumed here that a specific image 803 to be detected and determined by the copying machine of the invention exists in a portion of the image of the original 801. When this original is copied, an output result 802 is obtained in which the portion corresponding to the specific image 803 has been painted in black as denoted by 804 which indicates invalid portion. This means that the portion of the original image corresponding to the specific image is not copied to provide any recognizable image pattern.

Thus, in this embodiment, presence of any original image conforming with one of specific originals is detected by by the decision circuit, and copying of such original image is prohibited, thereby preventing any forgery of bills or the like.

A description will now be given of the decision circuit 409.

Figure 1:
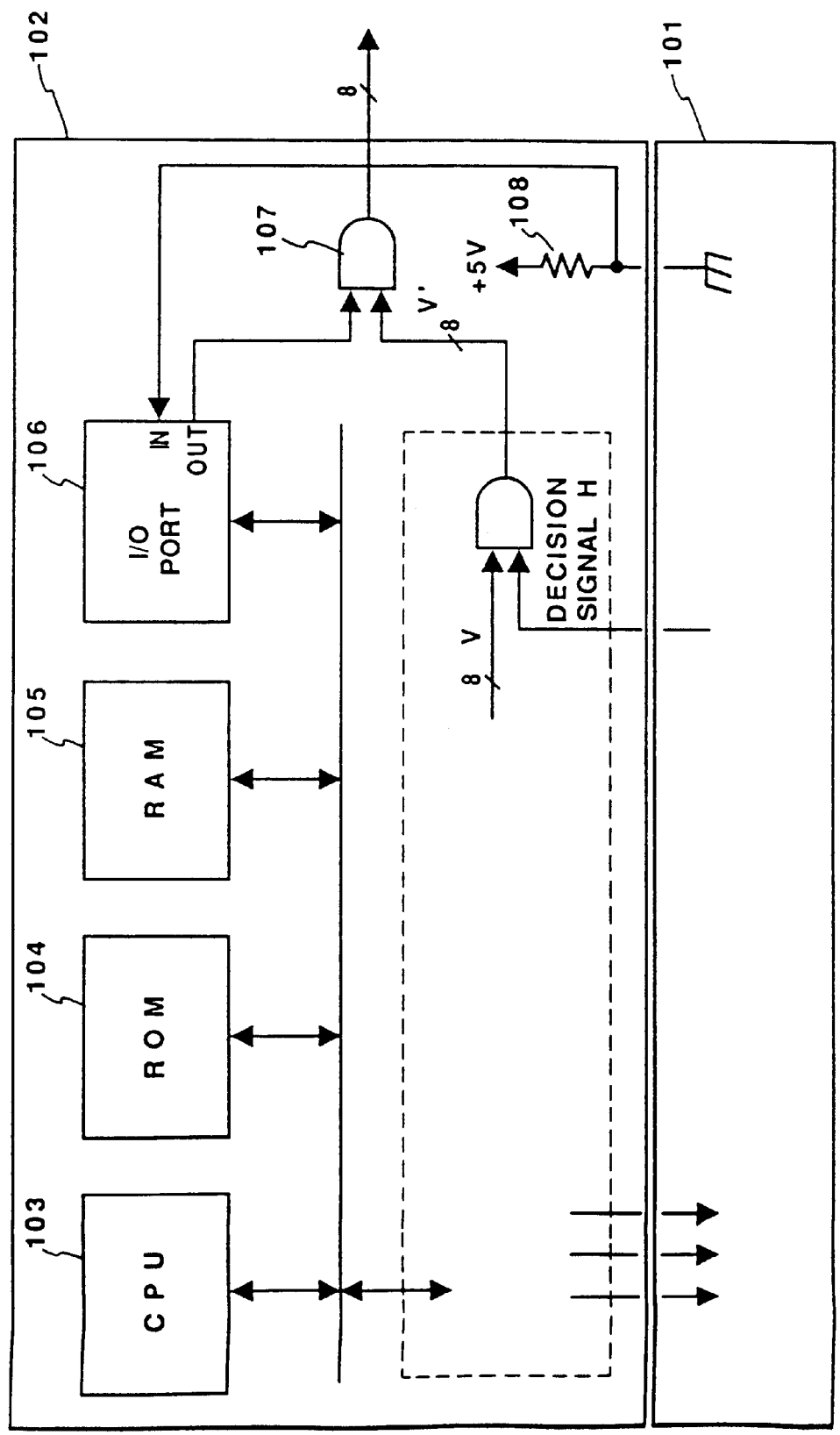
FIG. 1 is a block diagram of a decision circuit 409 used in a first embodiment of the present invention.
Figure 12:
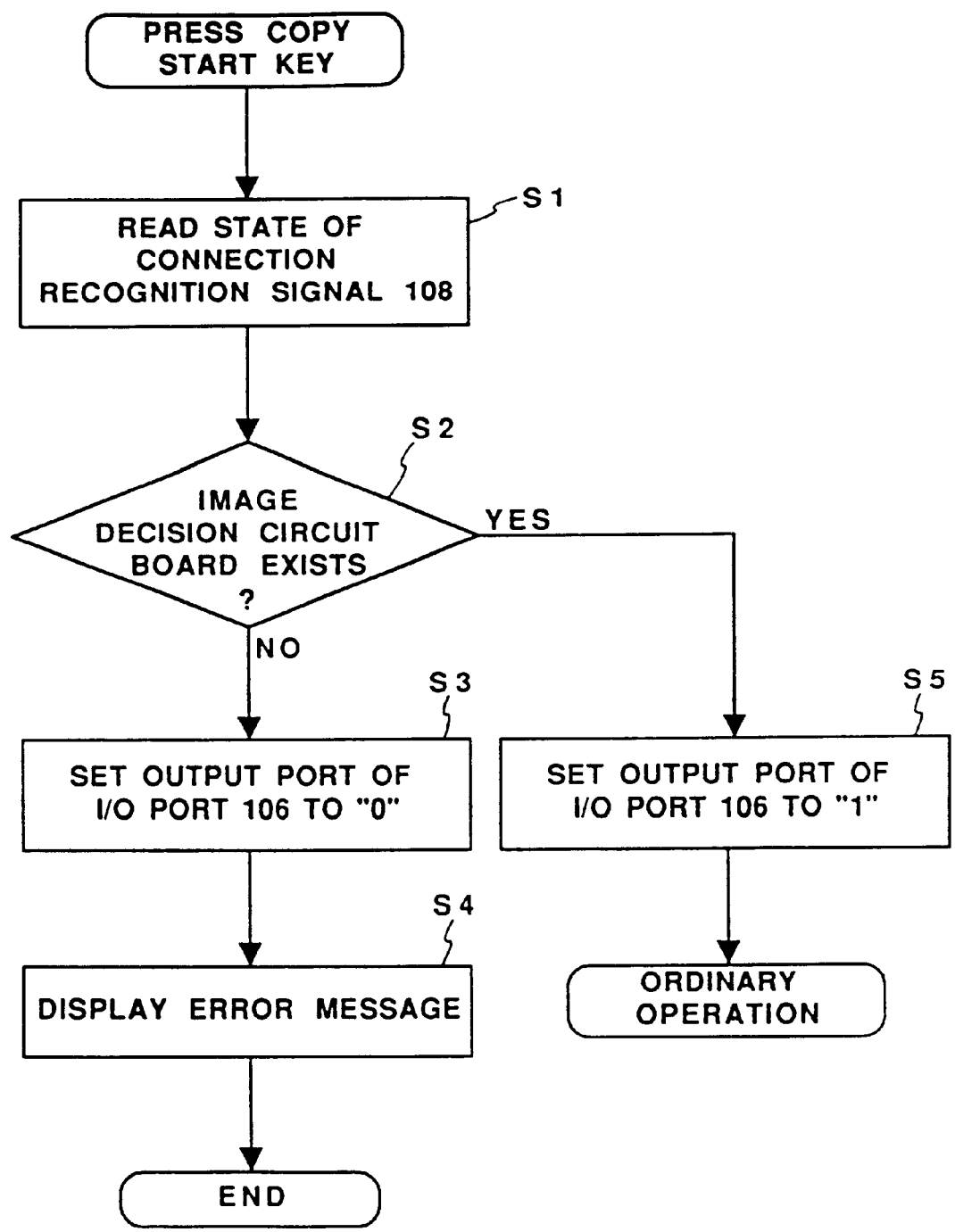
FIG. 12 is a flow chart illustrating principal image processing operations performed by the first embodiment.

FIG. 1 is a block diagram showing the connections of components of the decision circuit 409 used in the first embodiment, while FIG. 12 is a flow chart illustrating principal image processing operations performed in the first embodiment.

Referring to FIG. 1, numeral 101 designates an image decision circuit board for deciding degree of similarity of an original to a specific original, while 102 designates a scanner control circuit board. The image decision circuit board 101 carries a circuit for conducting decision of the image. In this embodiment, this circuit board 101 carries no circuit or component other than the image decision circuit. The scanner control circuit board 102 carries image processing portion of FIG. 3 which has been explained before. CCDs 210-1 to 210-3 have been omitted from this circuit board 102. The scanner control circuit board 201 also carries a CPU 103 and peripheral circuits for conducting controls of the scanner 201. The image decision circuit board 101 and the scanner control circuit board 102 are connected to each other through a connector which is not shown.

The arrangement is such that, when the image deciding substrate 101 has been correctly connected to the scanner control circuit boar 102, a connection recognition signal 108 is set to "0", whereas, when the image decision circuit board 101 is connected to the scanner control circuit board 102, the connection recognition signal 108 is set to "1".

The operation of the first embodiment will be described briefly.

In response to pressing of a copy start key, the CPU 103 on the scanner control circuit board 102 reads the state of the connection recognition signal 108 connected to the input portion of the I/O port 106 (Step S1), thereby confirming the presence of the image decision circuit board 101 (Step S2). When the level of the connection recognition signal 108 is "1", i.e., when the image decision circuit board 101 is not connected, the CPU 103 sets the output port of the I/O port to "0" (Step 3). As a consequence, the image signal V' is gated by the AND gate 107 so that the output of the gate circuit is 0 in all cases. In this case, the CPU 103 simultaneously operates to display, in a manipulating portion (not shown) of the image scanner 201, an error message indicating that "copy is prohibited" and controls the copying machine so as to prohibit the copying operation (Step S4). The display of the above-mentioned error message on the manipulating portion may be conducted by lighting up or flickering of a lamp or indication by letters formed by a liquid crystal display. Message also may be given by a voice message. The checking of the state of connection of the image decision circuit board 101 is executed in response to each pressing of the copy start key. Obviously, the copying machine performs ordinary copying operation while checking for presence of an original image conforming with a specific original, when the image decision circuit board 101 is correctly connected.

Thus, the copying machine of the first embodiment prohibits copying operation when the image decision circuit board 101 has been removed or disconnected. It is therefore possible to prevent forgery, i.e., copying of bills and securities, even when the function for recognizing any specific original has been dismissed.

Second Embodiment

The first embodiment described hereinbefore is a copying machine which is composed mainly of an image scanner and a printer. This, however, is only illustrative and the invention may be applied to various other types of devices such as those having communication function, e.g., a facsimile.

Figure 13:
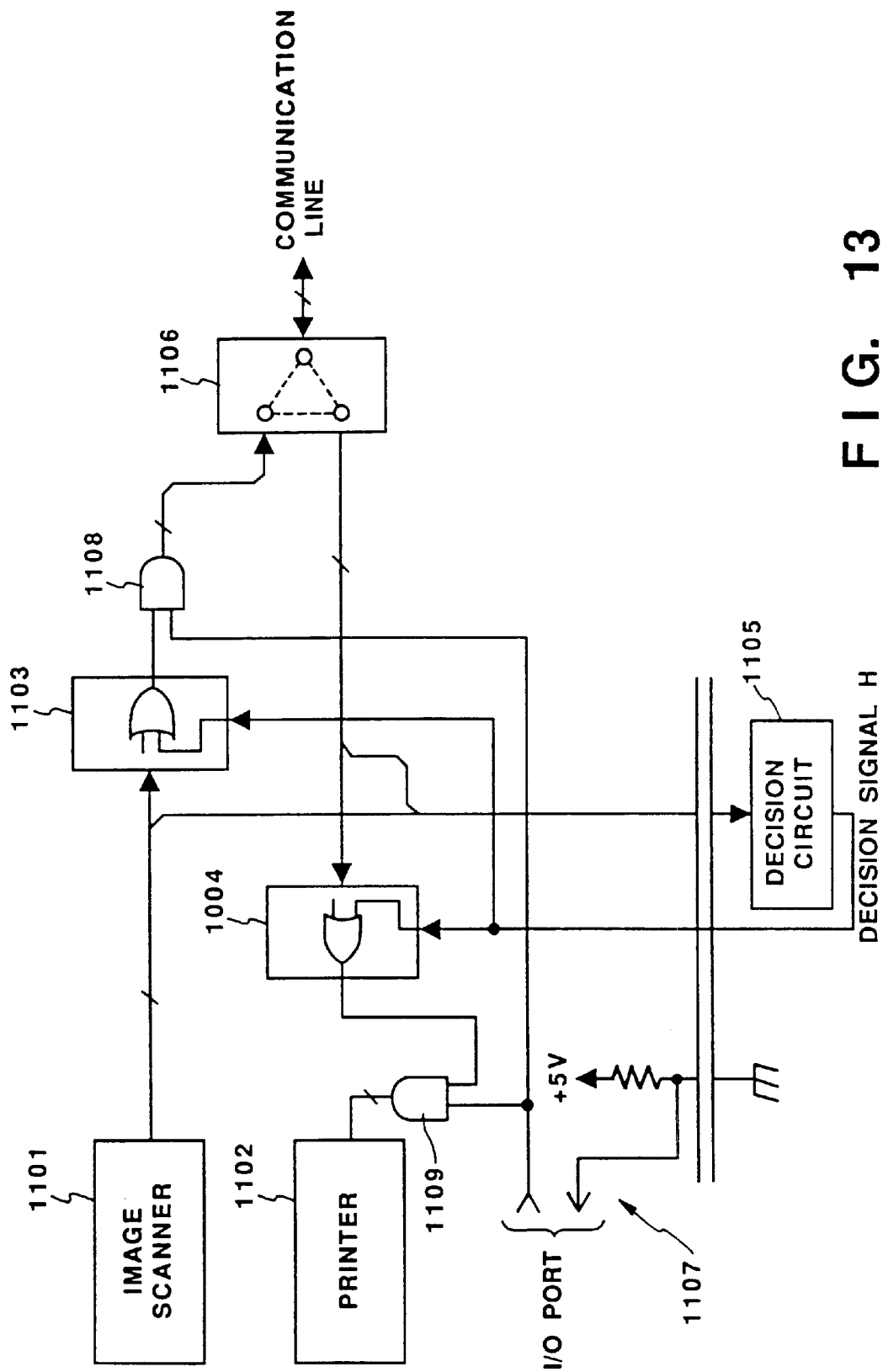
FIG. 13 is a block diagram of a second embodiment of the copying machine in accordance with the present invention.

FIG. 13 shows a second embodiment of the invention which also is a copying machine. Numeral 1101 denotes an image scanner having a construction and functions similar to those of the image scanner 201 shown in FIG. 2. Numeral 1102 designates a printer which also has a construction and functions similar to those of the printer 202 shown in FIG. 2. Numeral 1105 designates a decision circuit having a construction and functions similar to those of the decision circuit 409 shown in FIG. 3. Numerals 1103 and 1104 denote OR gates having a construction and functions similar to those of the OR circuit 410 used in the first embodiment. Numeral 1107 designates a connection recognition signal which has the same significance as the connection recognition signal 109 shown in FIG. 1. Numeral 1106 designates a BUS selector which interconnects the image scanner 1101, printer 1102 and a communication line. The BUS selector selects one of the following three connection modes:

(1) Image scanner-printer (copying mode)
(2) Image scanner-communication line (facsimile transmission mode)
(3) Communication line-printer (facsimile receiving mode)

When the circuit board of the decision circuit 1105 has been removed, operation is prohibited in all the three modes, i.e., copying, facsimile transmission and facsimile receiving modes, by processing the output image of the image scanner 1101 and the input image of the printer 1102 by means of the AND gates 1108 and 1109, in accordance with the result of checking of the state of the connection recognition signal 1107.

According to the invention, it is thus possible to control, not only the copying output but also the outputs to and from the communication line, by evaluating the state of the connection recognition signal 1107 which indicates whether the image decision circuit board is connected correctly. Therefore, when a user has willfully disconnected the image decision circuit board, the outputting of specific image corresponding to specific originals such as bills or securities is avoided, thus preventing forgery.

The circuit board carrying the circuit for deciding presence of a specific original may be composed of a plurality of separate boards. In such a case, the copying machines is so constructed that the image processing operation is prohibited when at least one of such boards has been removed.

Although a laser beam printer is used in the described embodiments, it will be clear that the printer other than the laser beam printer, e.g., an ink jet printer or a thermal transfer printer, may be used as the printer in the described embodiments of the invention.

It is also to be understood that the described method for evaluating he degree of similarity is not exclusive. The decision may be conducted by a method other than the described method, e.g., by a pattern matching.

Third Embodiment

Figure 14:
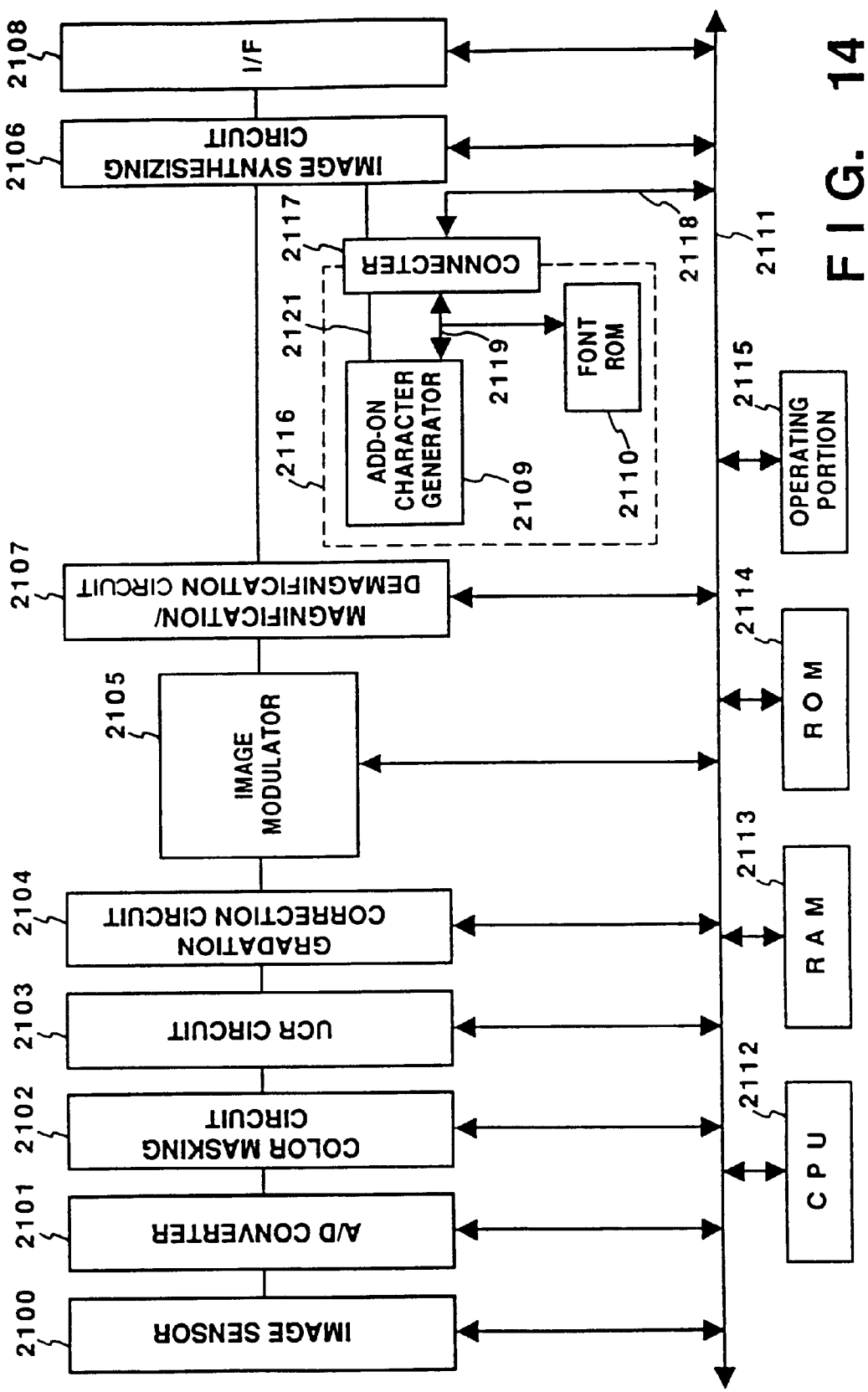
FIG. 14 is a block diagram of a digital color copying machine as a third embodiment of the present invention.
Figure 15:
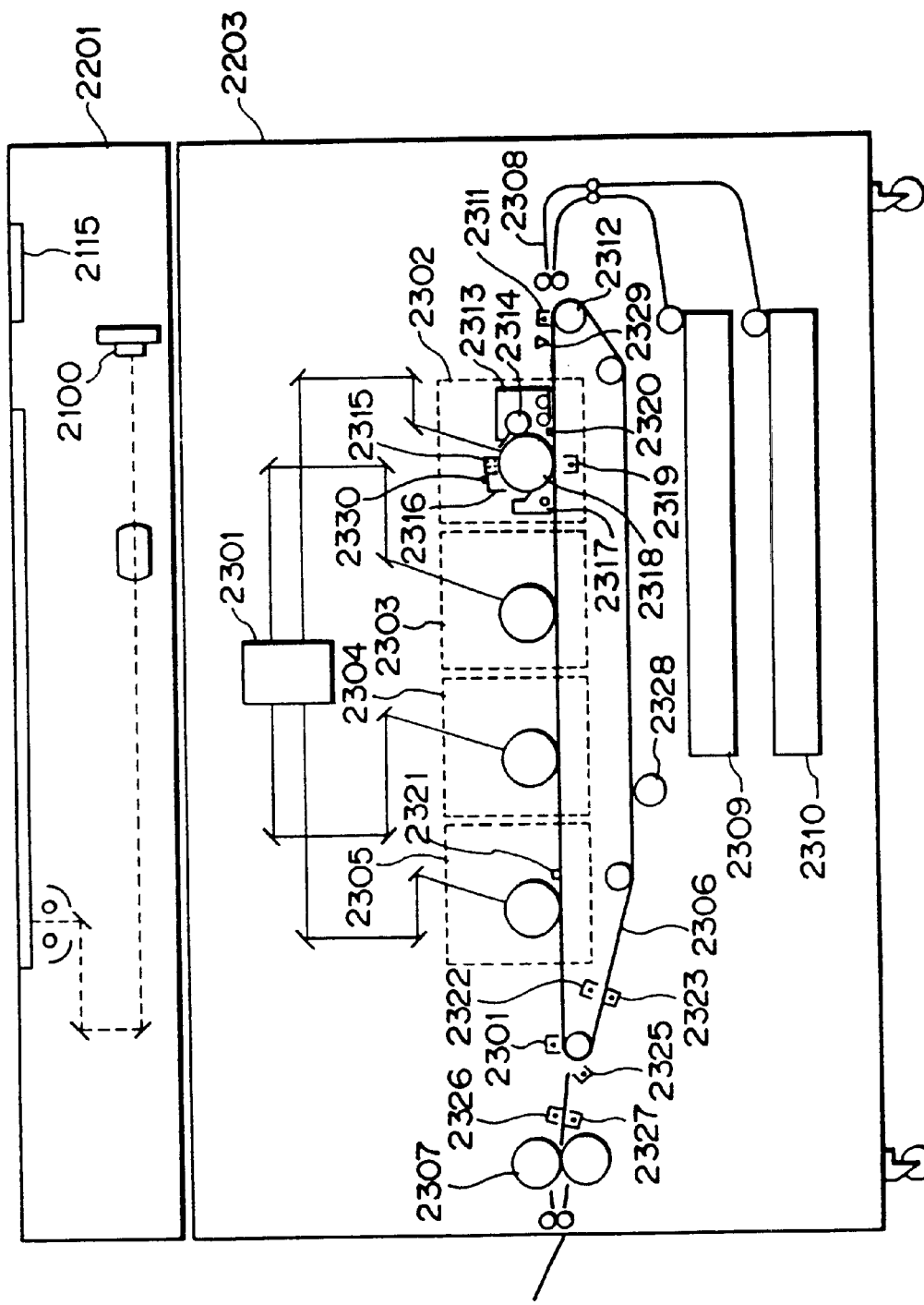
FIG. 15 is a sectional side elevational view of the digital color copying machine shown in FIG. 14.

FIG. 14 is a block diagram of a digital color copying machine as a third embodiment of the present invention, while FIG. 15 is a sectional side elevational view of the digital color copying machine. As will be seen from FIG. 15, the digital copying machine is mainly composed of a reader 2201 and a printer 2203.

<Construction of Reader>

Referring to FIG. 14, an image sensor 2100 is composed of, for example, CCD or the like which converts the read image information into R, G and B electric signals and delivers them in the form of analog image signals to an A/D converter 2101. The A/D converter 2101 converts the analog image signal into digital image signals and delivers the digital signals to a color masking circuit 2102.

An undercolor removing circuit 2103 removes grey components from the tri-color signal and substitutes the same with a black signal. A gradation correction circuit 2104 conducts various gradation processings including gamma correction, brightness correction, contrast correction and density conversion. An image modulator 2105 incorporates a region generating circuit (not shown). Various image processing operations are performed on the basis of the regions generated by this circuit. Enlargement and contraction are performed by a magnifying/de-magnifying circuit 2107.

An add-on board 2116 is connected to the body of the copying machine through a connector 2117. More specifically, the connector 2117 interconnects an image data BUS 2121, a signal line 2119 and the CPU BUS 2118. The signal line 2119 is always kept in active state by mans of an add-on character generator circuit 2109, and is set to positive state when the add-on board 2161 has been demounted from the copying machine. The add-on character generating circuit 2109 generates image signals on the basis of patterns stored in a font ROM 2110. This pattern is used as a code which indicates that the output image is a copy image but not the original image.

An image synthesizing circuit 2106 forms a synthesizes an image from the image signal derived from the original and the image signals from the add-on character generator circuit 2109. This synthesis is conducted in such a manner that, for example, the image from the add-on character generator 2109 is output at a predetermined density and a color tone. An effective anti-forgery function is obtained by outputting the image from the add-on character generator 2109 with a color tone and density, e.g., light yellow, which are not so noticeable to human eyes but are detectable without fail by a device such as a CCD. An interface (I/F) 2108 provides an interface between the reader 2201 and the printer 2203 (see FIG. 15) which functions as the image forming section. The interface 2108 provides communication between the reader 2202 and the printer 2203 for various serial signals, as well as image signals. A CPU 2112 connected to the system BUS 2111 controls the whole copying machine in accordance with control programs stored in the ROM 2114, while using a RAM 2113 as the work area. An operating portion 2115 is constructed so as to enable setting of copying conditions, i.e., combination of copying factors such as density, number of copies to be produced, magnification and so forth, for the image which is read by the image sensor 2100.

<Construction of Printer>

Referring to FIG. 15, a polygonal mirror scanner 2301 deflects a laser beam to scan the surface of a photosensitive drum 2318 with the laser beam. An image forming unit 2302 is a first-stage unit used for forming a magenta(M) image. Similar image forming units 2303, 2304 and 2305 are used for cyan (C), yellow (Y) and black (Bn) color images.

In the operation of the image forming unit 2302, a latent image is formed on the photosensitive drum 2318 by exposure to the laser beam, and a developing unit 2313 develops the latent image with a toner so as to form a toner image on the surface of the photosensitive drum 2318. Numeral 2314 denotes a sleeve which is incorporated in the developing unit 2313 and which applies a developing bias voltage to enable development of the latent image with the toner. A primary charger 2315 charges the photosensitive drum 2318 to a desired potential. The cleaner 2317 cleans the surface of the photosensitive drum 2318 after transfer of the image, while an auxiliary charger 2316 removes any residual charge remaining on the surface of the photosensitive drum 2318 after the cleaning by the cleaner 2317, thereby ensuring that the surface of the photosensitive drum 2318 is charged in good state by the primary charger 2315. A pre-exposure lamp 2330 is for removing residual charges from the photosensitive drum 2318. A transfer charger 2319 effects a discharge from the reverse side of a transfer belt 2316 so as to transfer the toner image from the photosensitive drum 2318 onto a transfer member.

Sheets of transfer members, e.g., paper sheets, are supplied from cassettes 2309, 2310. A paper feeder 2308 feed the transfer members from these cassettes 2309, 2310. An absorption charger 2311 causes the transfer member fed by the feeder 2308 to be absorbed by the transfer belt 2306. A transfer belt roller 2312 serves to drive the transfer belt 2306 and operates together with the absorption charger 2311 so as to enable the transfer belt 2306 to absorb and charge the transfer member.

A charge removing charger 2324 serves to facilitate the separation of the transfer member from the transfer belt 2306. A separation charger 2325 has a function for preventing any disturbance of the image which may be caused by a separation charging when the transfer member lees the transfer belt 2306. Pre-fixing chargers 2326, 2327 compensate for any insufficiency of toner on the transfer member after the separation, thereby preventing disturbance of the image. The transfer belt charge removing chargers 2322 and 2323 are used for removing charges from the transfer belt 2306, thereby to electrostatically initialize the transfer belt 2306. A belt cleaner 2328 removes contaminant from the transfer belt 2306.

The fixing unit 2307 thermally fixes the toner image on the transfer member which has been separated from the transfer belt 2306 and then passed through the pre-fixing chargers 2326 and 2327. A paper end sensor 2329 senses the leading end of the transfer member which has been fed by the feeder 2308 onto the transfer belt. A detection signal from the paper end sensor 2329 is delivered from the printer 2203 to the reader 2201 so as to be used as a sub-scan synchronizing signal when a video signal is fed from the reader 2201 to the printer 2203.

<Description of Copying Operation>

A description will now be given of the copying operation performed in this embodiment, particularly a process for preventing forgery by mans of the add-on board 2116 mounted on the copying machine.

Figure 16:
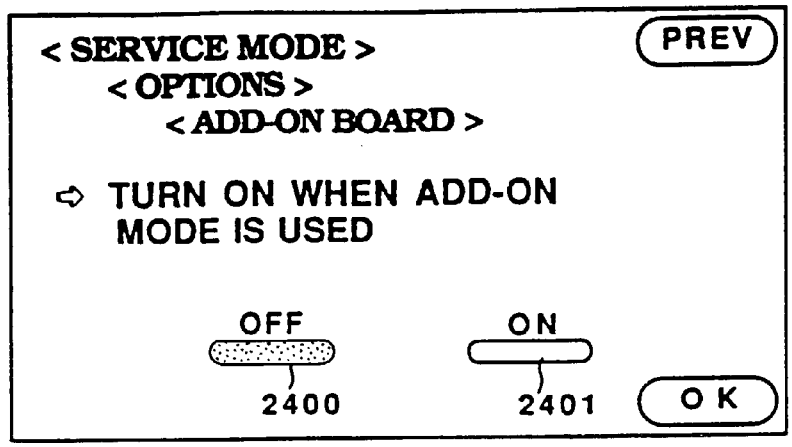
FIG. 16 is an illustration of a display which is produced when the copying machine of the third embodiment is used in add-on mode.
Figure 19:
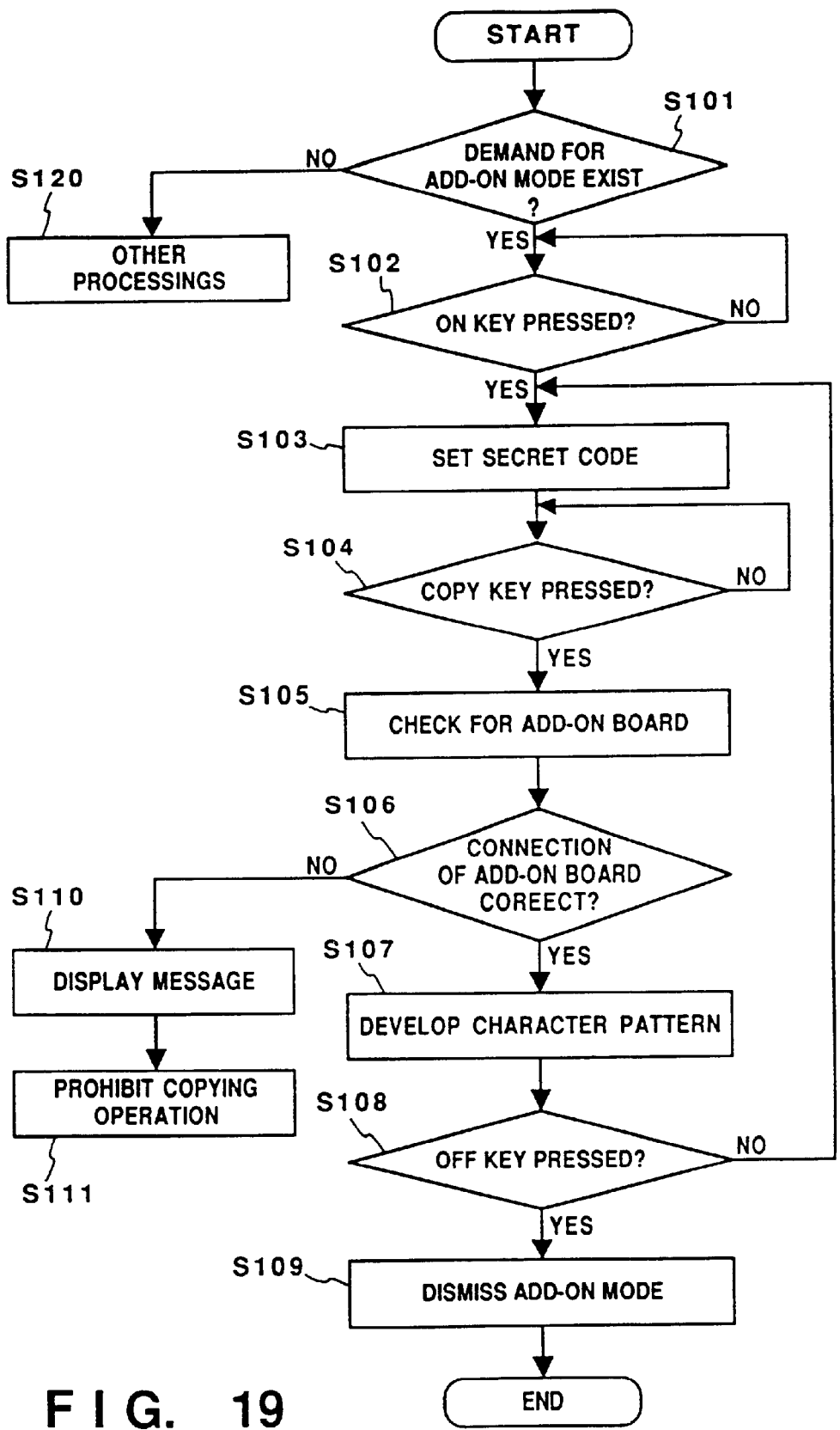
FIG. 19 is a flow chart illustrative of the copying process performed by the copying machine of the third embodiment.

FIG. 19 is a flow chart illustrative of the copying process performed by the copying machine of this embodiment. In Step S101, when there is a demand for add-on mode, i.e., when a specific operation is conducted by the operator in the manipulating portion 2115 shown in FIGS. 14 and 15, an add-on mode setting screen as shown in FIG. 16 is displayed on a liquid crystal display (touch panel display) which is provided in the manipulating portion. When there is no demand for add-on mode, another mode such as a copy stand-by state is displayed.

Figure 17:
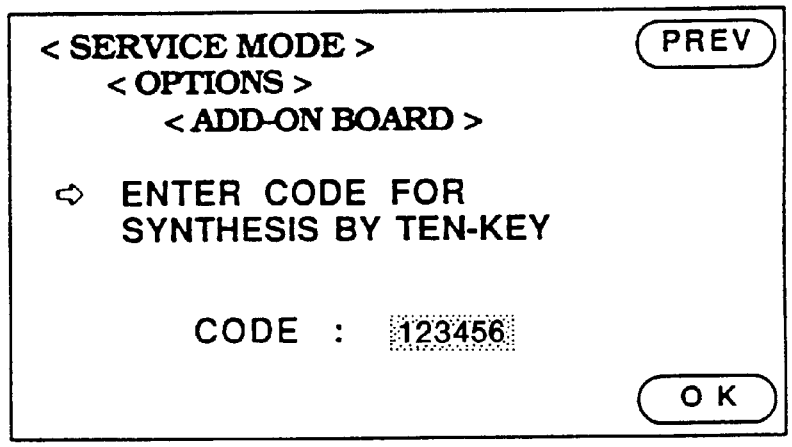
FIG. 17 is an illustration of a display of a code train which is set when the copying apparatus of the third embodiment is used in "secret" mode.

When add-on mode is used, the ON key on the screen shown in FIG. 16 is pressed down to set the machine in add-on mode (S102), and a "secret code" is set on a screen shown in FIG. 17 (S103). In the display shown in FIG. 17, the code train consists of numerals alone. This, however, is only illustrative and the code train can have various code systems, e.g., alpha-numeric, Japanese kana and Kanji, if the code input method is suitably changed. The input code train is stored in a memory section (not shown) which is a part of the RAM 2113. This input data is maintained even after the power of the copying machine is turned off, by virtue of a back-up function.

Figure 18:
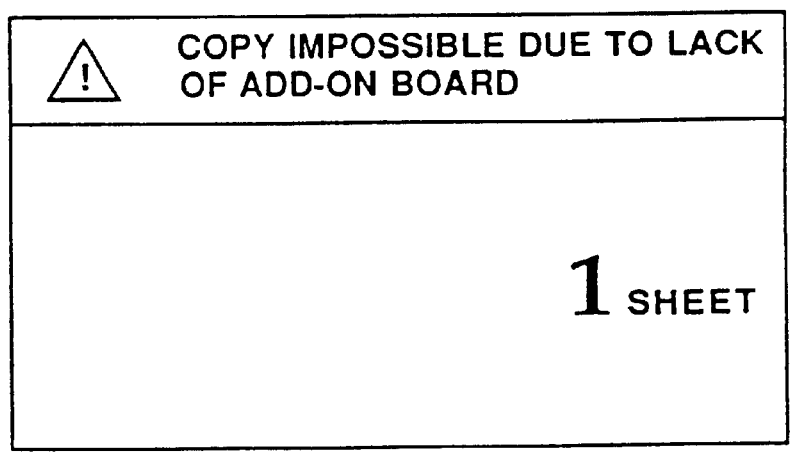
FIG. 18 is an illustration of an example of a warning display which is produced when an add-on board is not connected correctly.

When the machine has been set for add-on mode, a pressing of the copy key (not shown) on the manipulating portion 2115 (S104) triggers a check as to whether the add-on board 2116 has been correctly mounted on the body of the copying machine (S105). If the add-on board has been correctly connected, i.e., if the answer to the question posed in Step S106 is YES, the copying operation can be started, whereas, if the connection of the add-on board 2116 is not connected or wrongly connected, i.e., when the answer NO is given in Step S106, a warning message or an error message as shown in FIG. 18 is displayed on the display section (S110), whereby the copying operation is prohibited (S111).

Subsequently, when the add-on board has been connected correctly, the process proceeds to Step S107 in which the add-on character generating section 2109 develops character pattern stored in the font ROM 2110, in accordance with the code data which has been registered and stored in the memory section which is, in this case,the RAM 2113.

In a subsequent step S108, whether the OFF key has been pressed, i.e., whether the add-on mode has been dismissed, is determined. More specifically, an OFF key 2400 on the display as shown in FIG. 16 is pressed to dismiss the add-on mode (Step S109).

If Step S108 has proved that the instruction for dismissing the add-on mode has not been issued, the process returns to Step S103 to wait for the entry of a new "secret code".

As will be understood from the foregoing description, in this embodiment of the present invention, it is possible to form a synthetic output image in which a secret code as means for indicating that the printed output is a copy rather than an original is added to the output image. The secret code can be input and set optionally for independent copying machine by, for example, a service man or other administrator, so that the copying machine can be identified from the copy image produced by the machine.

Furthermore, the copying machine of this embodiment automatically prohibits copying operation when the source of the anti-forgery secret code has been separated from the copying machine. This effectively prevents any illegal copying operation during absence of the source of the secret code which may occur when, for example, the source of the secret code is being exchanged.

In this embodiment, when the copying machine has been set for operation in the add-on mode, the secret code is entered and set through the manipulating portion. This, however, is only illustrative and the arrangement may be such that the secret code is beforehand stored in the ROM 2114 on the copying machine and the character patterns stored in the font ROM are developed on the basis of the stored secret code.

A description will now be given of a first modification of the third embodiment.

Figure 20:
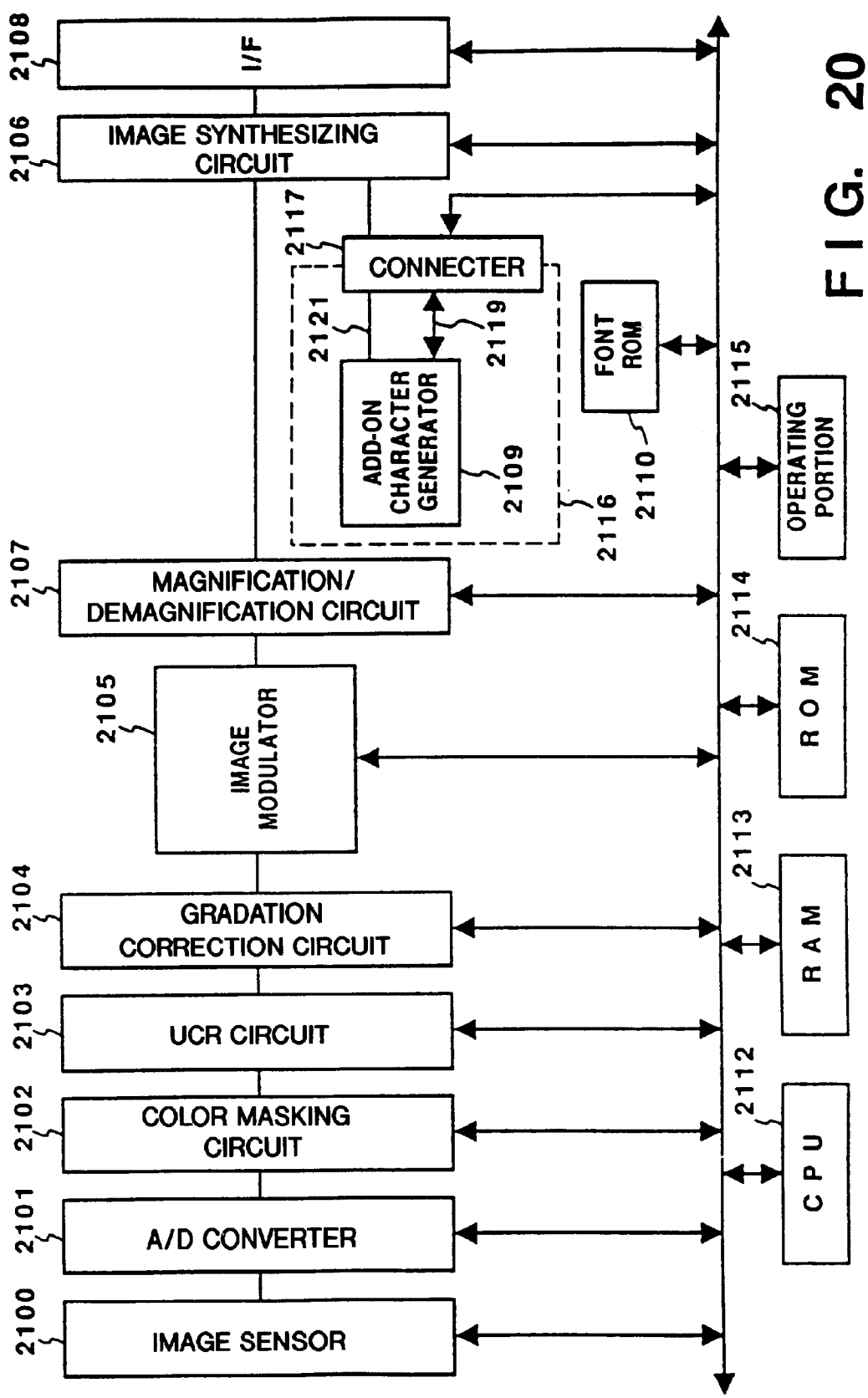
FIG. 20 is a block diagram of a first modification of the third embodiment, having a different form of connection of a font ROM.

FIG. 20 is a block diagram of a first modification of the digital color copying machine as the third embodiment.

In this modification, as will be seen from FIG. 20, the font ROM 2110 is separated from the add-on board 2116 and is connected to a system BUS 2111, and the add-on character generating section 2109 operates to develop character patterns stored in the font ROM 211, through the connector 2117.

In this modification, the "secret code" which is to be added to the output copy image is unchanged even when the add-on board 2116 is changed.

A description will now be given of a second modification of the third embodiment.

Figure 21:
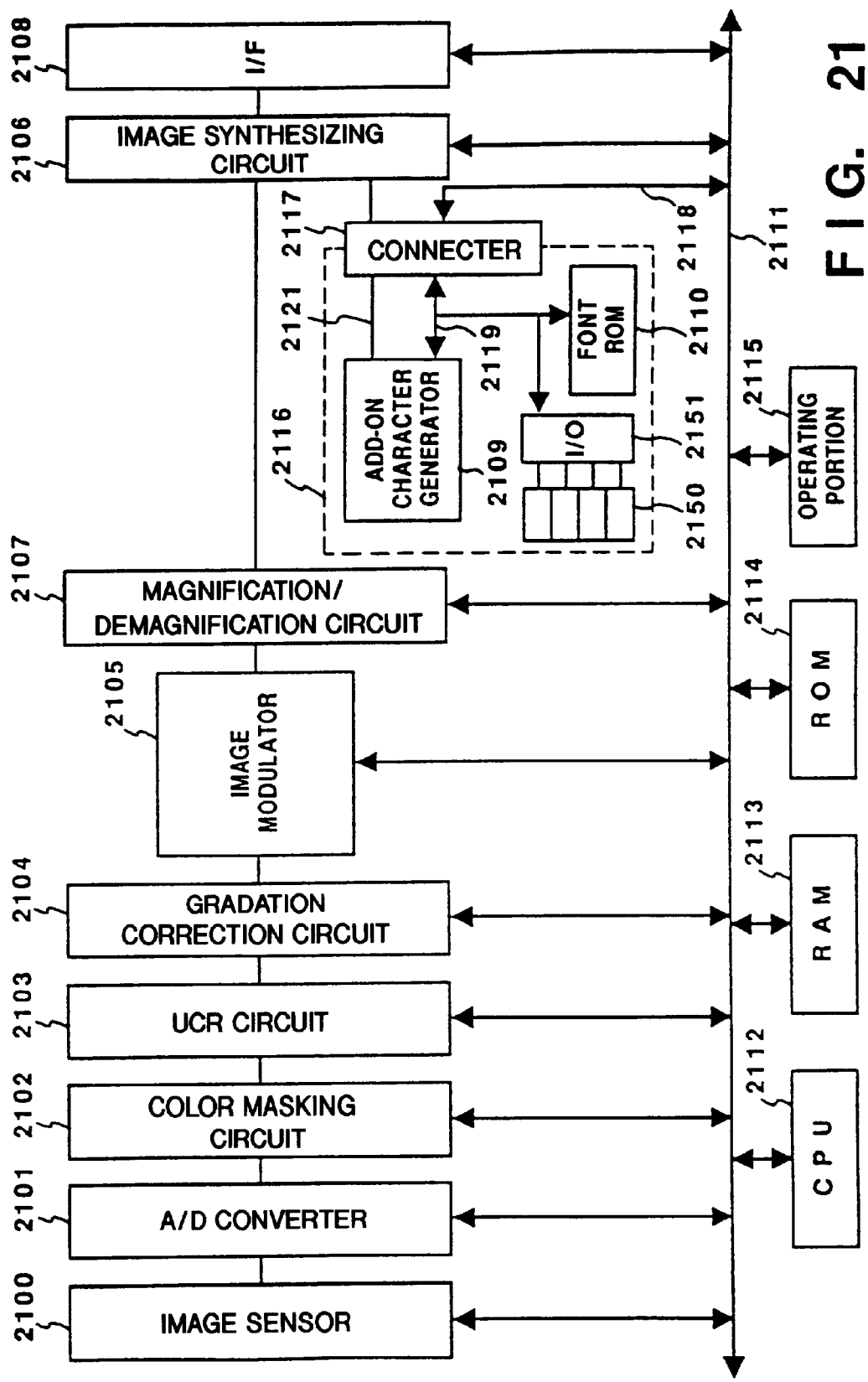
FIG. 21 is a block diagram of a second modification of the third embodiment, having a dip switch for enabling setting of the "secret code"

FIG. 21 is a block diagram of a second modification of the digital color copying machine as the third embodiment.

Thus, the third embodiment may be carried out such that the "secret code" is set by an arrangement as shown in FIG. 21. This copying machine has the same construction as that shown in FIG. 14, so that the same reference numerals are used to denote the same blocks as those appearing in FIG. 14, and description of such blocks is omitted.

In the modification shown in FIG. 21, the "secret code" is set by means of a dip switch 2150 which is provided on the add-on board 2116. The I/O 2151 provides an interface between the dip switch 2150 and the signal line 2119.

Figure 22:
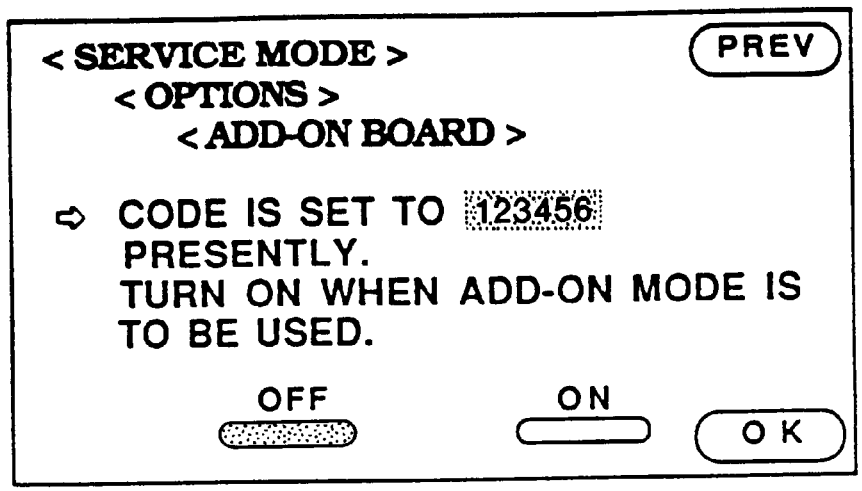
FIG. 22 is an illustration of a display which is presented when the modification shown in FIG. 21 is used in the add-on mode.

In this copying machine, an add-on mode setting display (see FIG. 22) displays the present code which has ben set through the dip switch 2150. In this case, however, the code system is composed of a train of numerals, since the code has been set through the dip switch. The notation of the code, however, is not limited. For instance, it is possible to use hexadecimal or decimal code.

As will be understood from the foregoing description, the third embodiment of the present invention enables that a pattern data which has been set optionally is combined with the read image, so as to enable identification of the copying machine by which a copy has ben produced.

In addition, copying operation is prohibited when there is no addition of pattern data, which prevents dismissal of the anti-forgery function which may otherwise be caused by absence of the pattern data.

Fourth Embodiment

A fourth embodiment of the present invention will be described with reference to the accompanying drawings.

Figure 23:
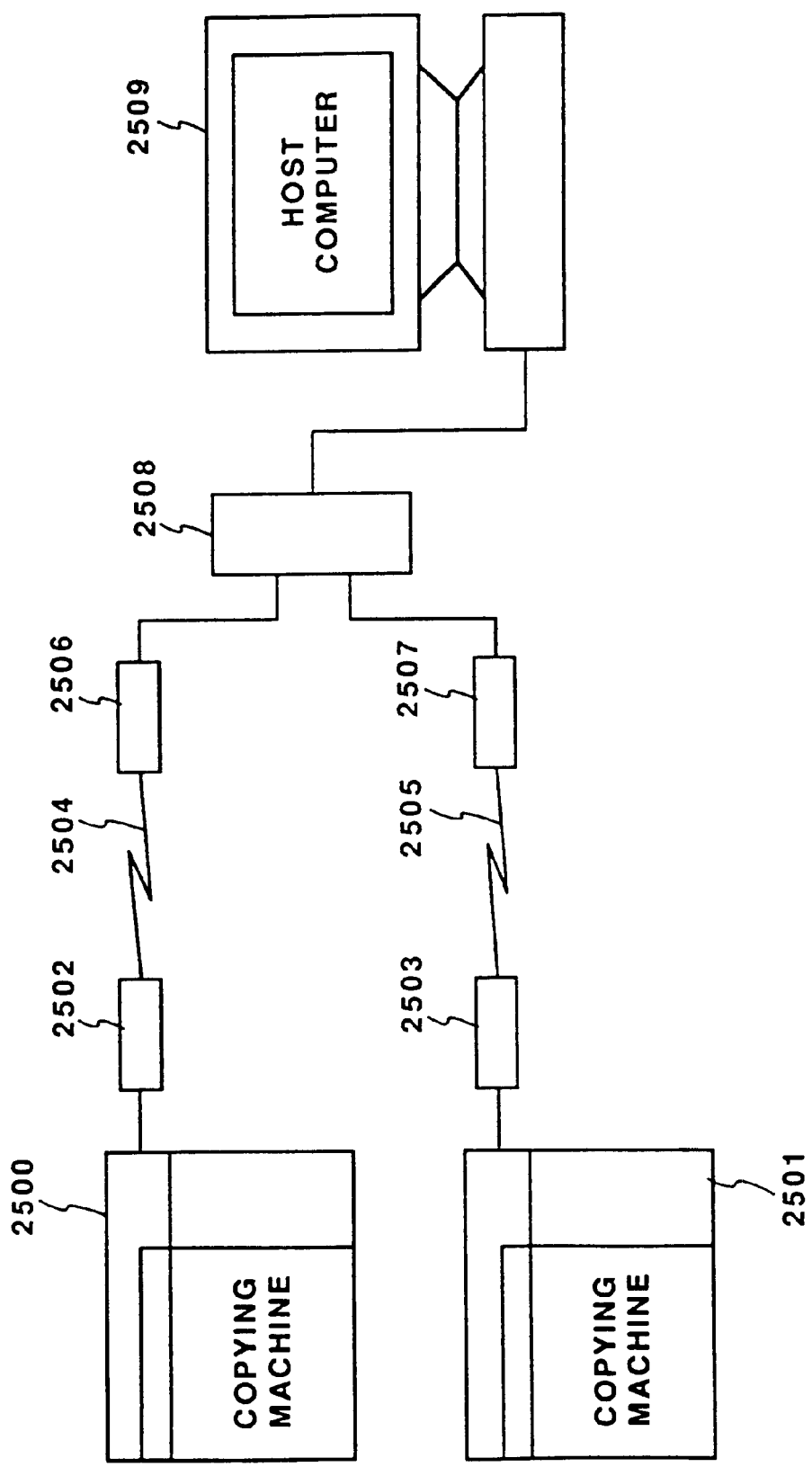
FIG. 23 is an illustration of a remote monitoring system used for a digital color copying machine which is a fourth embodiment of the present invention.

FIG. 23 is an illustration of a remote administration system for digital color copying machines as a fourth embodiment of the present invention. The blocks and mechanical construction of the copying machine used in this system are the same as those of the digital color copying machine of the third embodiment, so that description of omitted for these blocks and construction.

Referring to FIG. 23, digital color copying machines 2500 and 2501 are connected to a host computer 2509 which is the main control section of this system, through communication lines 2504, 2505 which may be telephone lines and via communication modems 2502, 2503, 2506, 2507. A communication controller 2508 administrate a plurality of communication lines so as to control the communication through these lines. It is assumed here that the above-mentioned two communication lines are under control of the communication controller 2508.

The host computer 2509 control the communication controller 2508 by an exclusive communication administration program, thereby administrating the copying machines 2500, 2501 which are connected to the communication controller 2508. The communication administration program monitors the states of the copying machines 2500, 2501 through the communication lines 2504, 2505, periodically, e.g., once very day at a predetermined time, and gives an inquiry to the copying machine or machines which use the add-on mode (this may be the same as that of the third embodiment) to confirm the "secret code" or "secret codes" stored in such copying machines.

By using the results of the periodical check and inquiry, it is possible to confirm whether the "secret code" is the same one as that registered in the host computer or a code which has been set at the machine side. It is thus possible to identify the copying machine by which a copy has been produced, while conducting a centralized administration of many copying machines.

Fifth Embodiment

A fifth embodiment which will be described hereinunder is to provide an effective anti-forgery measure, by the use of means for storing sections of decision information and communication means which enable communication of the stored sections of the decision information.

More specifically, the fifth embodiment is adapted for storing type of the specific original which is to be illegally copied and the user's ID code and for displaying and informing such information through, for example, a public telephone line. Furthermore, the fifth embodiment is adapted for storing deciding information of a plurality of input devices (copying machines) and for displaying and informing the information via a public telephone line or through a wireless communication system.

Although a digital color copying machine is specifically mentioned in the following description of the fifth embodiment, it is to be understood that the fifth embodiment can be applied to other types of copying machines equally well.

Figure 24:
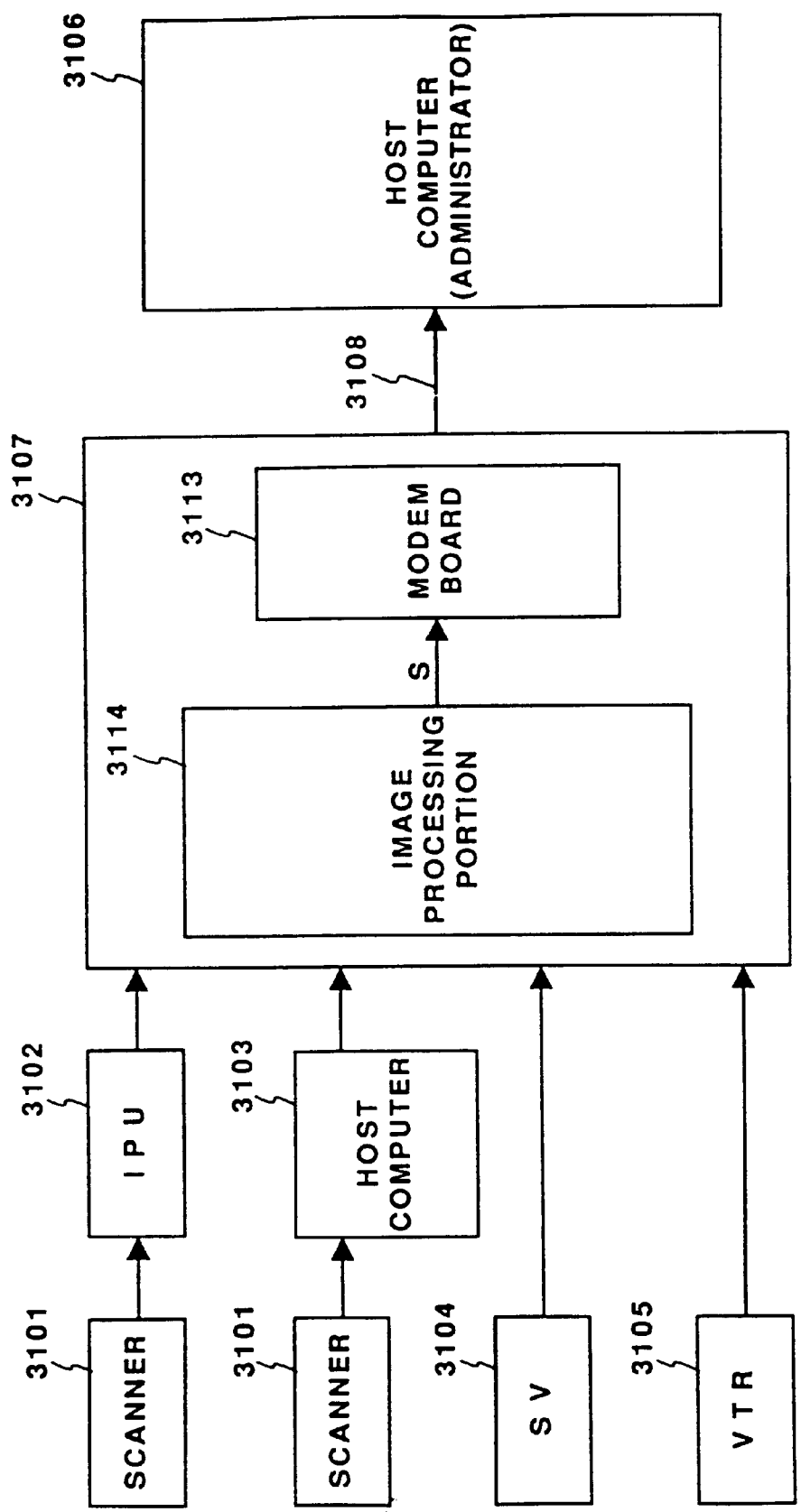
FIG. 24 is a block diagram of an image processing system incorporating an image processing apparatus as a fifth embodiment of the present invention.
Figure 25:
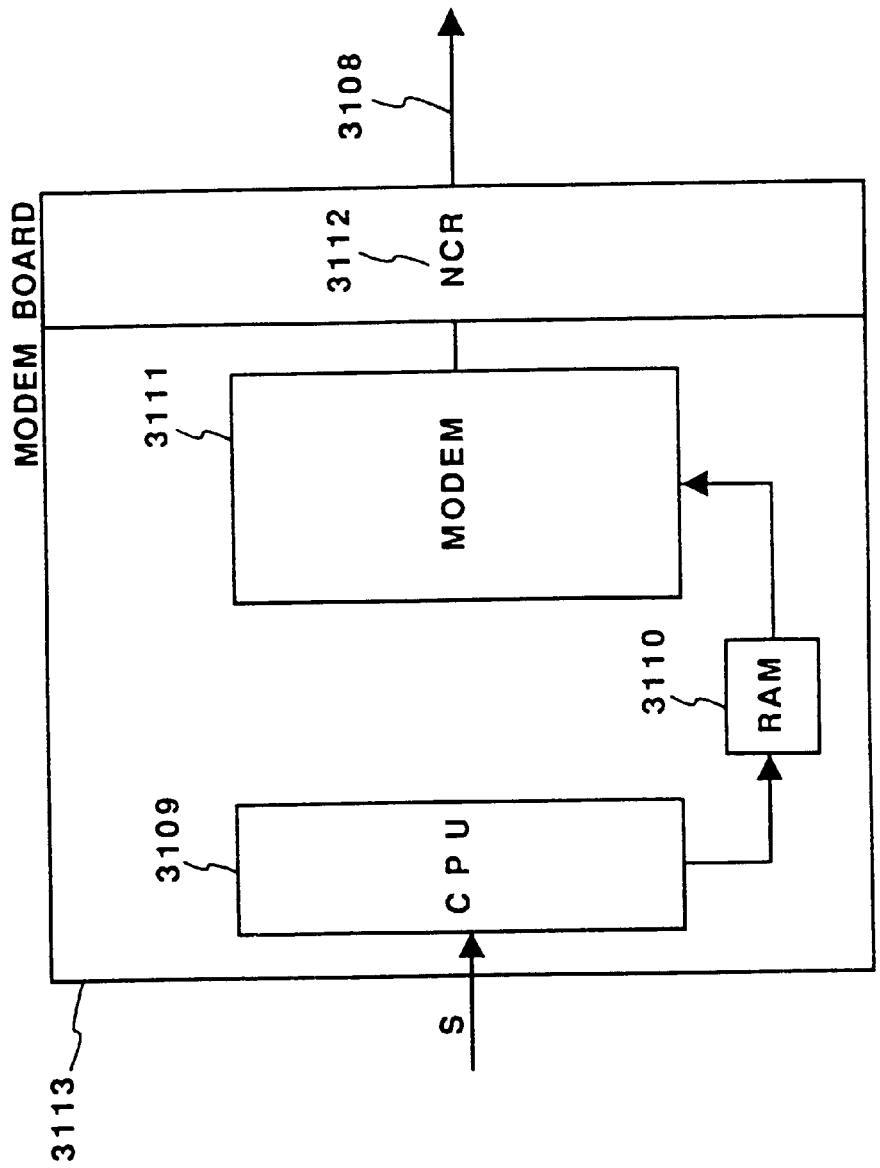
FIG. 25 is a block diagram of a modem board used in the fifth embodiment.
Figure 26:
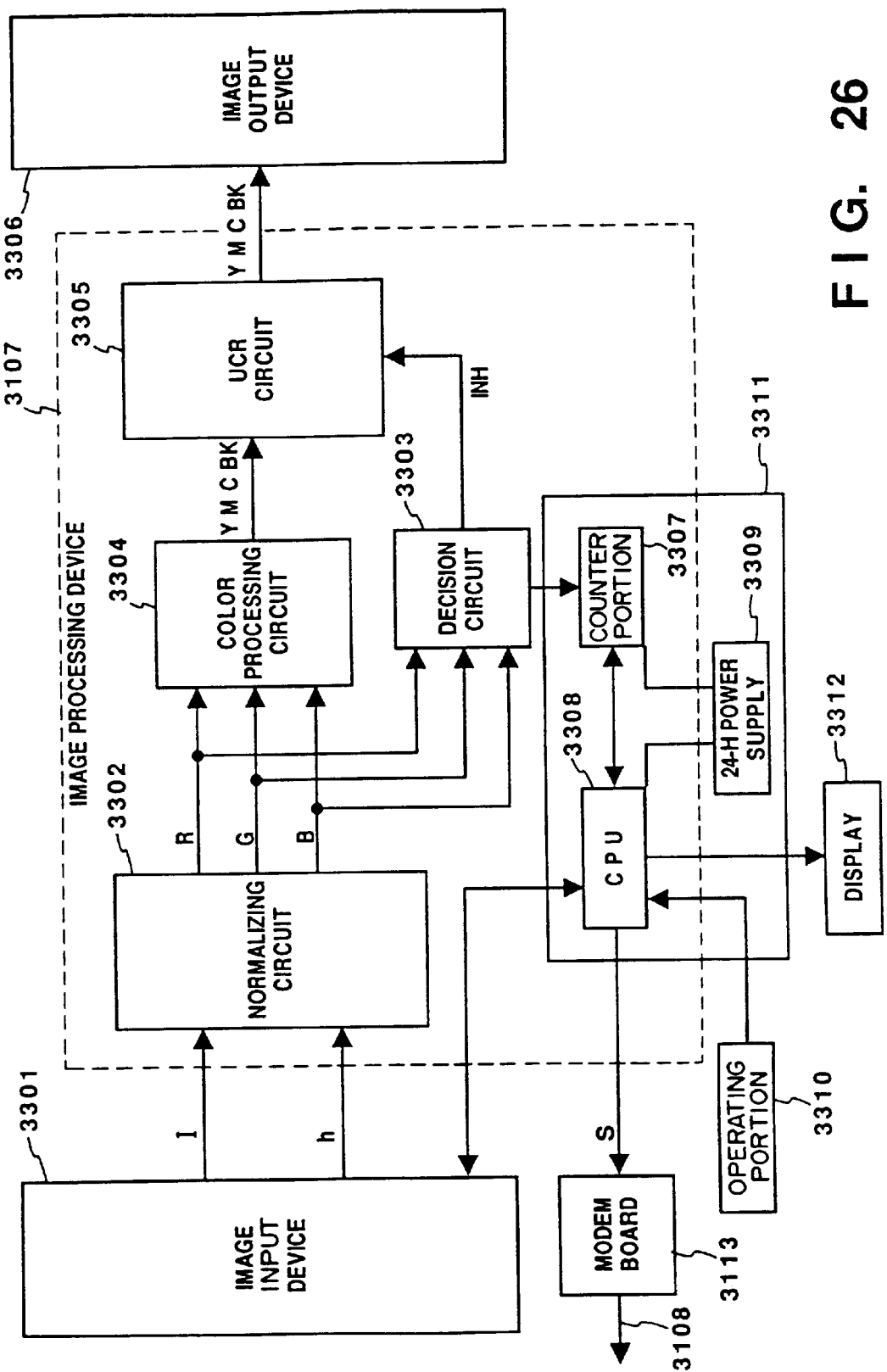
FIG. 26 is a block diagram of the image processing apparatus of the fifth embodiment.
Figure 27:
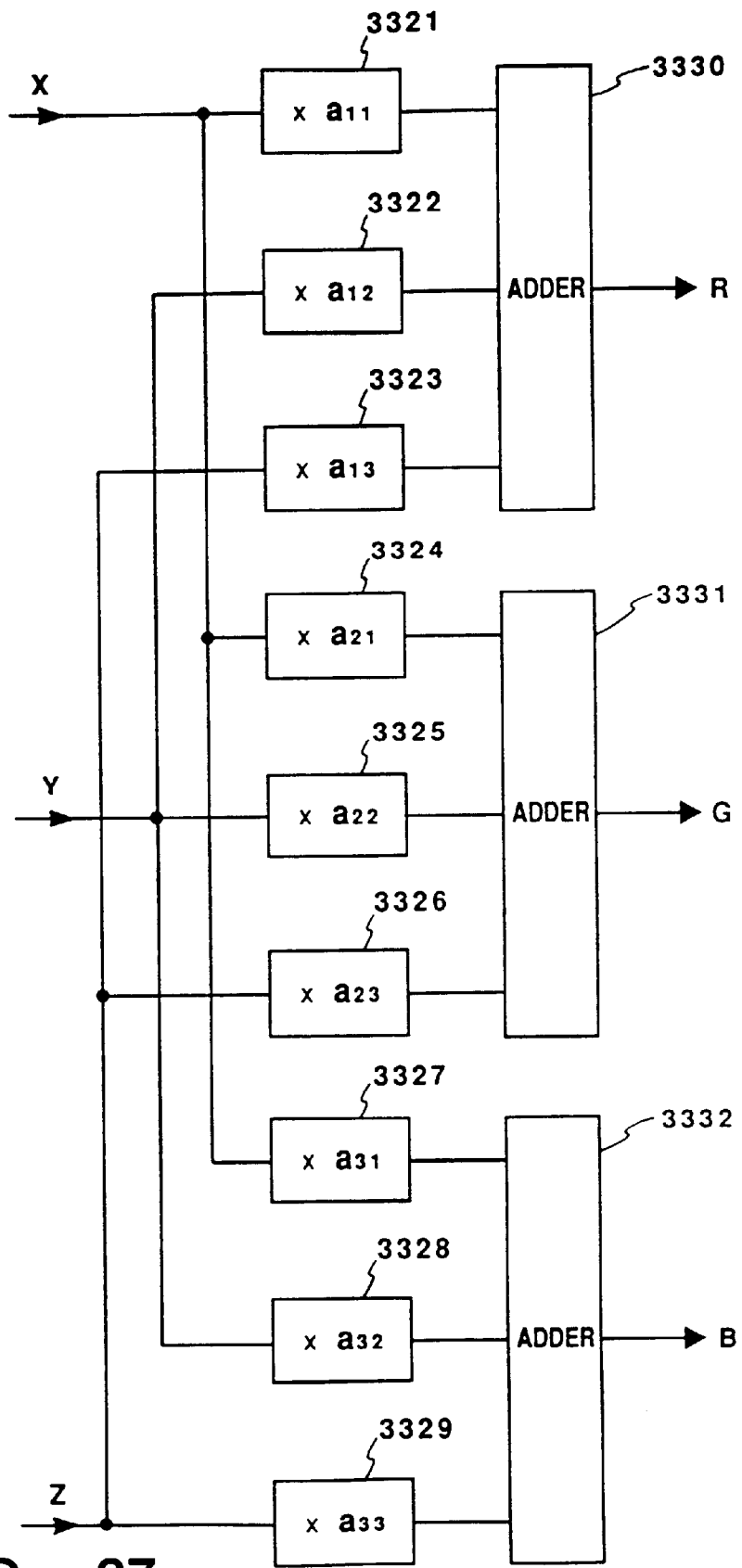
FIG. 27 is a block diagram of a normalizing circuit used in the fifth embodiment.
Figure 28:
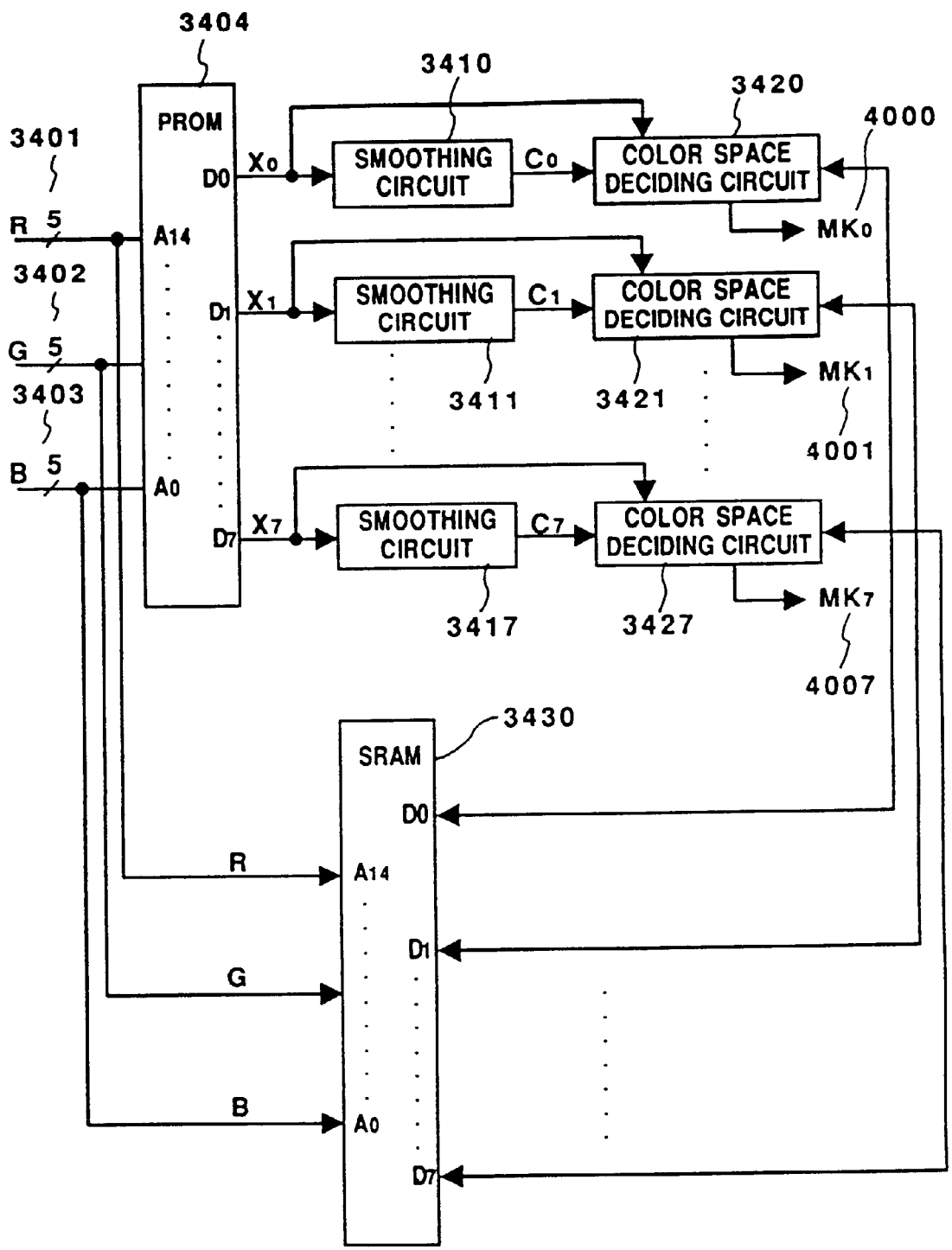
FIG. 28 is a block diagram of a decision circuit used in the fifth embodiment.

The description will refer to FIG. 24 which is a block diagram of an image processing system used in the fifth embodiment, FIG. 25 which is a block diagram of the modem board in the fifth embodiment, FIG. 26 which is a block diagram of an image processing apparatus as the fifth embodiment, FIG. 27 which is a block diagram of a normalizing circuit used in the fifth embodiment, and FIG. 28 which is a block diagram of decision circuit used in the fifth embodiment. Throughout these Figures, the same reference numerals are used to denote the same components or functions. The internal structure of the copying machine is not described because it is materially he same as that described before in Connection with the first embodiment with reference to FIG. 1.

Referring to FIG. 24, numeral 3101 denotes an image scanner, 3102 denotes an interface board, for storing read image data, 3103 denotes a host computer, 3104 denotes a still video camera (referred to as "SV"), 3105 denotes a video taperecorder (referred to as "VTR"), 3107 denotes an image processing device having a communication function, 3106 denotes a host computer which is placed at a central administration section, 3108 designates a public telephone line as an external communication line, 3113 denotes a modem board through which data is exchanged between the image processing apparatus and the external communication line, and S represents a decision signal which is transmitted from a memory circuit 3311 in an image processing section 3114.

Referring to FIG. 25, numeral 3109 designates a CPU which receives the decision signal S. The decision signal S is stored in a RAM 3110. The decision signal read from the RAM 3110 is sent to a MODEM 3111 and is delivered to the public telephone line 3108 as the communication path, by the operation of a communication controller (referred to as "NCR") 3112.

Referring now to FIG. 26, numeral 3301 denotes an image input device, 3302 denotes a normalizing circuit, 3303 denotes a circuit for discriminating a specific original, 3304 denotes a color processing circuit, 3305 denotes an undercolor removing circuit (referred to as "UCR"), 3306 denotes an image output device, 3307 denotes a counter portion, 3308 denotes a CPU, 3309 denotes a 24 h power supply as a back-up power source, 3310 denotes an operating portion, 3311 denotes a memory circuit and 3312 denotes a display section for displaying stored data.

Referring to FIG. 27, numerals 3301 to 3309 denote multipliers, while 3310 to 3312 denote adders.

As a result of operations of the circuits shown in FIGS. 1, 24, 25, 26 and 27, a color image is read by the image scanner 3101 and is color-separated into digital images of three colors R, G and B. The thus obtained image signals are delivered to the IPU 3102 and to a device having an image processing function, e.g., a host computer 3103. The IPU 3102 and the host computer 3103 perform ordinary image processing operations such as logarithmic conversion, masking computation and CUR. Consequently, the R, G and B image signals are converted into Y, M, C and Bk signals. In particular, the host computer 3103 can handle the image in various color spaces such as XYZ space and L*a*b* space. Therefore, the host computer 3103 can deliver signals of all type of color spaces to the image processing apparatus 3107. The R,G and B signals which are input from SV 3104, VTR 3105 and the image scanner 3101 are to be considered to be of different types of signals when read with different spectral characteristic. Thus, the image processing apparatus 3107 receives image data of various color spaces. The image processing apparatus 3104 has a construction which is the same as that shown in FIG. 2. The signal delivered from the image input device 3301 includes an 8-bit image signal I and an additional information signal h. The additional information signal h is a signal indicating the color space to which the input image signal belongs, and is used also as a matrix for a later-mentioned conversion. These input signals are delivered to the normalizing circuit 3302 which, in accordance with the additional information signal h, converts the input image signal I into a color space of a color taste matching data which is stored beforehand in the decision circuit 3303. It is assumed here that the aforementioned matching data is R, G and B signals according to NTSC (National Television System Committee) system. In such a case, the R, G and B signals can be converted into three stimulus values X, Y and Z of XYZ color specification system, in accordance with the following formula (2). These three stimulus values X, Y and Z are further converted into L*, a* and b* values of L*a*b* color specification system, in accordance with the following formula (3):

$$\begin{bmatrix} X \\ Y \\ Z \end{bmatrix} = \begin{bmatrix} 0.6067 & 0.1736 & 0.2001 \\ 0.2988 & 0.5868 & 0.1144 \\ 0.0 & 0.0661 & 1.1150 \end{bmatrix} \begin{bmatrix} R \\ G \\ B \end{bmatrix} \quad (2)$$

$$L^* = 116(Y/Y_0)^{1/3} - 16$$

$$a^* = 504.3[(X/X_0)^{1/3} - (Z/Z0)^{1/3}]$$

$$b^* = 201.7[(Y/Y_0)^{1/3} - (Z/Z0)^{1/3}] (X_0, Y_0, Z_0 = \text{CONST}) \quad (3)$$

The image signal I and the additional information signal h which are output from the image input device 3301 are delivered to the normalizing circuit 3302. The construction of the normalizing circuit 3302 is shown in FIG. 26. When the image signal I is given in the form of three stimulus values X, Y and Z of the XYZ color specification system, these values X, Y and Z are delivered to the multipliers 3321 to 3329. Values $a_{11}$ to $a_{33}$ are written in the multipliers from the additional information signal h. The outputs from the multipliers 3321 to 3329 are delivered to the adders 3330 to 3332 as illustrated and are output from these adders as signals R, G and B. These conversions are expressed by the following matrix:

$$\begin{bmatrix} R \\ G \\ B \end{bmatrix} = \begin{bmatrix} a11 & a12 & a13 \\ a21 & a22 & a23 \\ a31 & a32 & a33 \end{bmatrix} \begin{bmatrix} X \\ Y \\ Z \end{bmatrix} \quad (4)$$

The 3×3 matrix which forms the right side of the formula (4) is an inverse matrix of the matrix of coefficients which are used in the formula for converting R,G,B signals under NTSC system into three stimulus values X,Y,Z of the XYZ color specification system. Thus, when the signals are of different color spaces or when the same color space is used but distortion of axes has been caused due to influence of spectral characteristics of the reading system, coefficients for conversion into standard signals such s R,G,B signals under NTSC system are input as the additional information together with the image signals, thus normalizing the input signals, whereby the signals are converted into those of a predetermined color space to which the matching data stored in the decision circuit 3303 belongs.

The output from the normalizing circuit is divided into two sub-systems: one is given to the color processing circuit 3304, while the other is sent to the decision circuit 3303. The R,G and B signals delivered to the color processing circuit 3304 are subjected to processings such as logarithmic conversion, masking computation and UCR, and are delivered in the form of screen-sequential signals Y, M, C and Bk into the UCR circuit 3305. Meanwhile, the signals delivered to the decision circuit 3303 is checked for presence of image of any registered specific original in the input signal, by a method which will be described later. Symbol INH represents the result of the decision. When the image of any registered specific original is found, 1 is delivered as the decision result INH to the UCR circuit 3305, whereas, when no such image is found, 0 is delivered to the UCR circuit 3305. When decision result INH is "1", the undercolor removing circuit 3305 delivers the image signal to the image output device 3306 with the Bk portion changed into solid black image. At the same time, signals are delivered to the memory circuit 3311 which indicate the degree of probability of decision (probability of presence of the image of a specific original), type of the candidate specific original, ID number of the user or operator, and so forth.

In the memory circuit 3311, a signal S from the CPU 3308 is delivered to the MODEM board 33113 and is further transmitted therefrom to the host computer 3106 through the public telephone line 3108. Conversely, when the decision result INH is "0", the image processing process is set to "thru" mode so that the output from the color processing circuit 3304 is delivered to the image output device 3306 which produces a hard copy by a printing technique such as electrophotography, thermal transfer or ink jet printing.

Thus, in this embodiment, a hard copy true to the original cannot be produced when the read image contains an image of any registered specific original.

Figure 33:
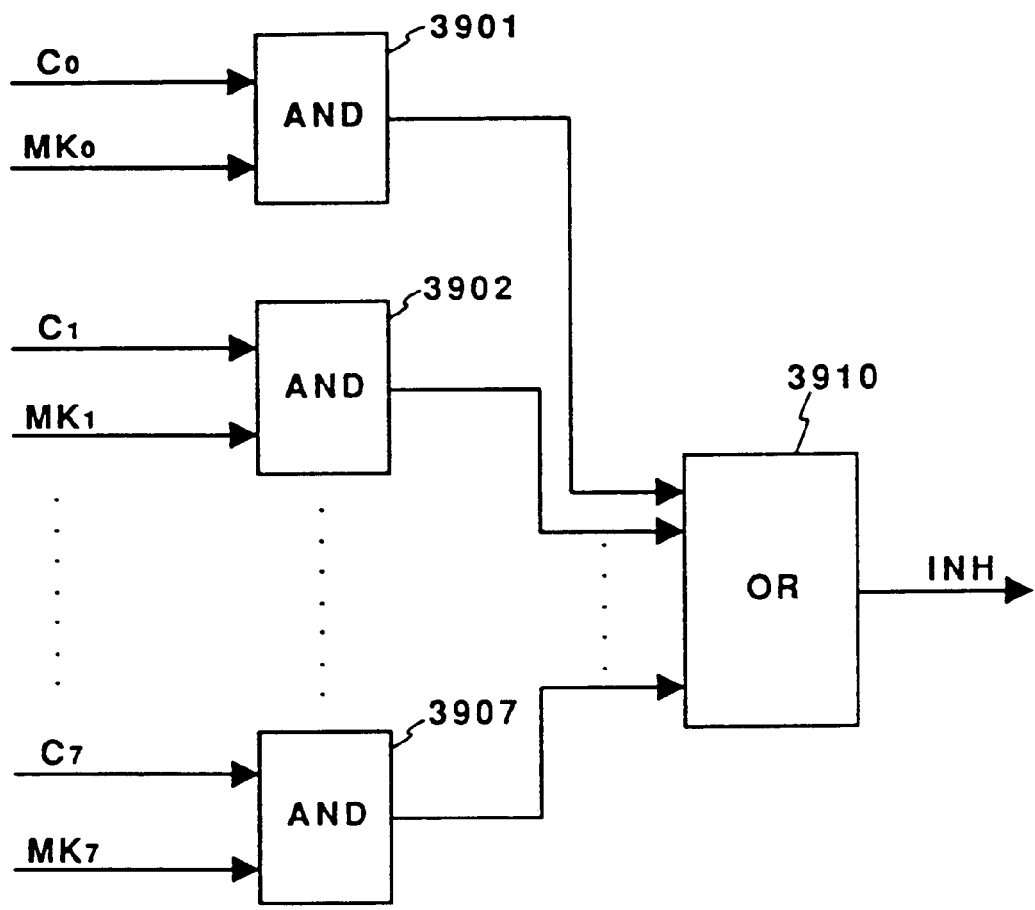
FIG. 33 is an illustration of the construction of a decision signal generating circuit used in the fifth embodiment.

A description will now be given of the operation of the decision circuit 3303. The decision circuit 3303 is composed of a color space matching circuit (FIG. 28) and a decision signal generating circuit (FIG. 33). Thus, the construction of the decision circuit 3303 is as shown in FIGS. 28 and 33.

Figure 30:
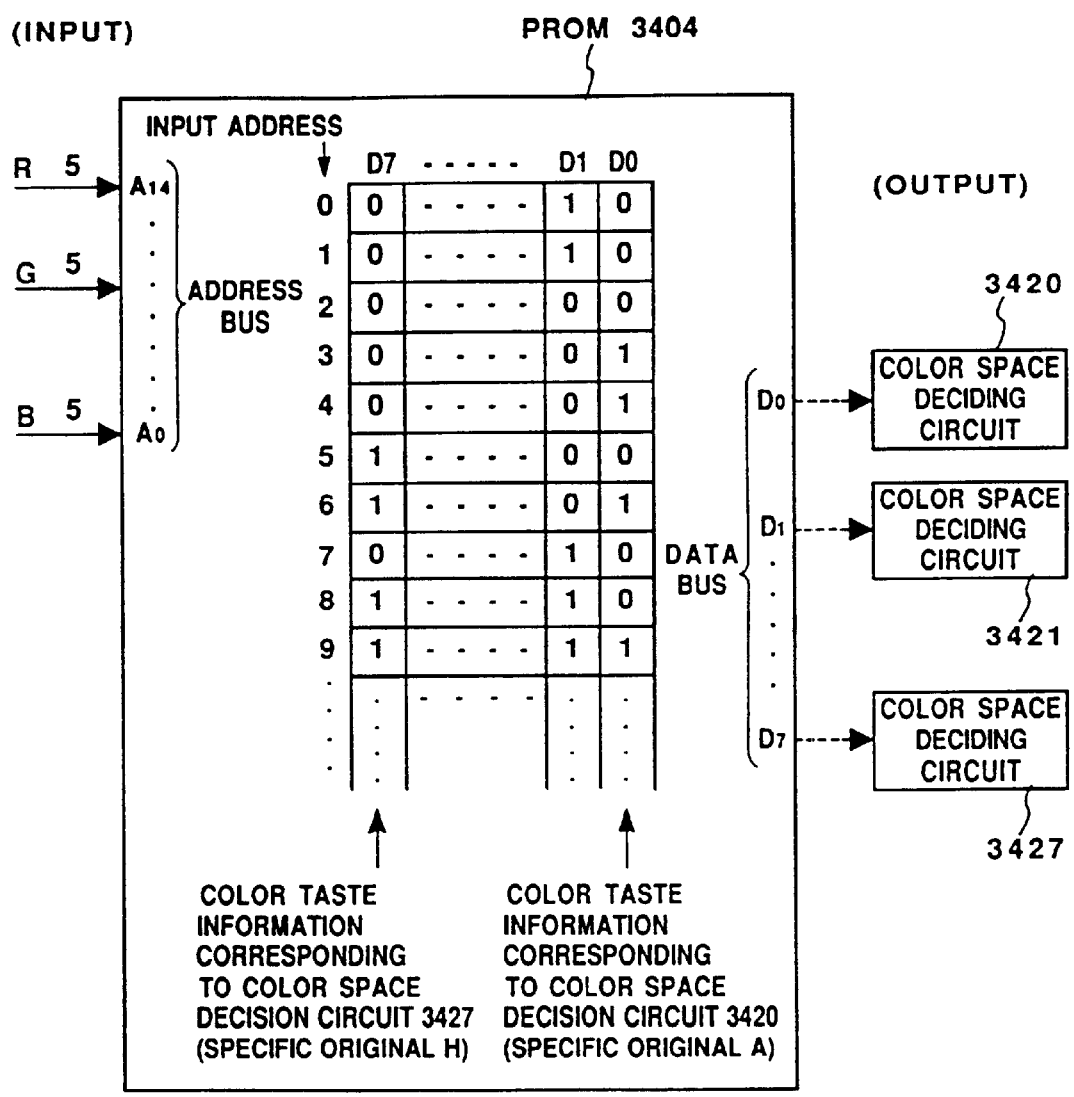
FIG. 30 is an illustration of the content of a programmable ROM used in the fifth embodiment.

Referring to FIGS. 28 and 30, numeral 3401 designates data of significant 5 bits in the 8-bit R (red) signal derived from the normalizing circuit 3302. Similarly, 3402 and 3403 denote significant 5-bit data of G (green) and B (blue) signals. Numeral 3404 designates a ROM (Read Only Memory) which stores information concerning the color taste of each of a plurality of specific originals. The aforementioned R, G and B signals are input to the addresses $A_0$ to $A_{14}$, and decision signals indicative of whether these R,G and B signals conform with the color taste of specific originals are delivered as data $D_0$ to $D_7$.

A PROM 3404 stores information concerning color tastes of specific originals in the form of R, G and B signals following NTSC system. When the input R,G and B signals conform with the color tastes of specific originals, "1" is output as the data $D_0$ to $D_7$, otherwise "0" is delivered to the same. These outputs $D_0$ to $D_7$ are delivered for each of the color space decision circuits 3420 to 3427.

FIG. 30 illustrates the relationships between the data of a plurality of specific originals stored in the PROM 3404 and bit positions in the PROM 3404. It will be seen from this Figure that decision result information (0 or 1) concerning 8 types of specific originals (originals A to H) are delivered in a bit-parallel manner from the outputs $D_0$ to $D_7$.

Numerals 3410 to 3417 denote smoothing circuits which perform smoothing operations shown in FIGS. 30 and 31 on the color taste deciding signals $X_0$ to $X_7$. Numerals 3901 to 3907 indicate AND gates, while 3910 designates an OR circuit.

FIG. 31 is a block diagram of each of the smoothing circuits 3410 to 3417. In this Figure, numeral 3701, 3702 denote multipliers, 3703 denotes an adder, 3704 denotes a flip-flop and 3705 denotes a comparator.

FIG. 32 illustrates the relationship between the input Xn and the output value Yn obtained through the smoothing operation. It will be seen that the value of the output Yn increases when "1" is successively input as the inputs Xn. Conversely, the value of the output Yn progressively decreases when Xn is 0. When the R, G and B signals input to the apparatus conform with the color tastes of one of the registered originals, "1" is successively input as the inputs Xn so that the output value Yn increases until it exceeds a predetermined level.

The outputs $C_0$ to $C_7$ of the smoothing circuits are obtained by binarizing the output Yn with a predetermined threshold value. Thus, "1" is successively delivered from the outputs $C_0$ to $C_7$ only when successive pixels conform with the color tastes of one of the registered specific originals, whereby the reliability of decision is enhanced.

Numerals 3420 to 3427 denote color space decision circuits which compute, in real time, the degrees of similarity between the input color signals and the data of specific originals in terms of the RGB color space values. The degrees of similarity are output in the forms of decision signals $MK_0$ to $MK_7$.

Figure 29:
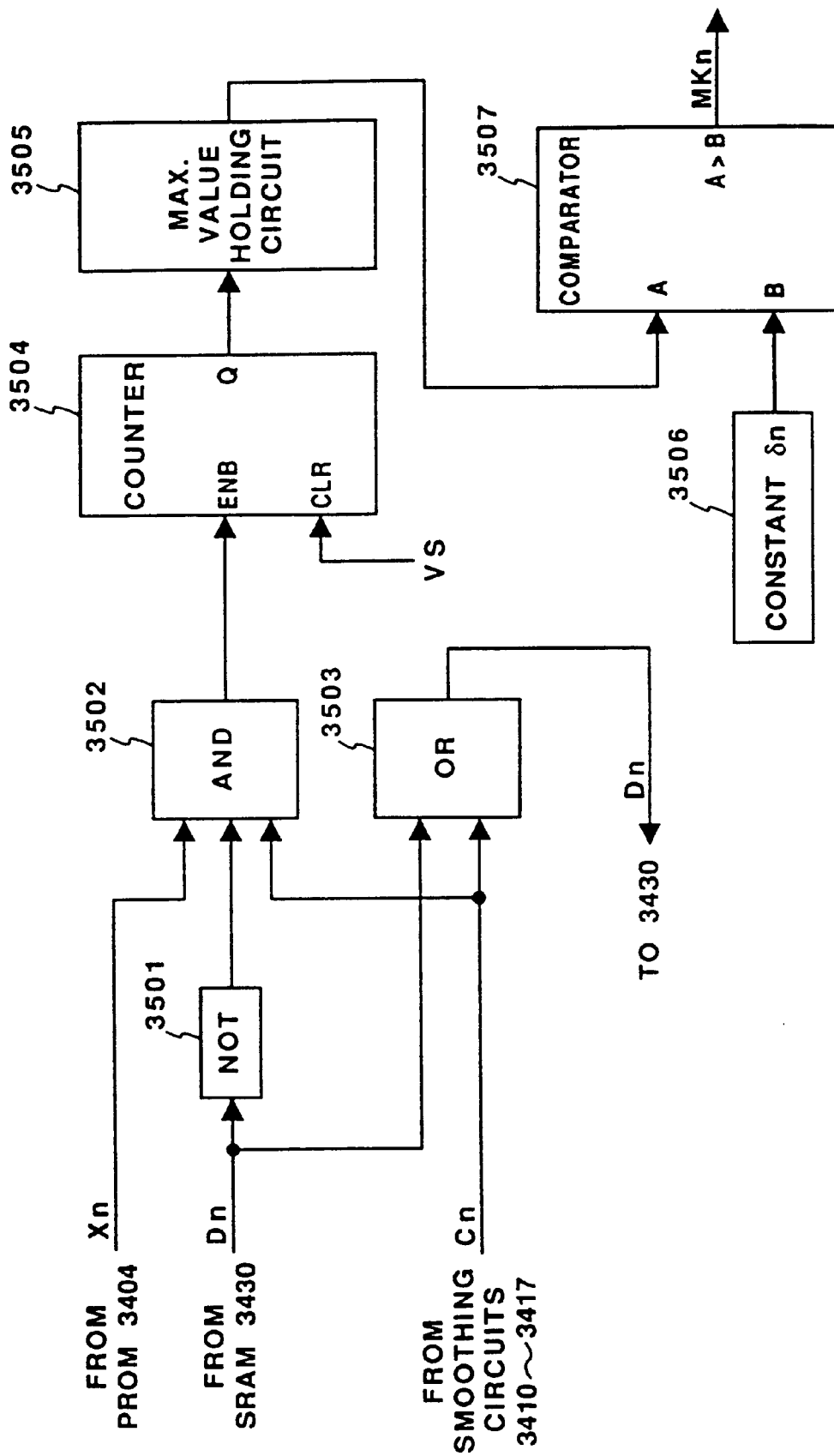
FIG. 29 is a block diagram of a color space decision circuit used in the fifth embodiment.

FIG. 29 is a block diagram of one of the color space decision circuits 3420 to 3427. In this Figure, numeral 3501 denotes a NOT circuit, 3502 denotes an AND circuit, 3503 denotes an OR circuit, 3504 denotes a counter, 3505 denotes a maximum value holding circuit, 3506 denotes a register and 3507 denotes a comparator.

The OR gate 3503 computes OR of the data Dn from the SRAM 3430 and the signal Cn derived from the smoothing circuit, and the result of the computation is written again in the SRAM 3430 as the data Dn.

Meanwhile, the AND gate 3502 computes AND of the data Dn, signal Cn and the data Xn from the PROM 3404. The AND gate 3502 produces an output "1" only when the data Dn is being changed from "0" to "1" while the data Xn and Cn are "1". The counter starts up-counting in response to the output "1" from the AND gate 3502. This counter 3504 is cleared by each rise of the sub-scan section signal VS. The maximum value of the counter output which is the output from the maximum value holding circuit 3505 is compared by the comparator 3507 with a predetermined constant δn. When the maximum value exceeds this constant value δn, the comparator 3507 produces an output "1" as the signal MKn, otherwise it produces "0" as the signal MKn. The constant value δn is set as the percentage (%) S of the volume occupied by the color taste of the specific original in the color space.

More specifically, representing the number 1 in the PROM 3404 shown in FIG. 29 by Vorg, Vorg is determined by the following formula (5):

$$\delta n = vorg \times S/100 \quad (5)$$

The value S in the formula shown above is determined such that the decision signal MKn becomes "1" when about half of a specific original laced on the document table of the copying machine has been read.

As a result o the processing described above, the color space similarity decision signals $MK_0$ to $MK_7$ are set to "1" when the input image data substantially conforms with data of one of the specific documents in terms of values on the RGB tertiary color space.

FIG. 33 shows the construction of the aforementioned decision signal generating circuit.

When input image data is determined to conform with the data of any one of the registered specific originals stored in the PROM 3404, the decision signal INH is changed into "1" in real time and is fed back to the undercolor removing circuit 205 without delay.

In the foregoing description of the fifth embodiment, the image input device 3301 delivers X, Y and Z signals of XYZ color specification system, and these signals are converted into R,G and B signals under NTSC system. This, however, is only illustrative and input image signals of any color spaces, such as M, Y, C and Bk color signals or L*a*b* color space signals can be converted into color signals of the same color space as the matching data stored in the decision circuit 3303 by the addition of the additional information, thereby to prohibit copying of any original which should not copied from legal point of view.

Figure 39:
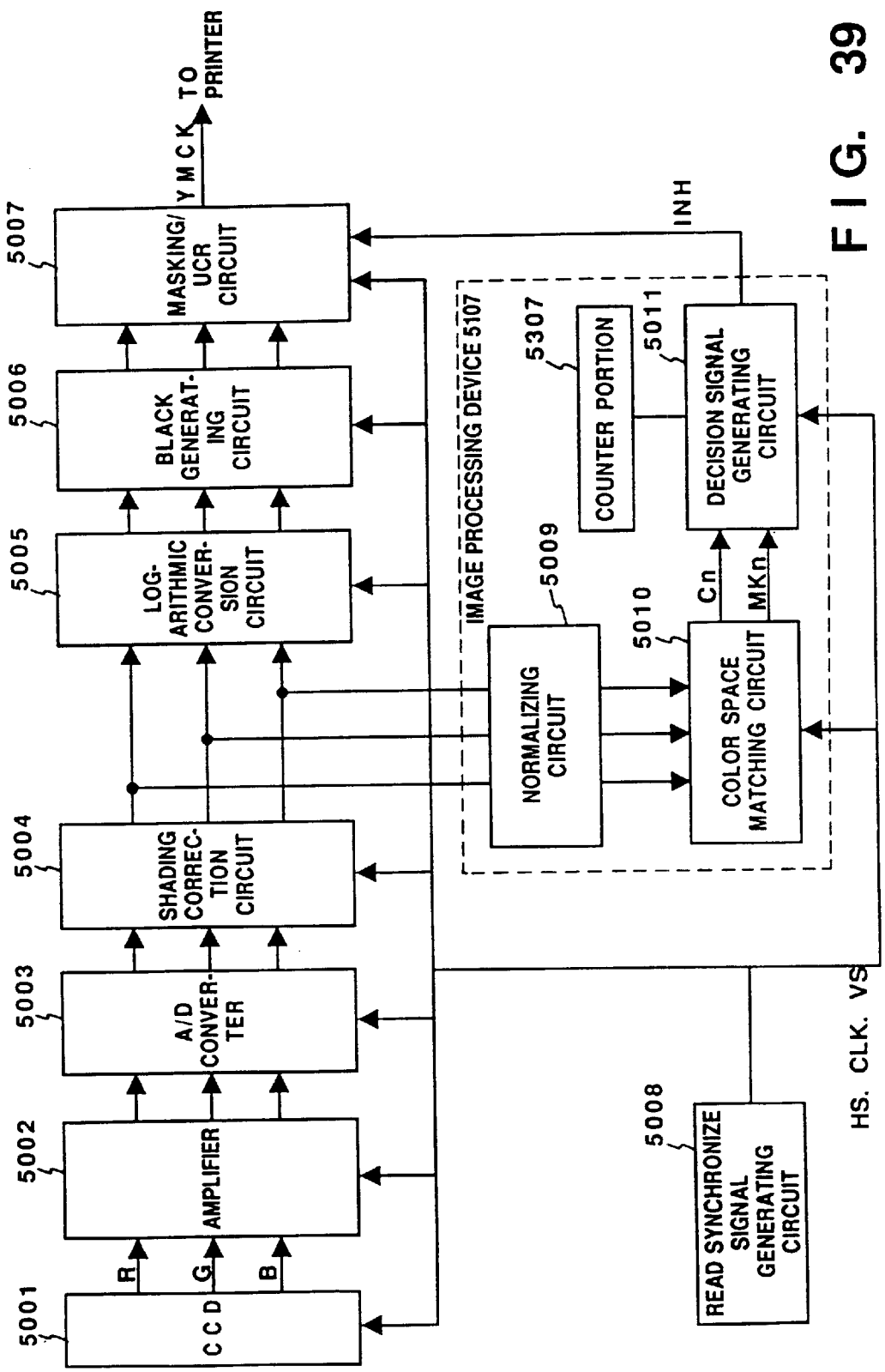
FIG. 39 is a block diagram of the copying machine using the fifth embodiment.

FIG. 39 is a block diagram of the copying machine used in this embodiment. A CCD color sensor 5001 reads, in a line-by-line fashion, a color original which is not shown, and delivers the read data to an analog amplifier 5002. An A/D converter 5003 sample-holds the analog output of the analog amplifier 5002 and converts the same into digital data. A shading correction circuit 5004 effects a correction for any gradient of brightness due to position of reading of the original, as well as for any unevenness of sensitivity of the CCD sensor. Numerals 5005. 5006 and 5007 denote, respectively, a logarithmic conversion circuit, a black component extraction circuit and a masking/UCR circuit which perform known color correction processings for changing the RGB signals into YMCBk signals suitable for the printer used as the output device. Numeral 5008 designates a circuit for generating reading synchronizing signals HS, CLK and VS. These synchronizing signals are delivered to all circuit blocks. For information, HS represents a main scanning section signal, CLK represents a fundamental clock signal for reading the image on pixel basis and VS represents a section signal indicative of the effective region in the direction of the sub-scan. Numeral 5009 designates a normalizing circuit which normalizes the input image signals into spectral characteristic or color space conforming with that of the matching data stored in a discrimination circuit 5012. Numeral 5010 designate a color space matching circuit which performs a real-time computation of the similarity between the read image data and the color space of each specific original. Numeral 5011 designates a decision signal generating circuit which produces a signal "1" when the color space matching circuit 5010 has determined that one of the specific originals is being read, otherwise the circuit 5011 generates an output "0".

The decision output signal from the circuit 5011 is delivered to, for example, the masking/UCR circuit 5007. Consequently, when any original which should not be copied from a legal point of view is being read, the masking/UCR circuit deviates the masking coefficients from correct values, thereby degrading the color reproduction of the copy output, thus impeding any attempt of forgery.

Figure 35:
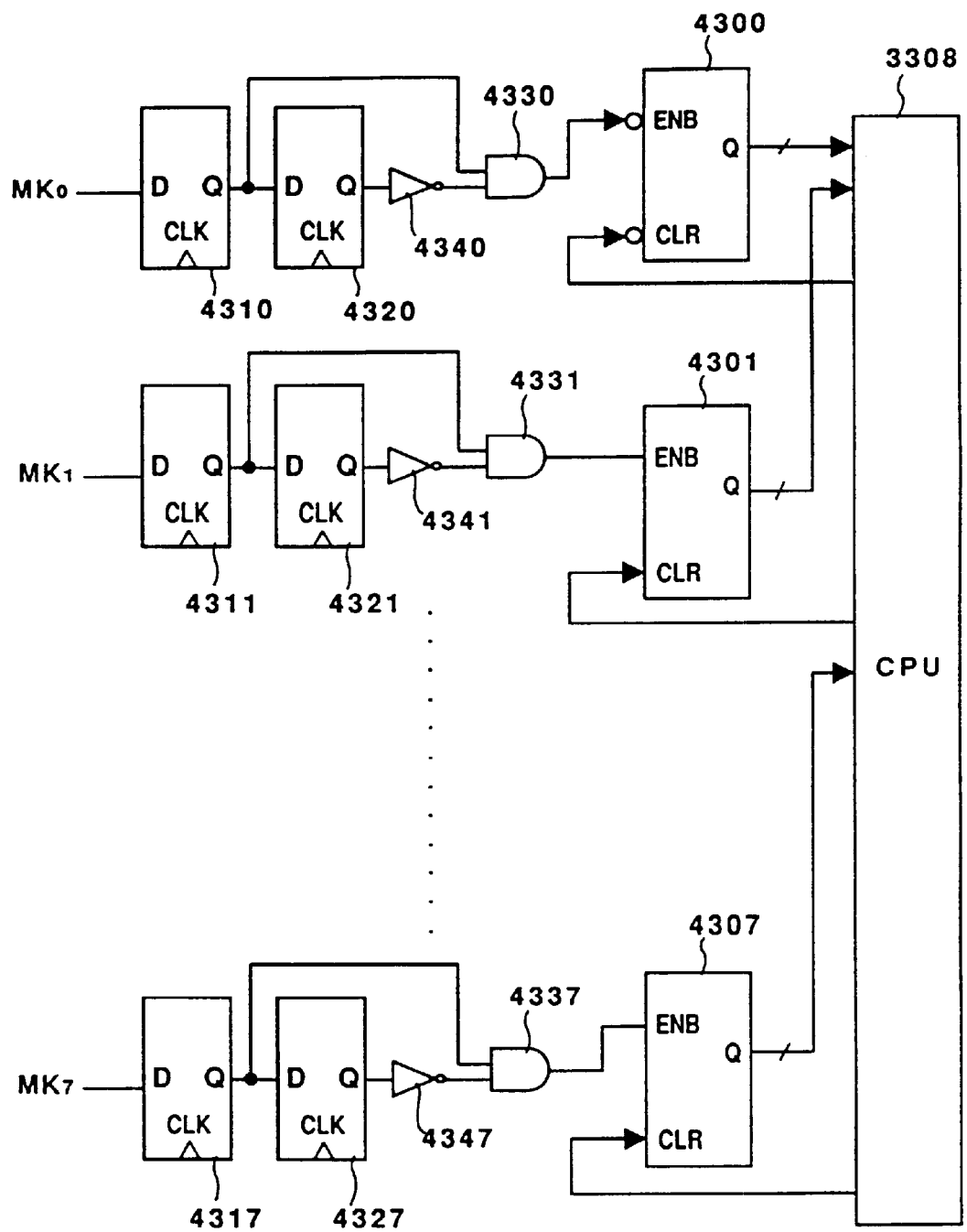
FIG. 35 is a circuit diagram of a counter circuit used in the fifth embodiment.

FIG. 35 is a circuit diagram of the counter portion 3307 shown in FIG. 26. In this Figure, numerals 4310 to 4317 and 4320 to 4327 denote flip-flops, 4330 to 4337 denote AND gates, 4340 to 4347 denote inverters and 4300 to 4307 denote 12-bit counters.

When one of the color space decisions signals $MK_0$ 4004 to $MK_7$ 4007 is changed from "0" to "1", corresponding 12-bit counter, i.e., one of the counters 4300 to 4307, starts to up-count. Thus, a counter is used for each of the decisions signals $MK_0$ to $MK_7$, so that decision is performed for each of a plurality of specific originals.

The counters 4300 to 4307 are cleared by the CPU 3308. More specifically, the counters 4300 to 4307 are cleared only when specific code is input through a secret code key and ten keys on the operating portion 3301 shown in FIG. 37.

The counter portion 3307 is always supplied with electrical power from the 24-h power supply 3309 (back-up power source), so that the contents of the 12-bit counters 4300 to 4307 are retained without being lost even when the power of the copying machine has been turned off.

Figure 34:
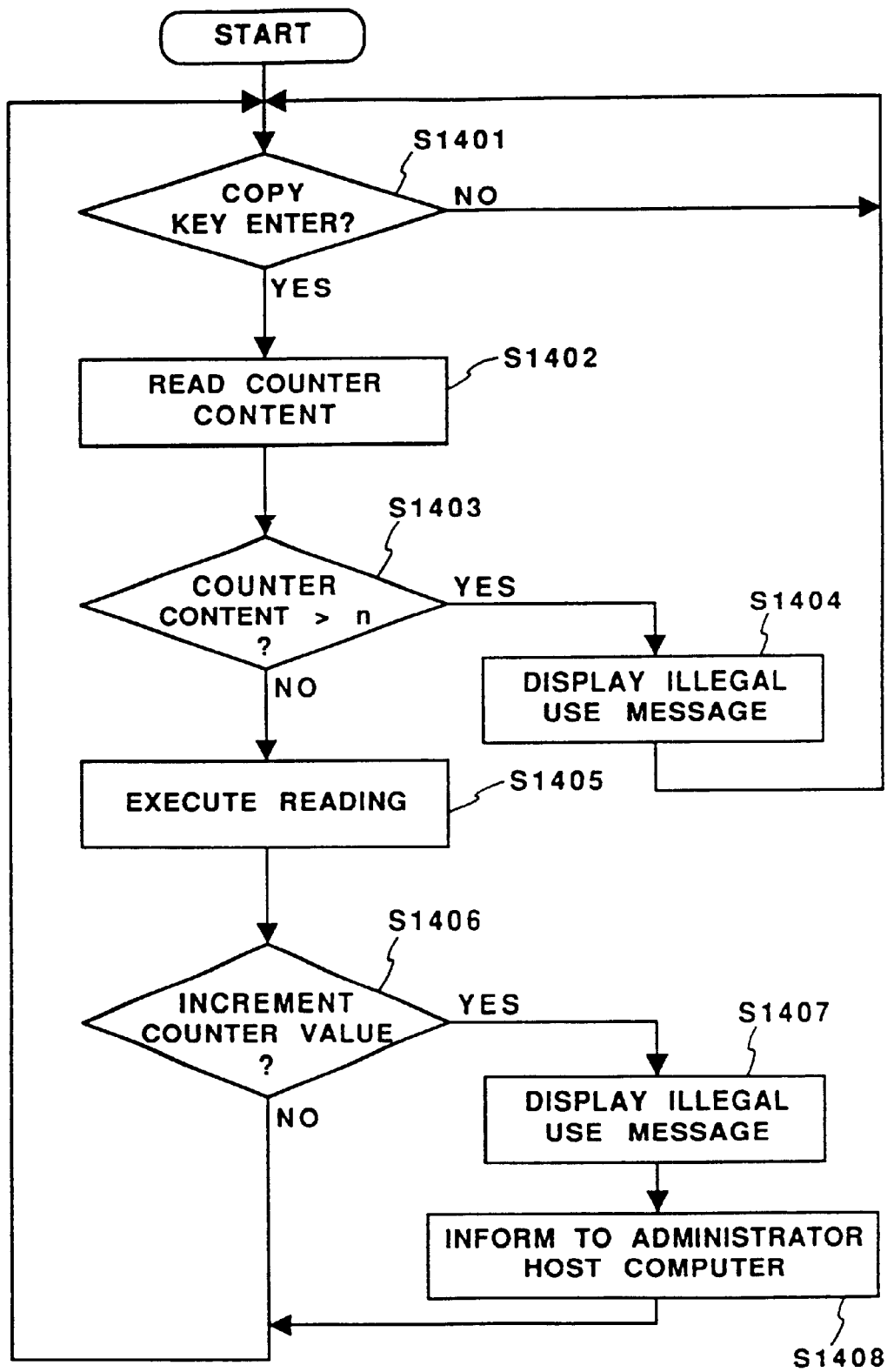
FIG. 34 is a flow chart illustrating the operation of a CPU incorporated in the fifth embodiment.

FIG. 34 shows the flow chart illustrative of the operation of the CPU 3308.

FIGS. 37 and 38 illustrate examples of message which is displayed when the copying operation should not be performed.

When a copy key 4501 in the operating portion 3301 is pressed (S1401), the CPU 3308 reads the values of the counters 1300 to 1307 shown in FIG. 35 (Step S1402) and determines whether the maximum value of the counter contents exceed the predetermined value n. If the value n is exceeded, the process proceeds to Step S1404 in which a message shown in FIG. 37 indicative of illegal use is displayed. Conversely, when the maximum value n is not exceeded, the process proceeds to Step S1405 in which copying operation is executed and, in Step S1406, the contents of the counters 4300 to 4307 are examined. If the result of the examination has proved that the values in the counters have increased from the values which were read in Step S1402, the process proceeds to Step S1407 in which the message of FIG. 38 indicating illegal use is displayed. In addition, in Step S1408, the same message or an equivalent information is transmitted to the host computer in the administration center trough, for example, a public telephone line.

Figure 36:
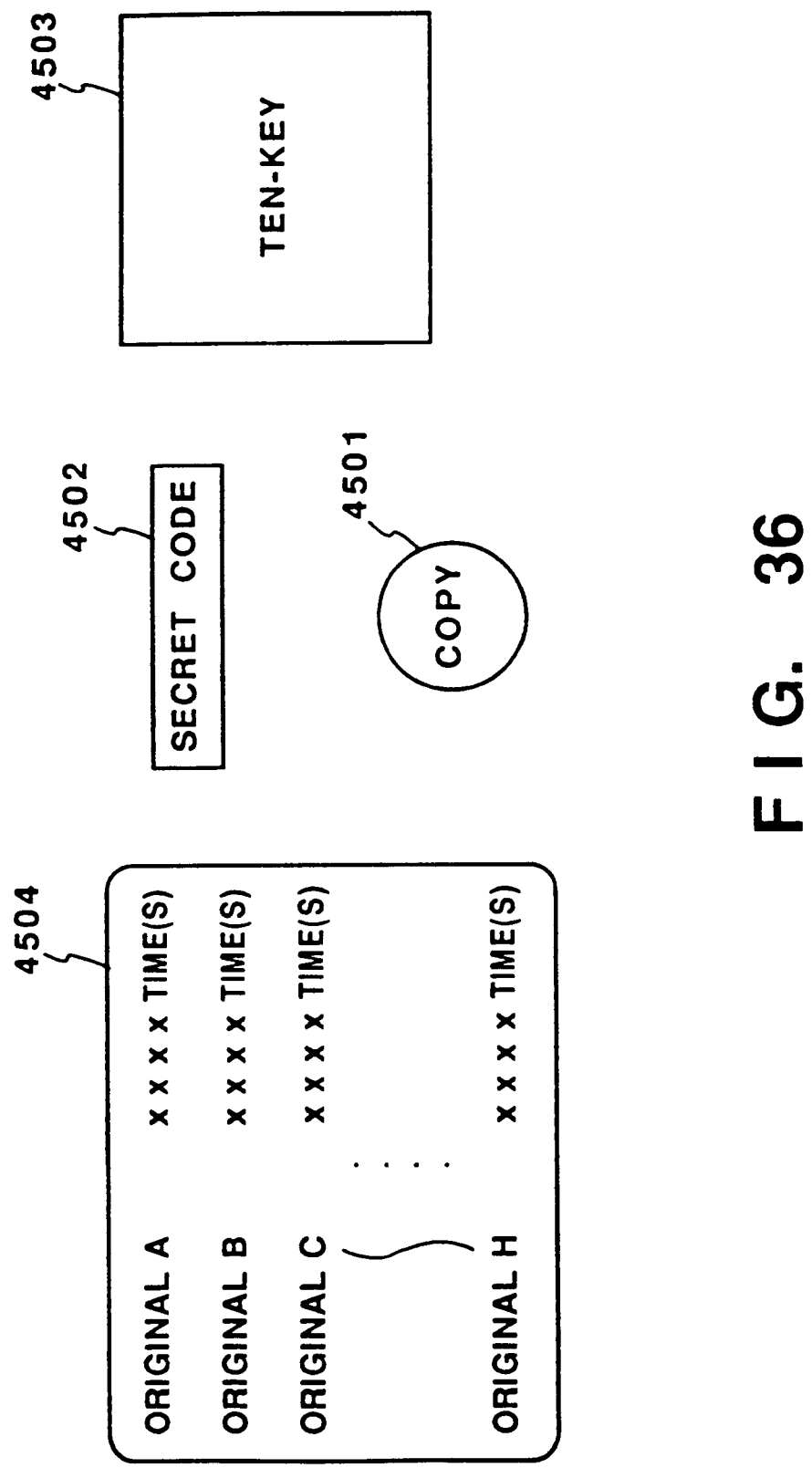
FIG. 36 is a top plan view of the manipulating portion of the fifth embodiment.

FIG. 36 is a top plan view of the manipulating portion 3310. The operating portion 3310 has a liquid crystal display portion 4504, a ten-key device 4503, and a secret code key 4502. The operator can enter a specific code by suitably manipulating the ten-key and the secret code key, so that the values in the counters 4300 to 4307 are displayed.

According to the process described hereinabove, it is possible to administrate and monitor information concerning each of a plurality of type of specific originals, whereby the reliability of anti-forgery function can be enhanced.

As will be understood from the foregoing description, the fifth embodiment of the present invention stores deciding information together with other information, thus enabling a service man or other user to check the content of the information at the time of, for example, a periodical check. In addition, the decision information on a plurality of copying machines can be monitored and administrated concentrically from an administration center, thus offering a greater coverage of anti-forgery monitoring system.

Sixth Embodiment

Figure 40:
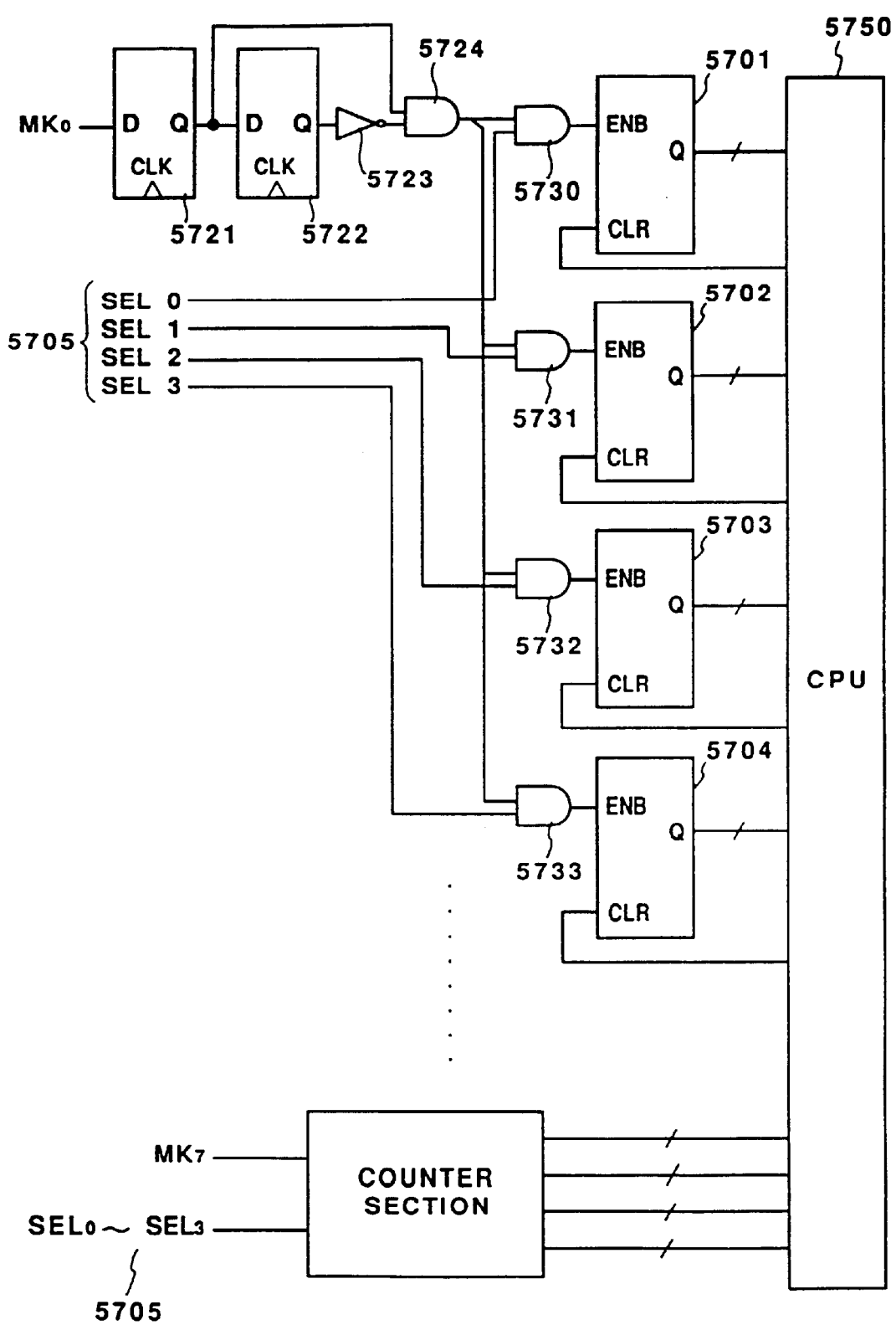
FIG. 40 is a circuit diagram of a counter portion of a sixth embodiment of the present invention.

FIG. 40 illustrates a block diagram of a counter section used in a sixth embodiment of the present invention, while FIG. 41 illustrates select signals and type of the input device used in the sixth embodiment.

While the fifth embodiment described before is intended for storing decision information for each of a plurality of types of specific originals, the sixth embodiment is intended for storing decision information on the basis of the image input device.

A description will be given of the construction of the counter section used in this embodiment.

Referring to FIG. 40, numeral 5721 and 5722 denote flip-flops, 5723 denotes an inverter, 5724 and 5730 to 5733 denote AND gates and 5701 to 5704 denote counters.

Select signals 5705 (se00 to se03) are signals which are under the control of the CPU 5750 and which are indicative of the machine from which image data is being entered. Counters 5701 to 5704 are adapted for reading the decision information for the respective machines. The contents of these counters are read by the CPU 5750. FIG. 41 is an illustration of the relationships between the select signals 5705 (se00 to se03) and the machines through which the image data are entered. According to this arrangement, decision information is stored for each of a plurality of copying machines, so that the prevention of forgery can be effected on the basis of the individual copying machine.

In this embodiment, masking coefficients are deviated from correct values when the input image contains an image approximating the image of One of a plurality of specific originals, so as to degrade the quality of the produced copy. This, however, is only illustrative and various invalidation measures such as blackening of a portion of the image, add-on of line patterns or the like may be adopted to make the copy unusable, upon detection of the presence of an image similar to the image of any one of the registered specific originals.

It is also possible to completely disable the copying machine by stopping a processing function such as motor operation in the copying machine.

In order to inform the fact of any illegal use of the coping machine, it is possible to use various communication functions such as a wireless communication device or a LAN (Local Area Network), as well as public telephone line which is employed in the described embodiment.

Seventh Embodiment

A seventh embodiment of the present invention employs a copying machine which is the same as that shown in FIG. 2. The construction of the copying machine is therefore omitted.

The seventh embodiment is discriminated from the first embodiment by the construction of the image scanner. The construction of the image scanner used in this embodiment will be described hereinunder.

Figure 42:
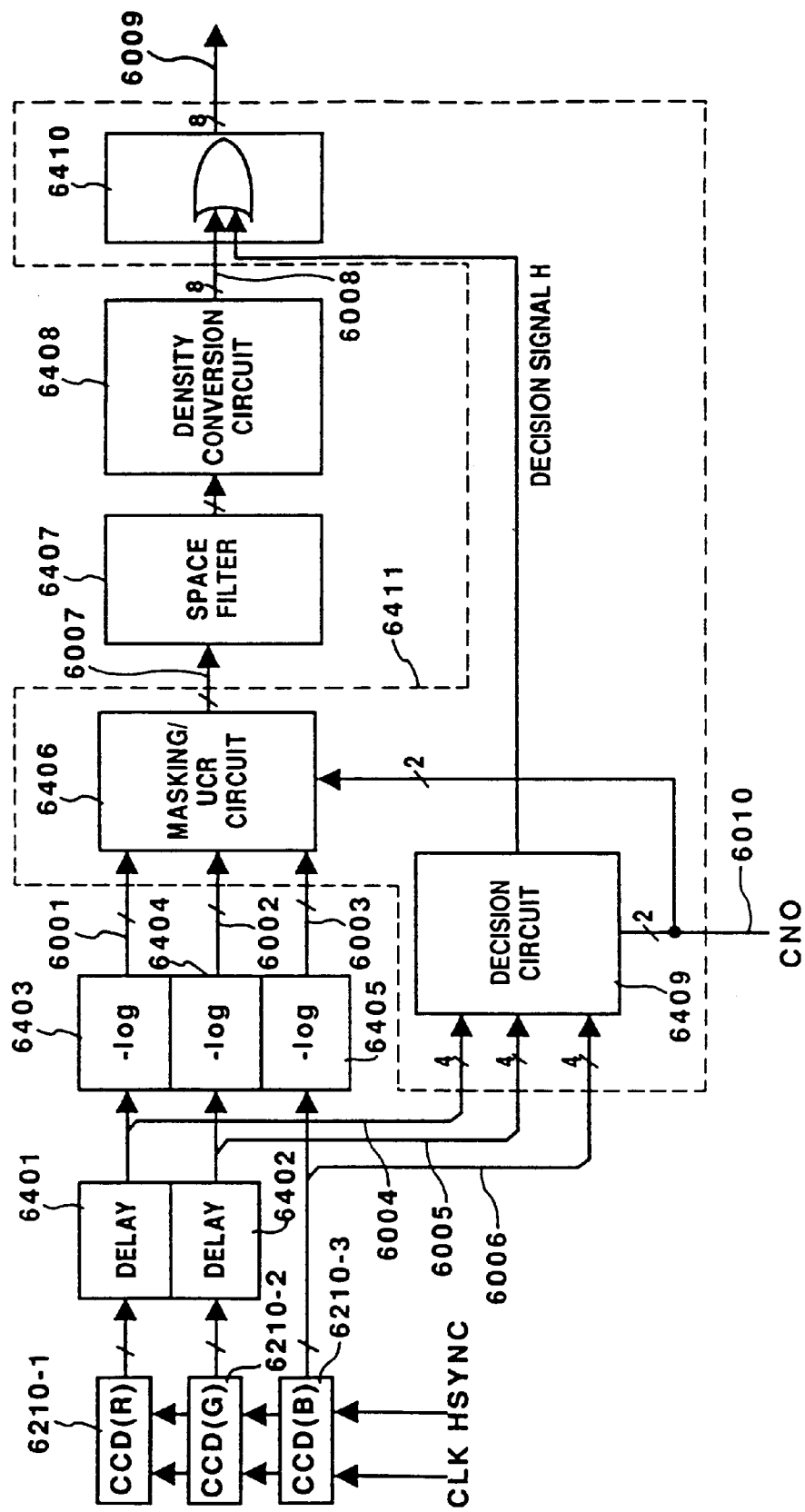
FIG. 42 is a block diagram of an image scanner portion of the seventh embodiment.

FIG. 42 is a block diagram of an image scanner 201 used in the seventh embodiment. Numerals 6001 to 6010 denote signal lines, 6210-1, 6210-2 and 6210-3 respectively denote CCD sensors (solidstate imaging devices) having spectral sensitivity characteristics of red (R), green (G) and blue (B). These CCD sensors respectively produce 8-bit outputs 0 to 255 after an A/D conversion.

The CCD sensors 6210-1, 6210-2 and 6210-3 are disposed at a predetermined positional interval. In order to compensate for the spatial offset, delay elements 6401 and 6402 are used to eliminate any time difference of the output signals of these sensors due to difference in positions.

Numerals 6403, 6404 and 6405 denote logarithmic converters, each of which is composed of a look-up table ROM or RAM and converts an illuminance signal into a density signal. Numeral 6406 denote a masking/UCR circuit which is known per se. This circuit outputs magenta (M), cyan (C),yellow (Y) and black (Bk) signals in response to input three signals R, G and B, in the form of a bit signal of a predetermined bit length, e.g., 8 bits, in a frame-sequential manner.

A signal CNO is a 2-bit screen-sequential signal which is a control signal indicating the sequence of four reading cycles. FIG. 66 is a diagram showing the relationship between the CNO signal and the print output. The CNO signal serves to change-over the conditions of operation of the masking/UCR circuit 6406 shown in FIG. 66.

Numeral 6407 denotes a spatial filter which is known per se and which performs correction of space frequency of the output signal. Numeral 6408 denotes a density conversion circuit which has a function for correcting the density characteristic of the printer which corresponds to the printer 202 shown in FIG. 2. The density conversion circuit 6408 is composed of a ROM or a RAM similar to the logarithmic converters 6403 to 6405.

Numeral 6405 designates a decision circuit for deciding whether an image which is being entered conforms with the image of any one of a plurality of registered specific originals. This circuit delivers the result of the decision in the form of a decision signal H which is "0" or "1". Namely, when the image which is being entered is determined to conform with the image of one of the registered specific originals, the deciding signal H is set to "1", otherwise to "0".

The decision circuit 6409 also receives the aforesaid CNO signal. The decision criterion is changed for each of four reading cycles so as to enable decision for each of a plurality of types of specific originals. Numeral 6410 designates an OR gate which conducts an OR computation of the 8-bit output V from the density conversion circuit 6408 and the decision signal H output from the decision circuit 6409, and produces an output V'.

Consequently, when the decision signal H is "1", i.e., when the image which is being read conforms with the image of one of the registered specific originals, the OR gate 6410 delivers a hexadecimal signal V'=FF (=255) regardless of the level of the input signal V, whereas, when the decision signal H is "0", i.e., when the image which is being read does not conform with any one of the images of the registered specific originals, the OR circuit 6410 produces the input signal V as the output signal V'/.

Figure 43:
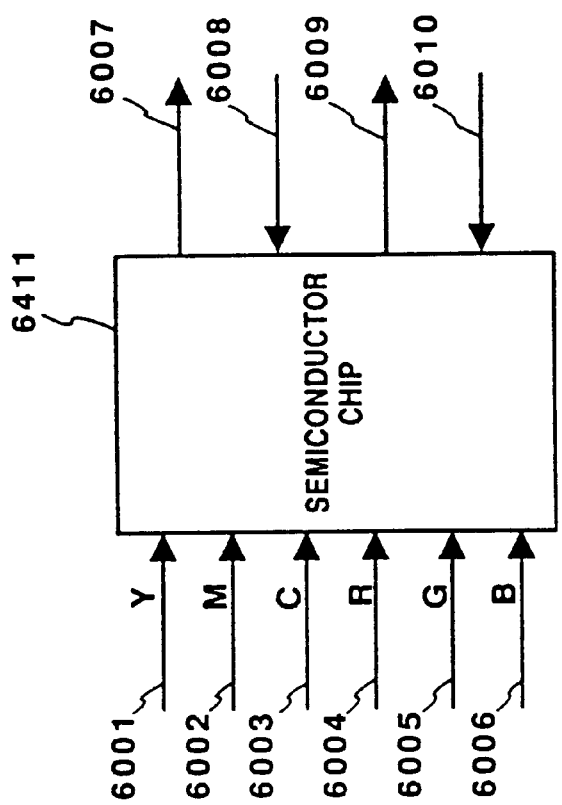
FIG. 43 is a block diagram of an essential portion of the image scanner portion shown in FIG. 42.

Referring to FIG. 1, numeral 6411 denotes a semiconductor chip which integrates the masking/UCR circuit 6406, decision circuit 6409 and the OR gate circuit 6410. The semiconductor chip 6411 is a single-chip LSI as shown in FIG. 43. It is therefore impossible to by-pass the decision circuit 6409 alone.

In this embodiment, the semiconductor chip 6411, i.e., the LSI, is formed of a gate array which is a kind of ASIC, so that the semiconductor chip 6411 is constructed as a module or a unit.

This embodiment has a thinning circuit and a frequency dividing circuit which have the same constructions as those explained before in connection with the first embodiment with reference to FIGS. 5 and 6. The thinning circuit and the frequency dividing circuit are therefore not detailed.

A description will now be given of the decision circuit 6409 used in this embodiment.

Figure 44:
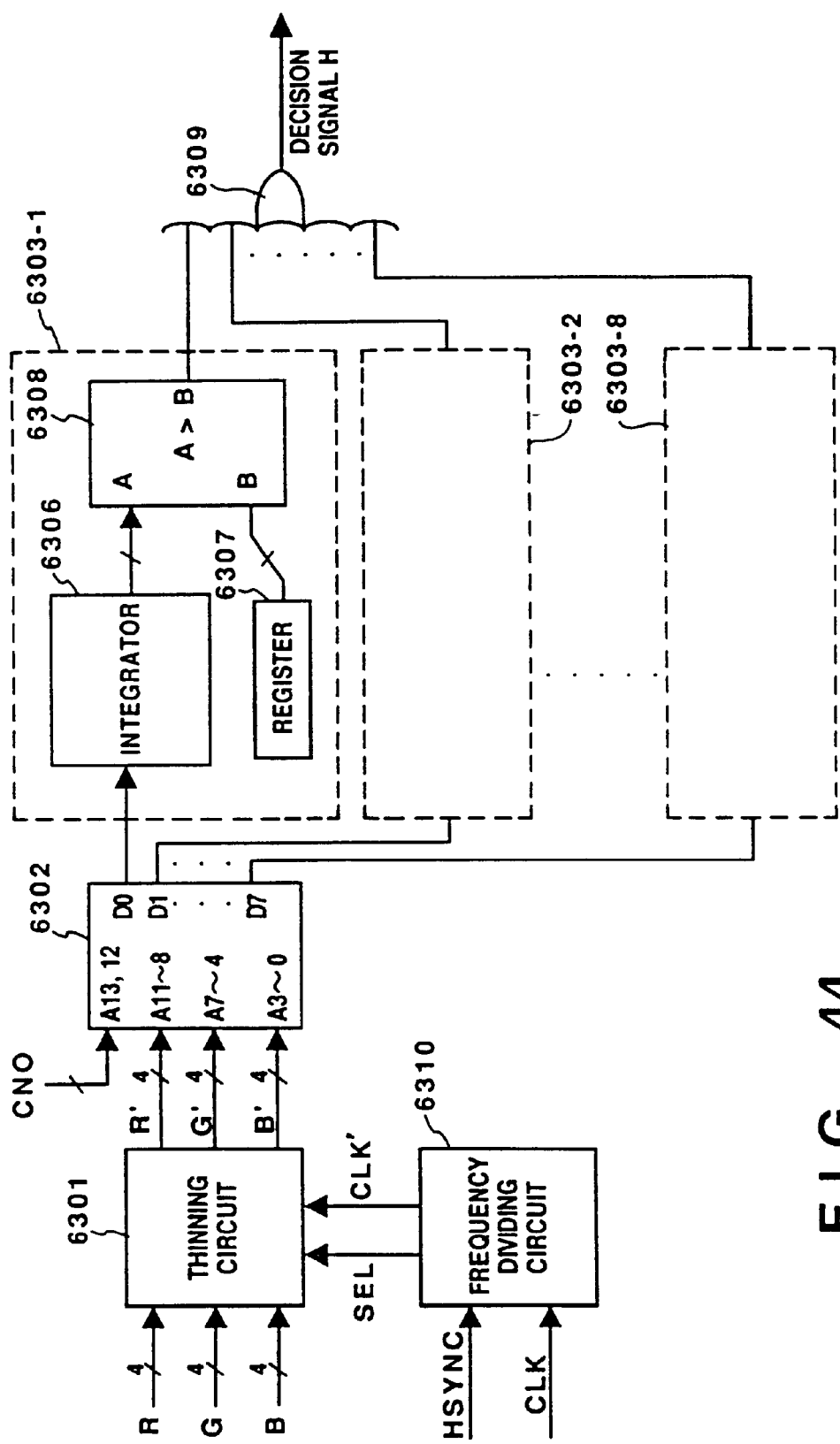
FIG. 44 is a circuit diagram of a decision circuit used in a seventh embodiment.

FIG. 44 is a block diagram showing the construction of the decision circuit 6409 used in the seventh embodiment. In this Figure, numeral 6301 denotes a thinning circuit which may be the same as that shown in FIG. 5. This circuit performs thinning of the data in order to reduce the load of the decision circuit 6409 as the processing circuit. Numeral 6302 designates a color taste look-up table used in the seventh embodiment. The seventh embodiment is different from the first embodiment in that it performs decision for each print color in accordance with the signal CNO.

Obviously, the color taste matching look-up table 6302 can be constituted by a mask ROM constructed in the gate array 6411. This table performs determines matching of color taste as a factor of the image characteristic, with a plurality of types of specific originals which have ben registered beforehand. The color taste matching look-up table 6302 stores the results of examination of color taste distributions of 32 types of specific originals and holds the results of decision as to whether the color tastes of pixels conform with any one of color tastes of these specific originals.

More specifically, the look-up table 6302 has 17 bits including significant 2 bits allocated for the CNO signal as the frame-sequential signal and less significant 15 bits used for significant 5 bits of R,G and B image signals after thinning. For each of the values 0 to 3 of the CNO signal, whether the color taste of a pixel corresponds to the color taste of a specific original is determined for each of the 8 types of specific originals and the results are simultaneously output in the form of 8-bit signals. Consequently, color taste matching operation is conducted fro 32 types of specific originals by four reading scanning cycles.

Numerals 6303-1, 6303-2, . . . . , 6303-8 denote color taste decision circuits which have an identical hardware. More specifically, each color taste decision circuit includes an integrator 6306, a register 6307 and a comparator 6308, and performs a decision as to whether the image of any one of the registered specific originals exists in the read image.

Numeral 6309 designates a logical OR circuit which produces a decision signal H of "1" level; when at least one of the color taste decision circuit 6303-1 to 6303-8 has determined that an image of a registered specific original exists in the read image.

The integrator 6306 of this embodiment has construction and input/output function substantially the same as those of the integrator used in the first embodiment (see FIG. 7). Detailed description of the integrator 6306 is therefore omitted.

The result of the processing performed in this embodiment is substantially the same as that explained in connection with the first embodiment with reference to FIG.

Eighth Embodiment

Figure 45:
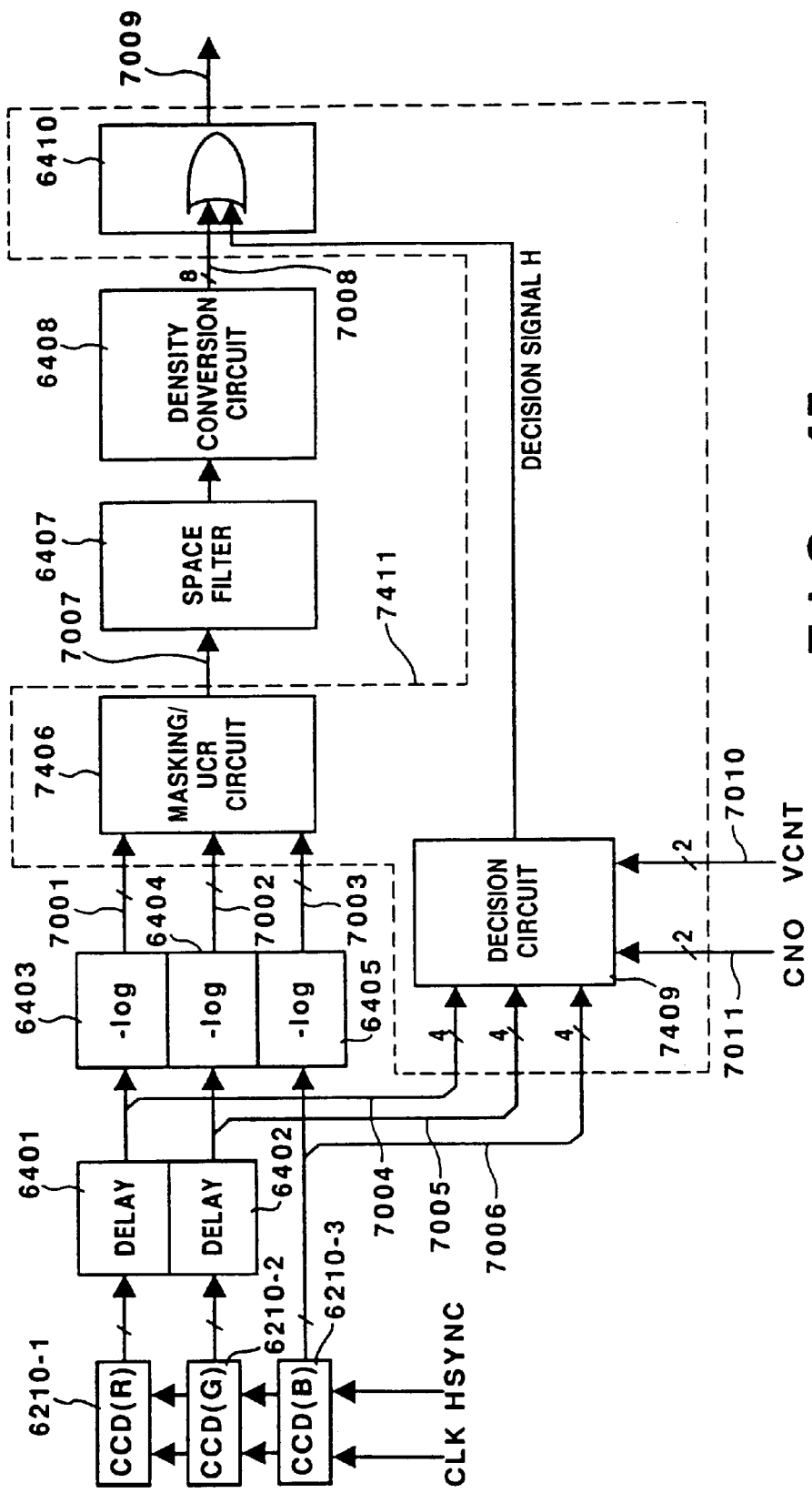
FIG. 45 is a block diagram of an image scanner in the eighth embodiment.
Figure 47:
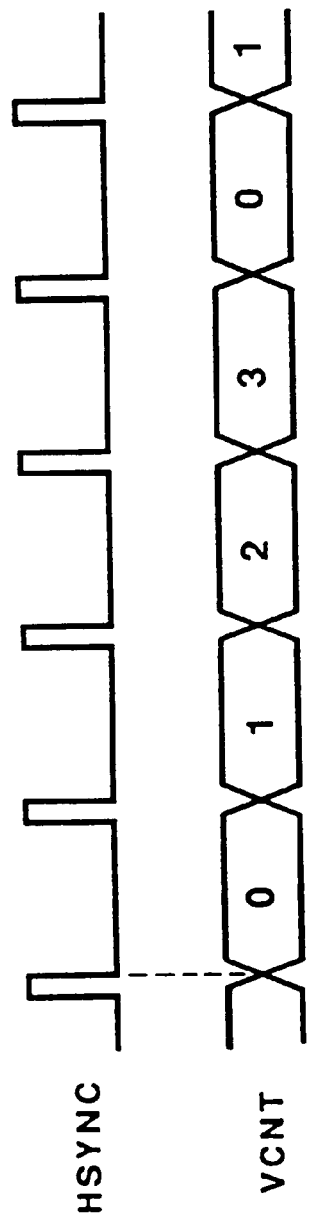
FIG. 47 is a timing chart showing timings of signals HSYNC and VCNT in the eighth embodiment.
Figure 48:
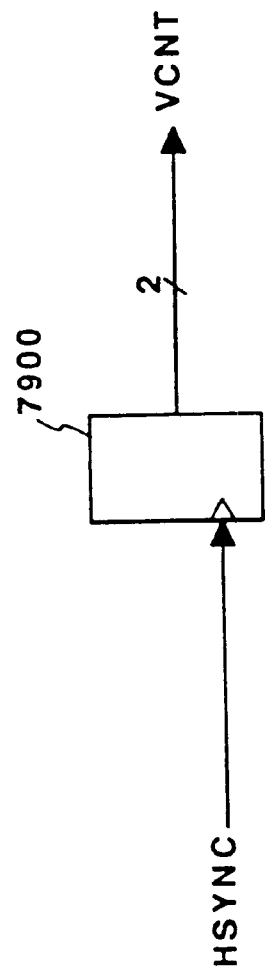
FIG. 48 is a block diagram of a 2-bit counter used in the eighth embodiment.
Figure 49:
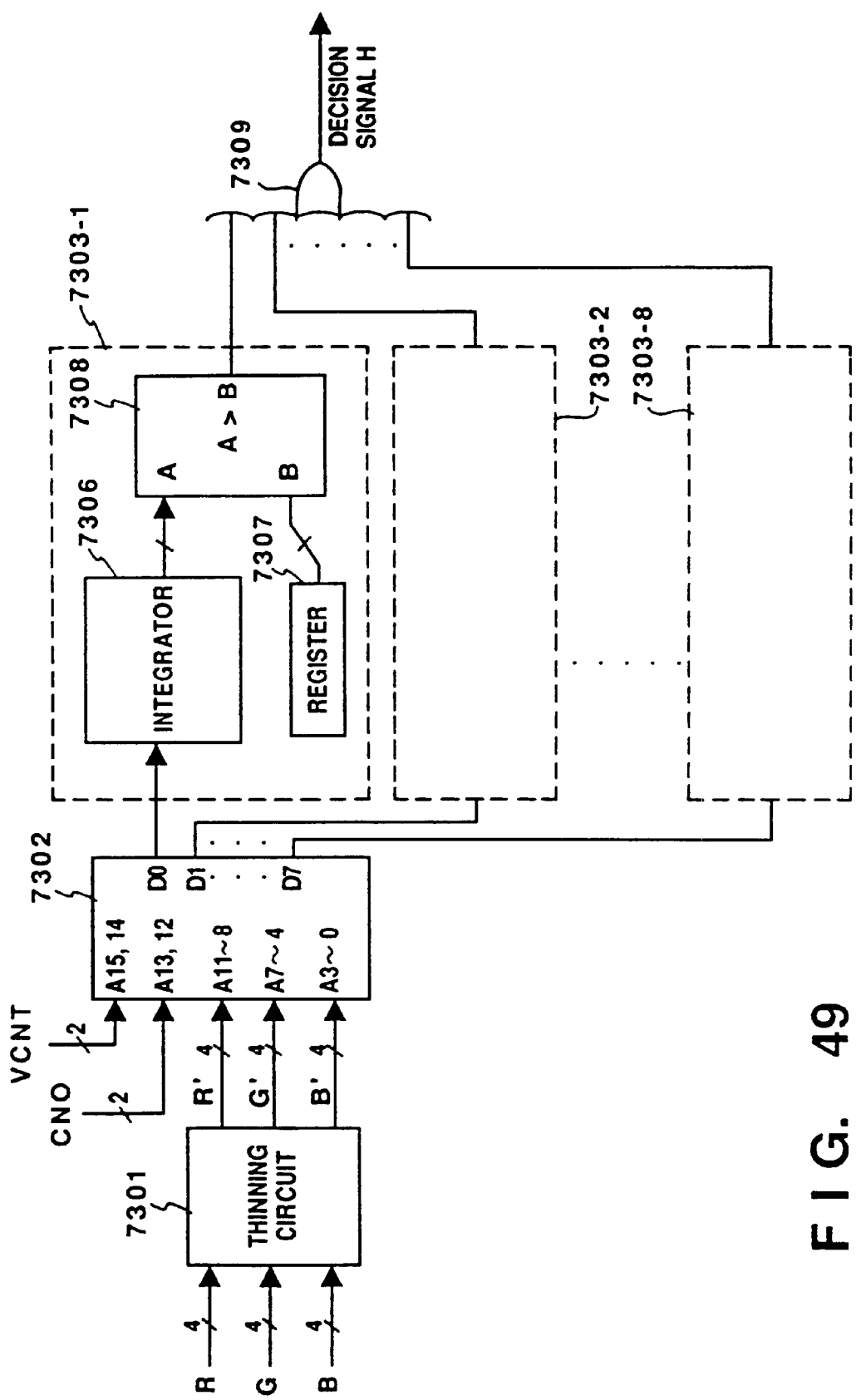
FIG. 49 is a block diagram of a decision circuit used in the eighth embodiment.

FIG. 45 is a block diagram of an image scanner used in the eighth embodiment of the present invention. FIG. 4 6 is a block diagram showing the construction of a critical portion of the image scanner shown in FIG. 45. FIG. 47 is a timing chart illustrating timings of data handled in the seventh embodiment. FIG. 48 is a block diagram of a 2-bit counter used in the eighth embodiment. FIG. 49 is a block diagram showing the construction of a decision circuit used in the eighth embodiment. In FIG. 45, the same reference numerals and the same signal symbols are used to represent same circuit components and signals shown in FIG. 42 showing the seventh embodiment.

Numerals 7001 to 7010 denote signal lines, while 7900 denotes a 2-bit counter.

A critical feature of this embodiment resides in the use of a semiconductor chip 7411 shown in FIG. 45. This semiconductor chip 7411 is adapted to effect masking and UCR operations on the YMC signals carried by the signal lines 7001 to 7003, without inputting the CNO signal to the masking/UCR circuit 7406. At the same time, this semiconductor chip 7411 delivers to the decision circuit 7409 both the CNO signal and a later-mentioned VCNT signal, thereby obtaining the decision signal H.

As will be sen from FIG. 48, a VCNT signal is generated by a 2-bit counter 7900 which receives the main scan synchronizing signal HSYNC. Namely, the VCNT signal counts up from 0 to 3 for each of the main scanning cycle, i.e., in response to one step of the sub-scan, and repeats this counting again and again from 0 to 3.

In the seventh embodiment described before, the decision criterion is switched in accordance with the value of the CNO signal so as to perform decision for each of 32 types of the registered specific originals. In the eighth embodiment, both the frame-sequential signal CNO and the VCNT signal are input to significant addresses of the color taste matching look-up table 7302 as shown in FIG. 49, whereby decision is possible for up to 128 types of registered specific originals.

Thus, the eighth embodiment can conduct check up of the images for a large number of types of specific originals which is 4 times as large that handled by the seventh embodiment, although the construction of the eighth embodiment is not so much changed from that of the seventh embodiment.

Obviously, the present invention can be carried out in such a manner that the switching of the decision criterion is conducted in response to the CNO signal alone.

Ninth Embodiment

In the seventh embodiment described before, the decision criterion is changed by the frame-sequential signal, whereas, in the eighth embodiment, the switching of the criterion is performed for each main scan. These manners of switching of the decision criterion, however, are not exclusive, and the invention may be carried out in such a manner that the decision criterion is switched for each of successive pixels, as in the ninth embodiment which will be described hereinunder.

FIG. 50 is a timing chart illustrating timings of data handled in the ninth embodiment. FIG. 51 is a block diagram showing the construction of a 2-bit counter used in the ninth embodiment.

A substantially same effect can be obtained by using, as the VCNT signal used in the eighth embodiment, the VCNT2 signal obtained by inputting the pixel clock signal CLK of FIGS. 12A and 12B to a 2-bit counter.

Tenth Embodiment

In the tenth embodiment of the invention, the anti-forgery function is performed by circuits which are composed of a plurality of LSIs. The tenth embodiments employ various components which are the same as those used in the seventh embodiment. These components are therefore denoted by the same reference numerals as those appearing in FIG. 42 and detailed description of such components are omitted.

Figure 52:
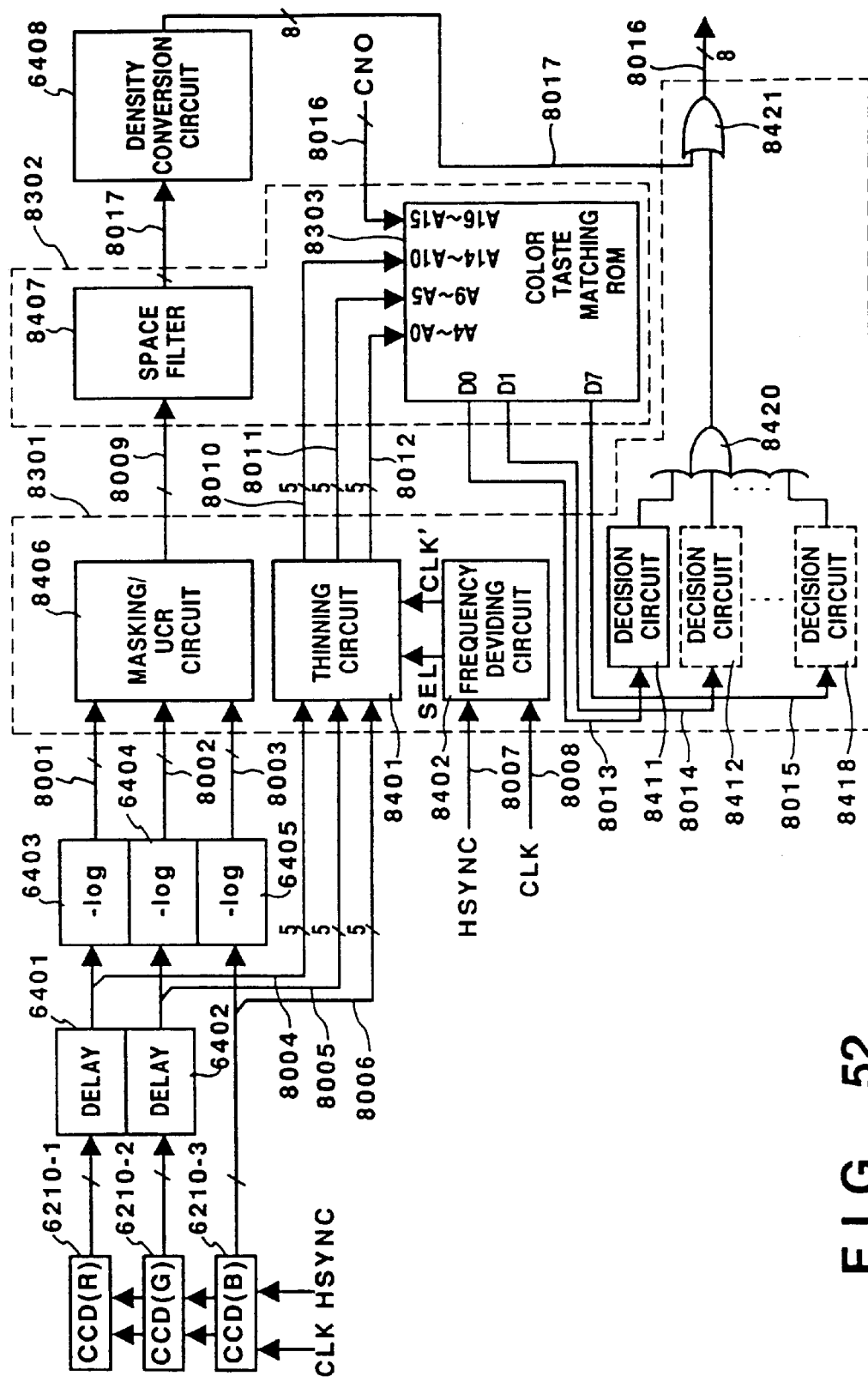
FIG. 52 is a block diagram of an image scanner of the ninth embodiment.
Figure 53:
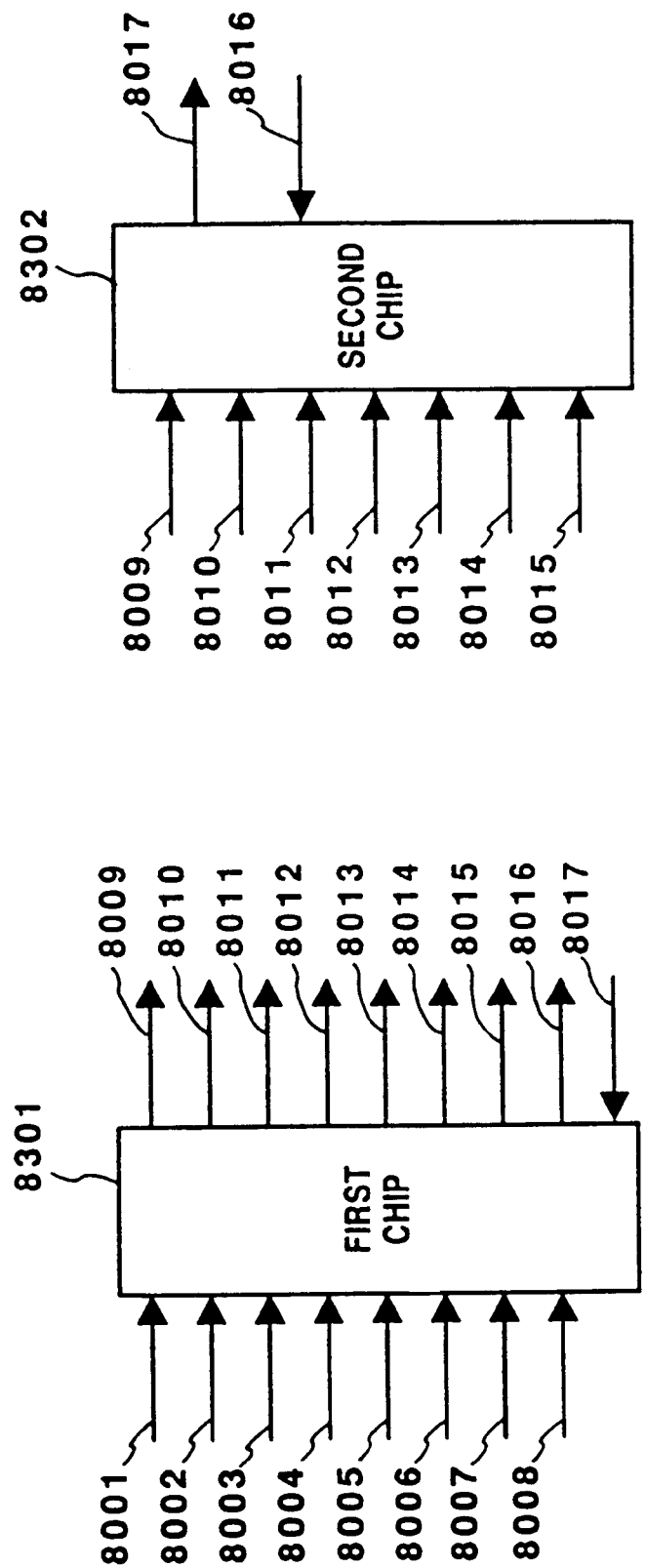
FIG. 53 is a block diagram of a critical portion of the image scanner shown in FIG. 52.

FIG. 52 is a block diagram of an image scanner used in the tenth embodiment.

Numerals 8001 to 8017 in FIG. 52 denote signal lines. The tenth embodiment employs a first chip 8301 as a first LSI. The first chip 8301 integrates a masking/UCR circuit 8406, thinning circuit 8401, frequency dividing circuit 8402, decision circuits 8411 to 8418 and OR gates 8420 to 8421. Thus, all the circuits for deciding presence of specific original used in the seventh embodiment, except for the color taste matching look-up table, are integrated in the first chip 8301.

Numeral 8302 denotes a second chip as a second LSI which integrates a space filter 8407 and a color taste matching look-up table 8303. In order to attain a high degree of decision precision, 5 bits are allocated for each of the pixels.

In order to improve the precision of decision or to increase the number of types of the specific originals to be detected, it is effective to increase the capacity of the color taste matching look-up table by dividing the LSI into first and second chips 8301 and 8302 as illustrated in FIG. 52. Obviously, however, the division of the LSI into a plurality of separate LSIs may be conducted for other purposes than described above.

As will be understood from the foregoing description, in the tenth embodiment of the present invention, part of the image signal processing section and whole or part of the image decision section are constructed on a common LSI. Therefore, any attempt for removing the anti-forgery function essentially removes a part of the function of the image processing section. So that the copying image signal processing function is failed, with the result that the copying machine does not operate. It is thus possible to completely reject any attempt for forgery.

It is to be understood that the present invention can be carried out in the form of an LSI chip which carries, as described, part of the image signal processing portion and the whole or part of the image deciding section, as well as the whole copying machine incorporating such an LSI chip.

It is also to be understood that the same effect as that offered by the tenth embodiment can be obtained when part of the image processing section and the whole or part of the image deciding section are formed on the same printed board, although in the tenth embodiment they are formed on a single LSI chip.

Furthermore, the tenth embodiment may be modified such hat at least a part of the image deciding section is formed on the same LSI chip or a circuit board as s component which controls the copying process of the machine, e.g., a microprocessor, necessary for the copying operation. It will be clear that such a modification offers the same advantage as the tenth embodiment in which at least a part of the image deciding portion is formed on the same LSI chip or board as a part of the image processing section.

Eleventh Embodiment

A description will now be given of an eleventh embodiment of the present invention. Although a copying machine is specifically mentioned in the following description, it is to be noted that the invention can equally be applied to other types of apparatuses such as a facsimile apparatus, printer and so forth.

The general construction of the copying machine is not described because it is materially the same a that explained before in connection with the first embodiment with reference to FIG. 1.

The eleventh embodiment employs an image scanner which is different from those employed in the first embodiment and the seventh to tenth embodiments. This image scanner will be described hereinunder.

Figure 54:
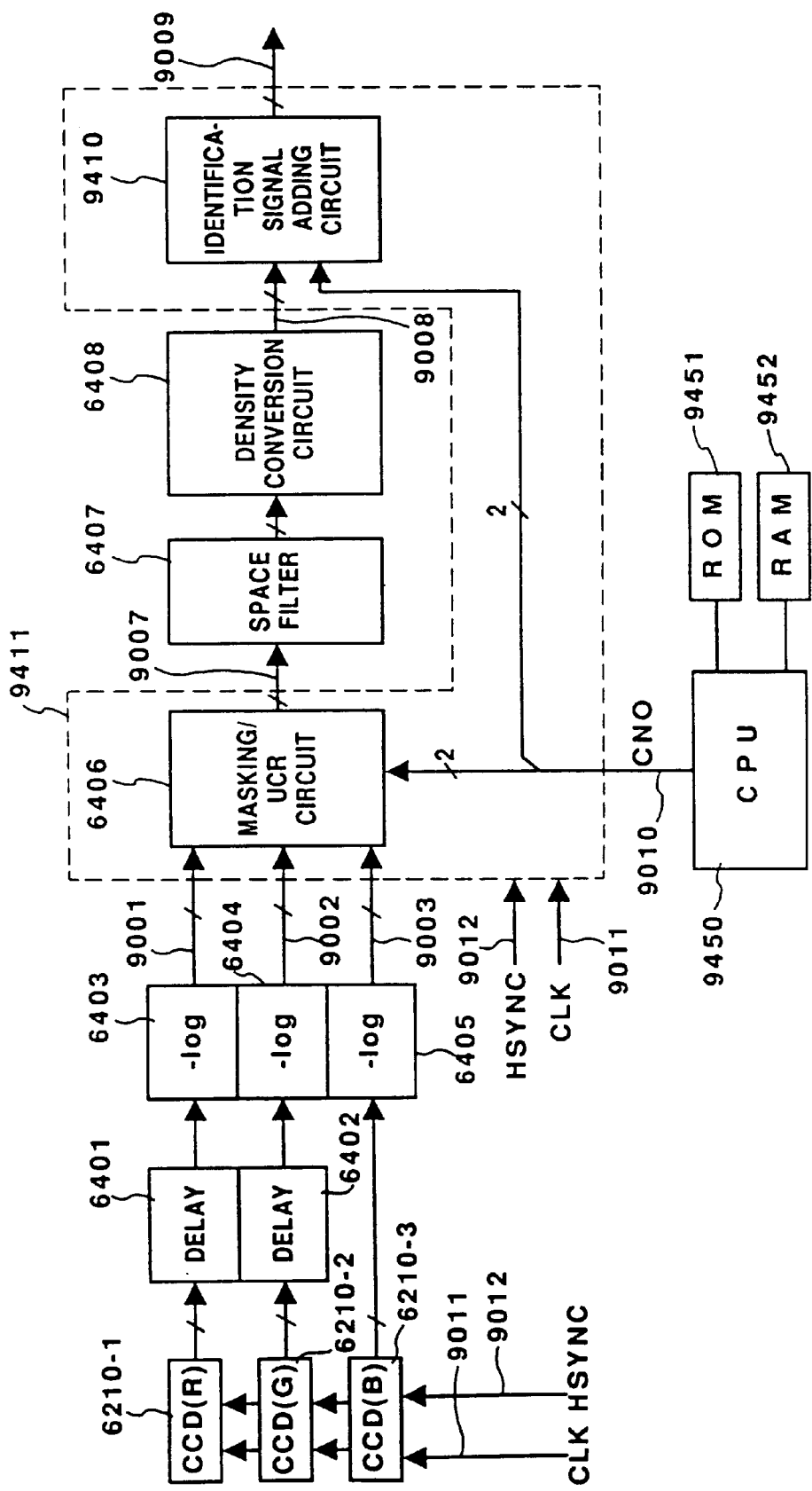
FIG. 54 is a block diagram of an image scanner used in a tenth embodiment of the present invention.
Figure 55:
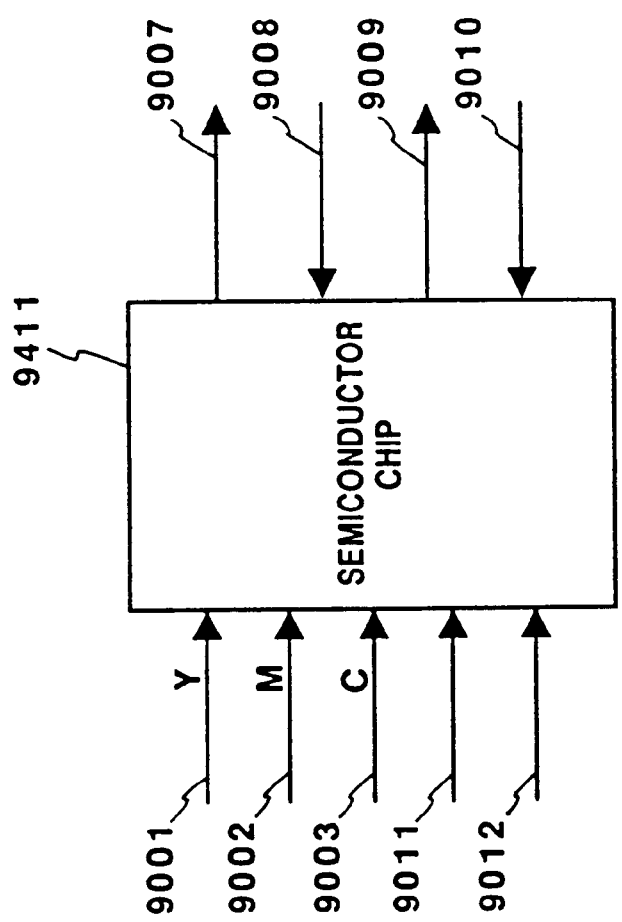
FIG. 55 is a block diagram of a critical portion of the image scanner shown in FIG. 54.
Figure 56:
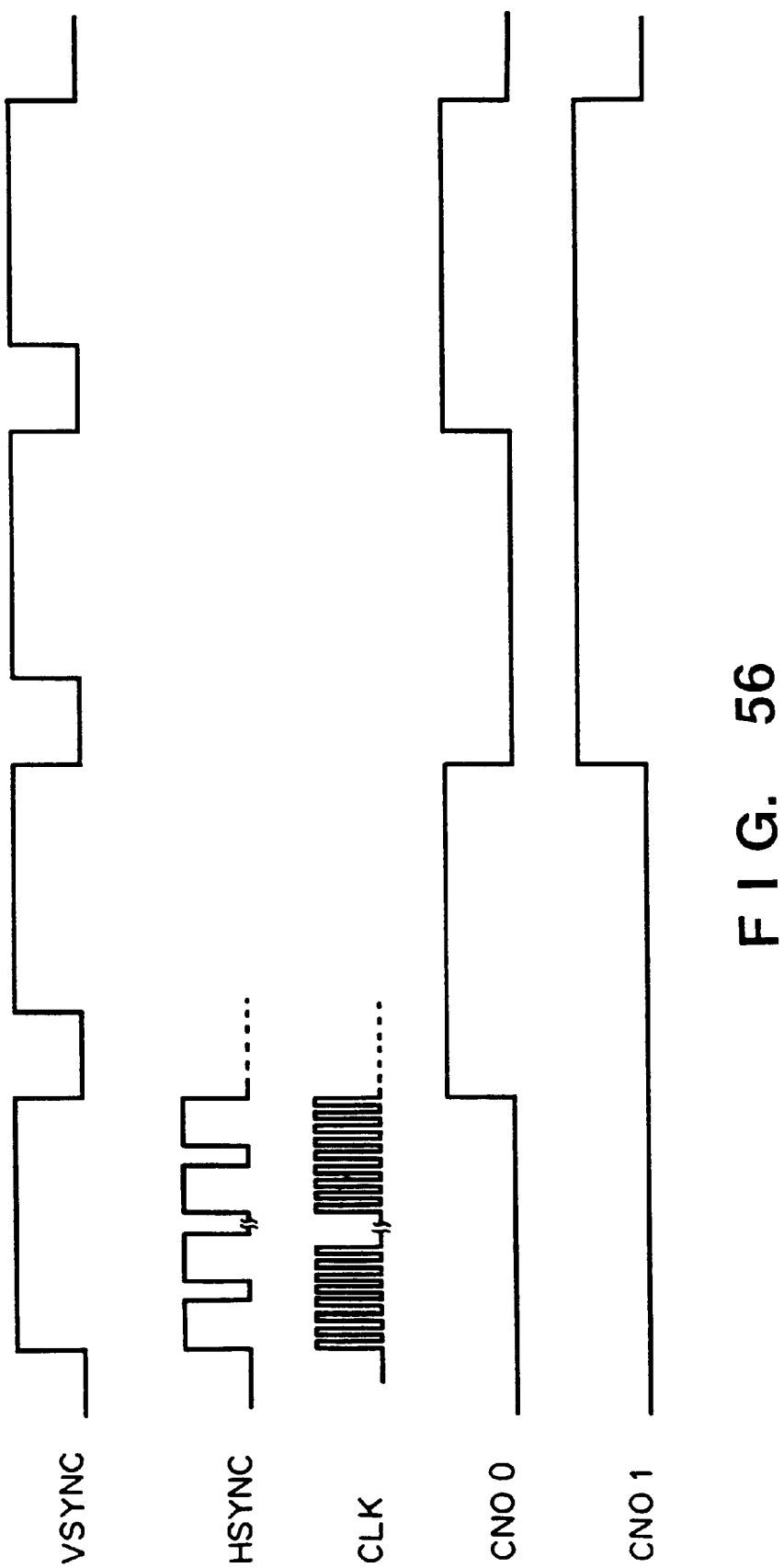
FIG. 56 is a timing chart showing timing of switching over of a CNO signal in the tenth embodiment.

FIG. 54 is a block diagram showing the construction of the image scanner used in the eleventh embodiment, while FIG. 55 is a block diagram showing critical portion of the image scanner shown in FIG. 54. FIG. 56 is a timing chart illustrating the timing of data used in the eleventh embodiment.

In FIG. 54, components which are the same as those used in the seventh embodiment are denoted by the same reference numerals as those in FIG. 42. In FIG. 54, numerals 9001 to 9012 denote signal lines.

Numeral 9450 denotes a CPU which commands the whole apparatus and which produces a CNO signal which will be described later with reference to FIG. 66. Numeral 9451 designates a ROM storing a program, while 9452 designates a RAM which is used as a work area of the CPU 9450.

The CNO signal serves to change-over the operating conditions of the masking/UCR circuit 6406 at the timing shown in FIG. 56, under the control of the CPU 9450.

Referring to FIG. 54, numeral 9411 designates a semiconductor chip in which a masking/UCR circuit 6406 and an identification signal adding circuit 9410 are integrated. This chip has the form of a one-chip LSI as shown in FIG. 55. Therefore, according to the arrangement shown in FIG. 54, it is difficult for the identification signal to by-pass only the identification signal adding circuit 9410.

In the illustrated embodiment, for example, the LSI of the semiconductor chip 9411 is constructed as an integral unit from a gate array which is a kind of ASIC.

<Signal Adding Circuit>

Figure 57:
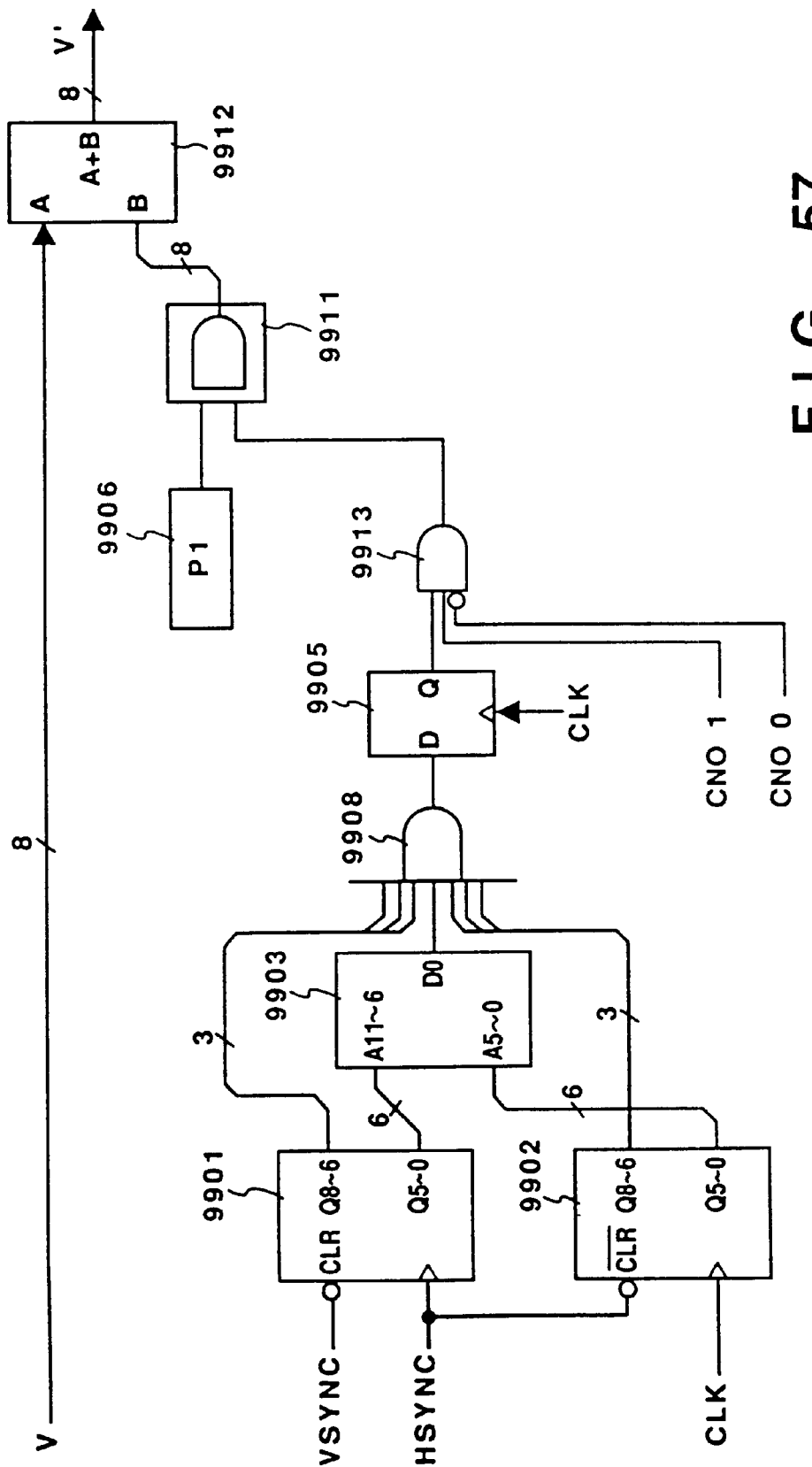
FIG. 57 is a block diagram of a pattern adding circuit used in the tenth embodiment.

FIG. 57 is a block diagram showing the construction of the identification signal adding circuit used in the eleventh embodiment. In this Figure, numeral 9901 denotes a sub-scan counter, 9902 denotes a main-scan counter, 9903 denotes a look-up table ROM (referred to as "LUT"), 9905 denotes a flip-flop, 9913 denotes an AND gate, 9906 denotes a register, 9910 denotes a 4 to 1 selector, 9911 denotes an AND gate, and 9912 denotes an adder.

The sub-scan counter 9901 and the main-scan counter 9902 count, respectively, the main scan synchronizing signals HSYNC and the pixel synchronizing signals CLK on 9-bit unit, i.e., at 512 periods. The LUT 903 is a read-only memory (referred to as "ROM") which holds a pattern to be added, and receives less significant 6 bits of the contents of the sub- and main-scan counters 9901 and 9902. Only one bit of the output from the LUT 9903 is referred, and a logical product of this bit and significant 3 bits of the main- and sub-scan counters 9902 and 9901 is computed by an AND gate 9904. The output is delivered to the flip-flop 9905 which synchronizes this output by means of the CLK signal. The synchronized output is delivered to the AND gate 9913 which computes AND of this output and the 2-bit frame-sequential signal CNO "0" and CNO "1". The result is supplied to the AND gate 9911. The resultant signal is CNO=2, i.e., a signal which is effective only when the printing is being done in yellow color (see FIG. 66)

Meanwhile, the register 9906 holds a value P1. The data which has been transmitted through the AND gate 9913 is supplied to the AND gate 9911 which computes AND of this data and the value P1, and the pattern obtained as a result is added to the input signal V by means of the adder 9912. The adder 9912 delivers V' which represents the result of addition of the pattern to the input signal V. Therefore, the pattern held by the LUT is repeatedly read and added to the signal V to be output when the signal CN=2 is being obtained, i.e., when the printing is being done in yellow color.

Thus, the pattern added is printed only in yellow color. This is because human eyes generally have small ability of recognition of pattern formed in yellow color.

(Result of Copying)

Figure 58:
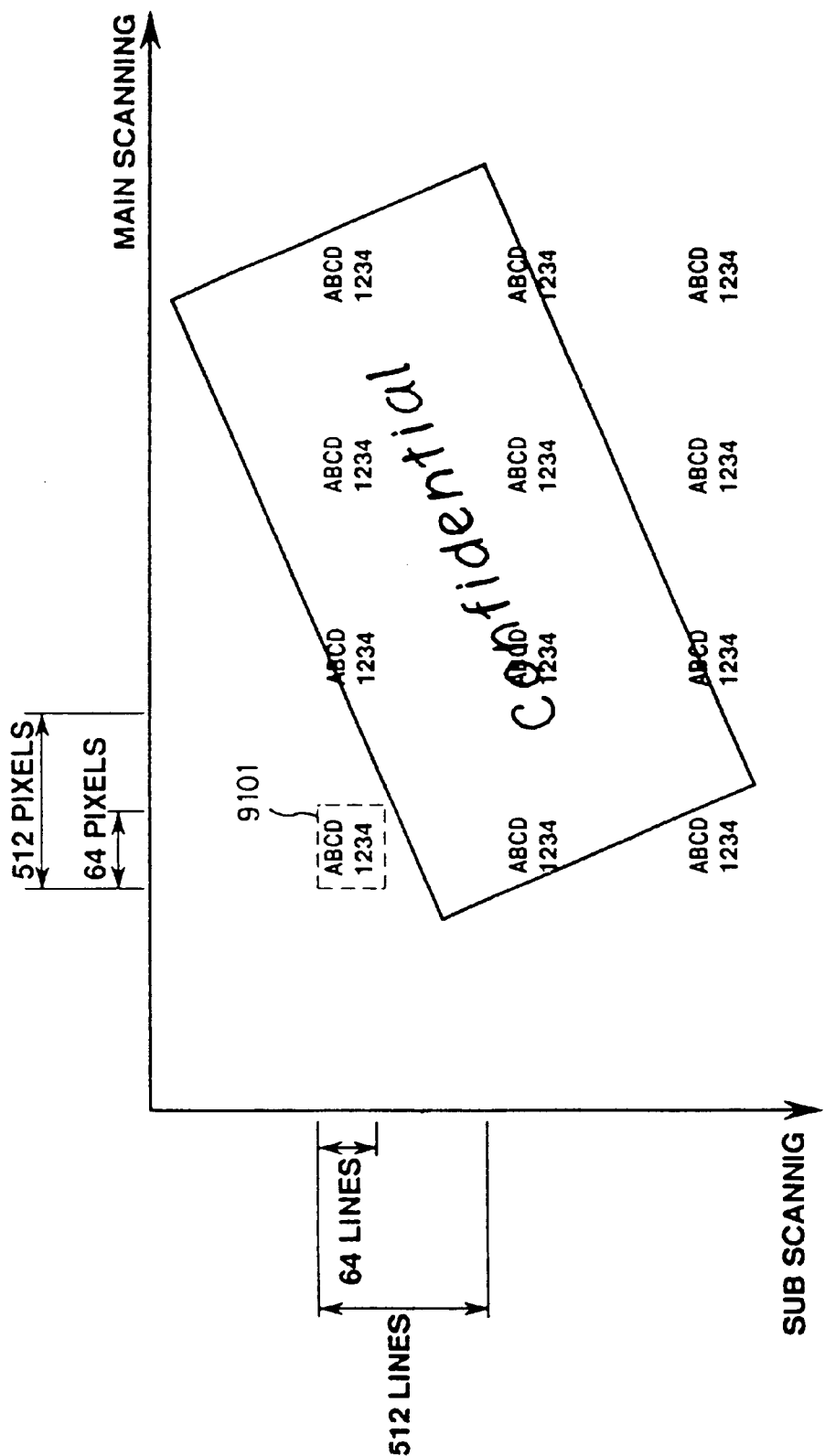
FIG. 58 is an illustration of the result of copying operation performed by the tenth embodiment.

FIG. 58 illustrates an example of the result of the copying operation performed in the eleventh embodiment. In this Figure, the pattern which has been added is denoted by 9101. The content of this pattern has been held in the LUT 9903. In the example shown in FIG. 58, a pattern composed of "ABCD" and "1234" arrayed in the direction of the sub-scan are added by 64-pixels in the direction of main-scan and 64-pixels in the direction of sub-scan. This pattern is placed repeatedly for each 512 pixels in the direction of the main scan and for each 512 sub-scan lines. By forming different patterns for different machines, e.g., in the form of a train of numerals representing the production serial No. or a code representing the serial No., it is possible to identify each machine from the pattern formed on the copy produced by the machine.

The arrangement may be such that the pattern added is made clearer and more distinguishable when there is a large probability that the read image contains the image of one of specific originals which are not to be legally copied.

In this embodiment, the pitch of addition of the pattern is 512 pixels (or lines) in the direction of the main scan. In this embodiment, the resolution is 400 dpi (dots/inch), so that the pattern is added at a pitch of about 32.5 mm. Typical bill issued from the Bank of Japan has a width of about 76 mm. Widths of bills of other major countries also fall within the range between about 60 mm and 120 mm. Consequently, the above-mentioned pattern is printed without fail on any copy of such a bill. Even when the portion of a copy corresponding to the bill is cut out and used for an illegal purpose, it is possible to identify the copying machine used for the production of the copy by reading the added pattern through an examination.

Twelfth Embodiment

A description will now be given of a twelfth embodiment of the present invention.

Figure 59:
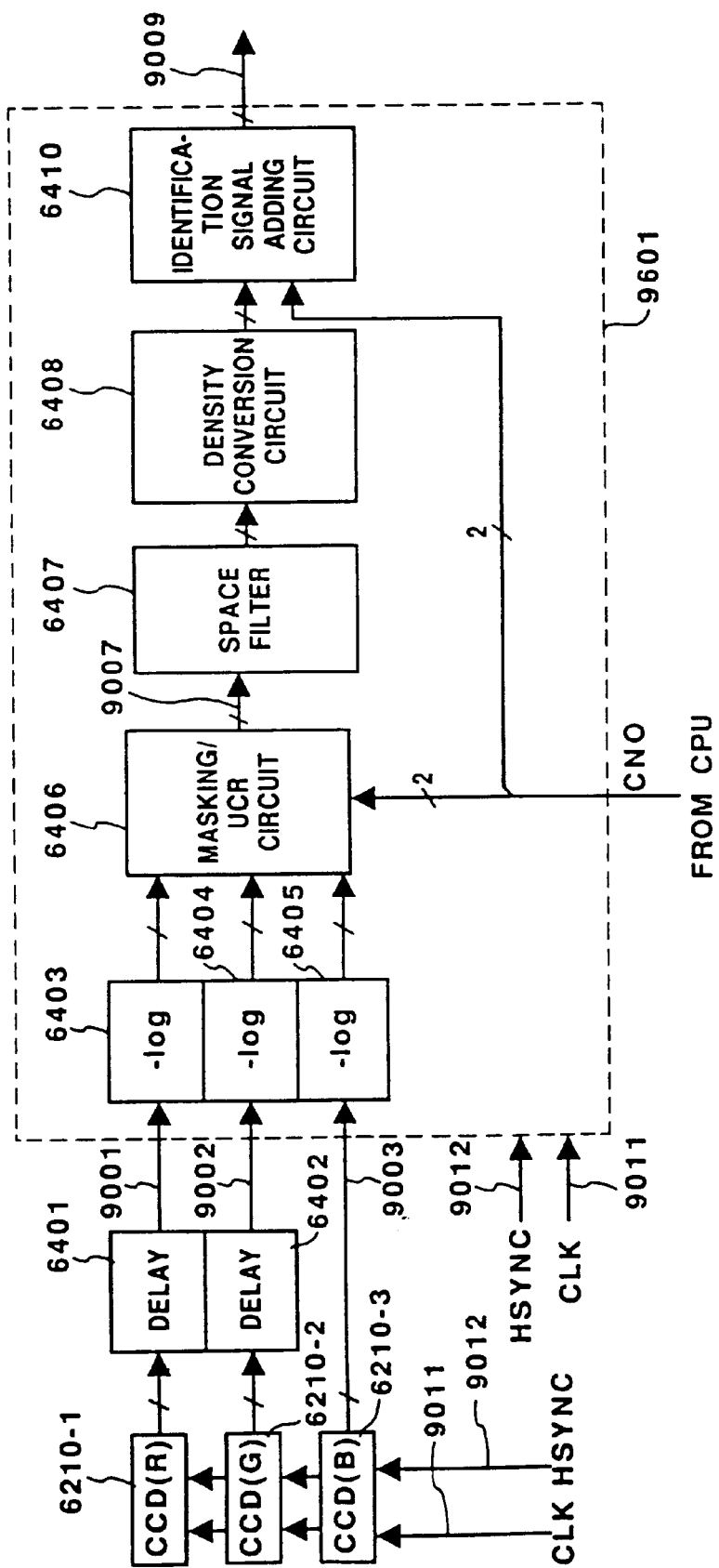
FIG. 59 is a block diagram of an image scanner used in an eleventh embodiment of the present invention.
Figure 60:
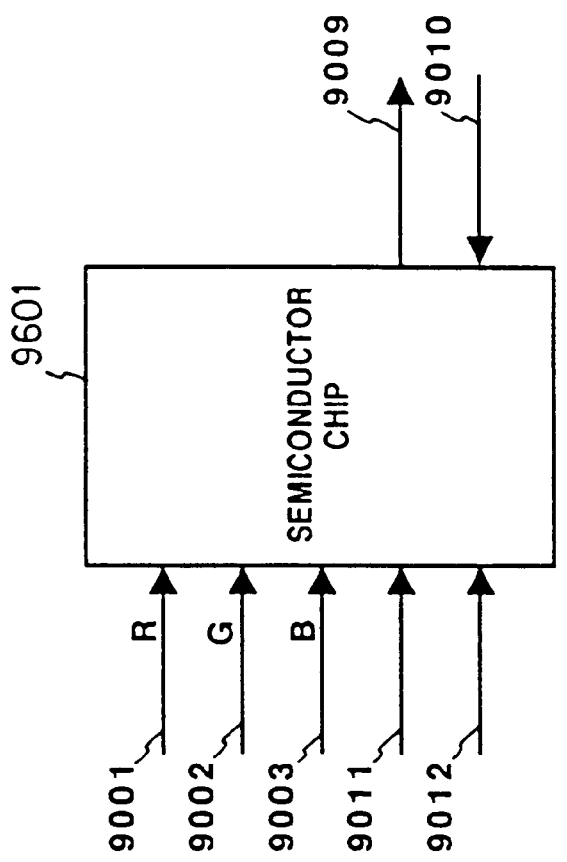
FIG. 60 is a block diagram of a critical portion of the image scanner shown in FIG. 59.

FIG. 59 is a block diagram of an image scanner used in the twelfth embodiment of the present invention. FIG. 60 is a block diagram showing a critical portion of the image scanner shown in FIG. 59.

In the eleventh embodiment described above, the masking/UCR circuit 6406 and the identification signal adding circuit 9410 are constructed on a single semiconductor chip 6420, as shown in FIG. 54.

In contrast, in the twelfth embodiment of the present invention, an image processing circuit for generating image reproduction signals from the input R, G and B signals, including the logarithmic conversion circuits 6403 to 6405, masking/UCR circuit 6406, space filter 6407 and the density conversion circuit 6408, is integrated with an identification signal adding circuit 9410 on a single semiconductor chip 9601. According to this arrangement, it is impossible to isolate the identification signal adding circuit 9410 from the signal processing circuit, so that the machine cannot be used when the identification signal adding circuit has been isolated.

Thirteenth Embodiment

A description will now be given of the thirteenth embodiment of the present invention.

While the eleventh and twelfth embodiments described before employ multi-value printers, the use of such a type of printer s only illustrative and the invention may be carried out by employing a different type of printer such as a binary printer of bubble-jet type.

In the case of a binary printer such as a bubble jet printer, any added information printed in yellow color is easily noticeable and, hence, degrades the quality of the product image. In the thirteenth embodiment, therefore, the identification information is given in the form of a specific pattern formed by binary signals.

Figure 61:
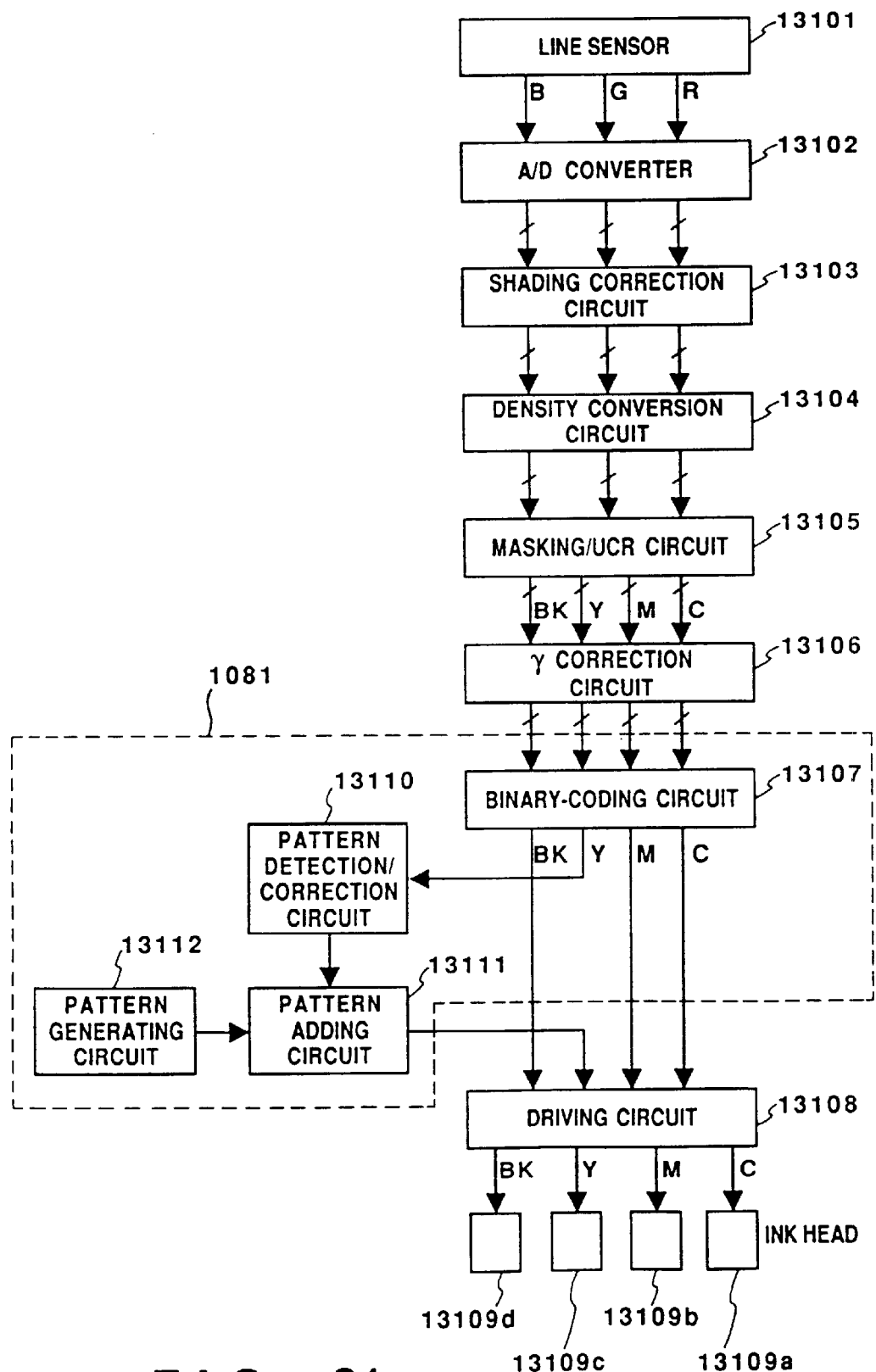
FIG. 61 is a block diagram showing the circuit arrangement of an image processing section of a full-color copying machine which is a twelfth embodiment of the present invention.

FIG. 61 is a block diagram of an image processing circuit incorporated in a full-color copying machine as the thirteenth embodiment. The image processing circuit shown in this Figure includes a line sensor 13101, A/D converter 13102, shading correction circuit 13103, density conversion circuit 13104, masking/UCR circuit 13108, ink heads 13109a, 13109b, 13109c, 13109d, a pattern detection/correction circuit 13110, pattern adding circuit 13111 and a pattern generating circuit 13112.

Figure 62:
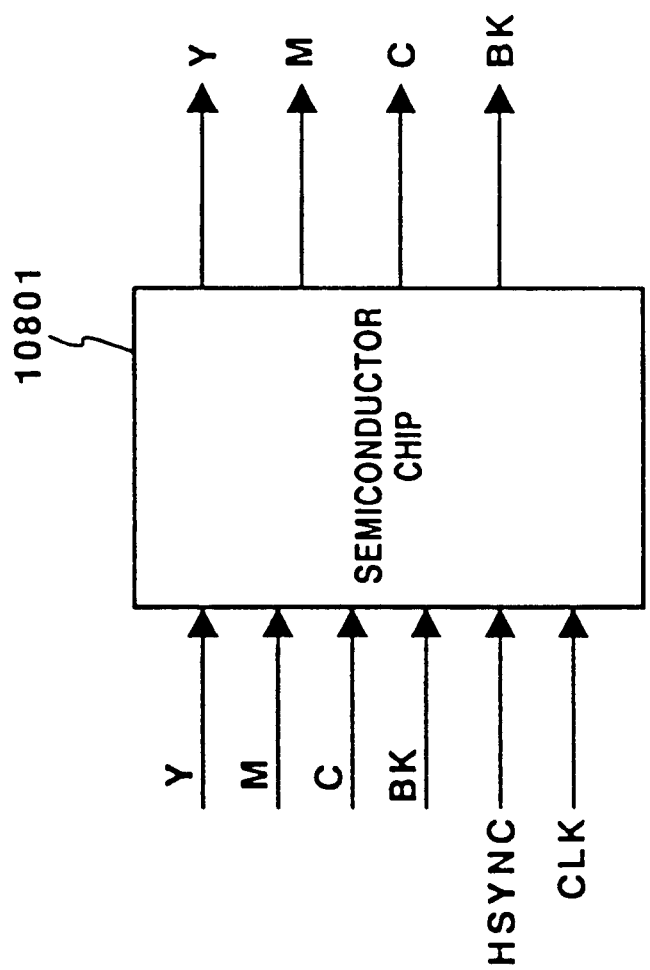
FIG. 62 is a block diagram of an essential portion of the image processing section shown in FIG. 61.
Figure 64A:
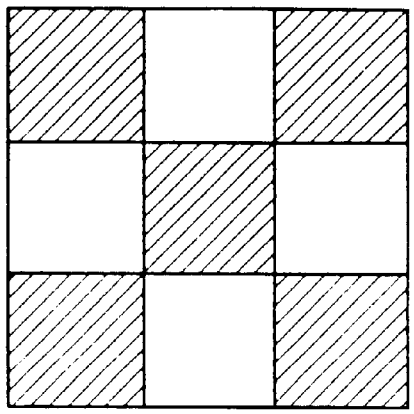
FIGS. 64A–64D are illustrations of an example of a binary pattern used for coding operation performed in the twelfth embodiment.
Figure 64B:
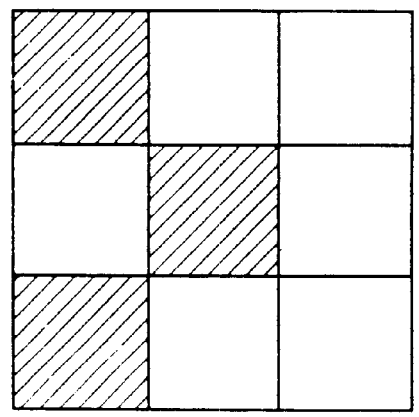
Figure 64C:
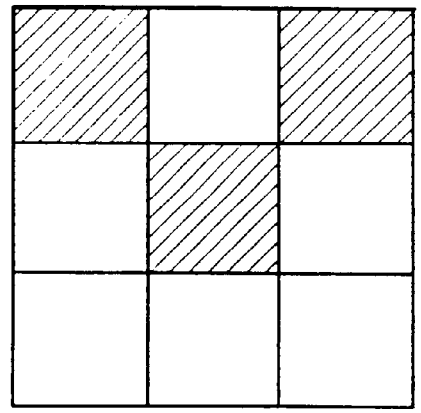
Figure 64D:
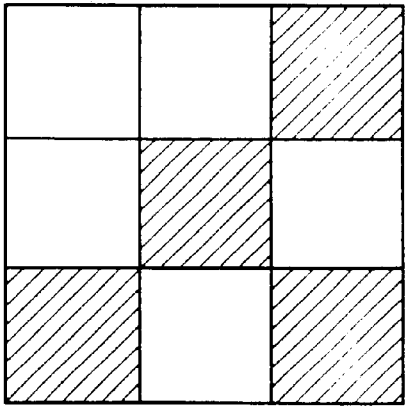

FIG. 62 is a block diagram showing a critical portion of the circuit shown in FIG. 61.

The operation of this embodiment will be described hereinunder.

In operation, an original (not shown) is illuminated by light to reflect the light. The reflected light is converted into color-separated electrical signals red, green and blue (R, G and b) by the line sensor 13101. The arrangement is such that the line sensor 13101 and the original make movement relative to each other in the direction perpendicular to the direction of the scan by the line sensor 13101, whereby the image signal of the entire area of the original is obtained. The analog image signals are converted into digital signals by the A/D converter 13102, and the shading correction circuit 13103 performs correction of any unevenness of light quantity and sensitivity occurring in the direction of the scanning of the line sensor 13101.

The signals after the correction, representing the level of intensity of light,are delivered to the density conversion circuit 13104 so as to be changed into signals representing the levels of density of image. The signals are further converted by the masking/UCR circuit 13105 into signals of cyan (C), magenta (M), yellow (Y) and black (Bk) colors which are the output print colors, with correction of color tastes and removal of undercolor.

Then, the signals are delivered to the gamma correction circuit 13106 which conducts correction of any output non-linearity and are converted into binary data through a quasi-halftone processing performed by the binary circuit 13107. In this embodiment, binary processing is conducted by using known error diffusion method.

Among the biarized image signals, the signals C, M and Bk are delivered to the ink head driving circuit 13108 which drives ink heads 13109 in accordance with these signals so that the ink heads 13109 jets inks onto a recording paper (not shown), whereby an output image is formed.

Meanwhile, the yellow signal (Y) is led from the binarizing circuit 13107 to a pattern detection/correction circuit 13110 which, when there is a specific dot pattern, replaces such a dot pattern with another pattern. The yellow binary signal after the removal of the specific dot pattern is delivered to a pattern adding circuit 13111 which adds an identification information which is peculiar to the apparatus and which is formed by the removed dot pattern. The thus modified yellow signal is then delivered to the ink head driving circuit 13110, whereby a yellow modified image is formed.

A pattern generating circuit 13112 stores identification information peculiar to the apparatus, e.g., the name of the model of the machine and the production serial number of the machine, and operates to encode such identification information by using the dot pattern removed by the dot pattern detection/correction circuit 13110. The thus encoded information is successively output from the circuit 13112.

In this thirteenth embodiment, the circuit denoted by 10801 is constructed by a single semiconductor chip (ASIC chip). This semiconductor chips 10801 receives and outputs signals as shown in FIG. 62.

A description will now be given of the dot pattern detection/correction circuit 13111.

FIG. 63 is a block diagram of the dot pattern detection/correction circuit 13111 used in the thirteenth embodiment. As will be seen from this Figure, the dot pattern detection/correction circuit 13111 has a first-in first-out memories (FIFO) 13201*a*, 13201*b*, D flip-flops 13202*a* to 13202*f*, gate circuits 13203*a* to 13203*d*, NOR gate 13204 and an AND gate 13205.

The operation of this circuit is as follows.

FIGS. 64A, 64B, 64C and 64D show examples of binary pattern which is used for encoding in the thirteenth embodiment.

The input yellow binary signal is line-delayed by the FIFOs 13201*a* and 13201*b* so that data corresponding to three lines is obtained. The three-line data is then subjected to a delaying operation conducted by the D flip-flops 13202*a* to 13202*f* so that the successive line data is delayed on pixel basis, whereby an image signal composed of 9 (3×3) pixels is obtained. The nine output signals from the FIFOs and the flip-flops are delivered to the gate circuits 13202*a* to 13203*d* which determine whether the output data corresponds to the predetermined dot pattern.

When the output data conforms with the predetermined dot pattern, the output of the corresponding gate circuit is changed to "1", so that the output of the NOR circuit is changed to "0". Consequently, the output of the AND gate 13205 is masked, so that the central pixel of the pixel blocks composed of 3×3 pixels is changed into "0", i.e., changed into white dot.

Each of the gate circuits 13202*a* to 13202*d* is a circuit which produces an output "1" upon receipt of a dot pattern such as that shown any one of FIGS. 64A, 64B, 64C and 64D. Thus, the dot pattern detection/correction circuit 13110 performs an operation for changing the black dot of the central pixel into white dot, when a dot pattern shown in any one of FIGS. 64A, 64B, 64C and 64D is received.

Figure 65:
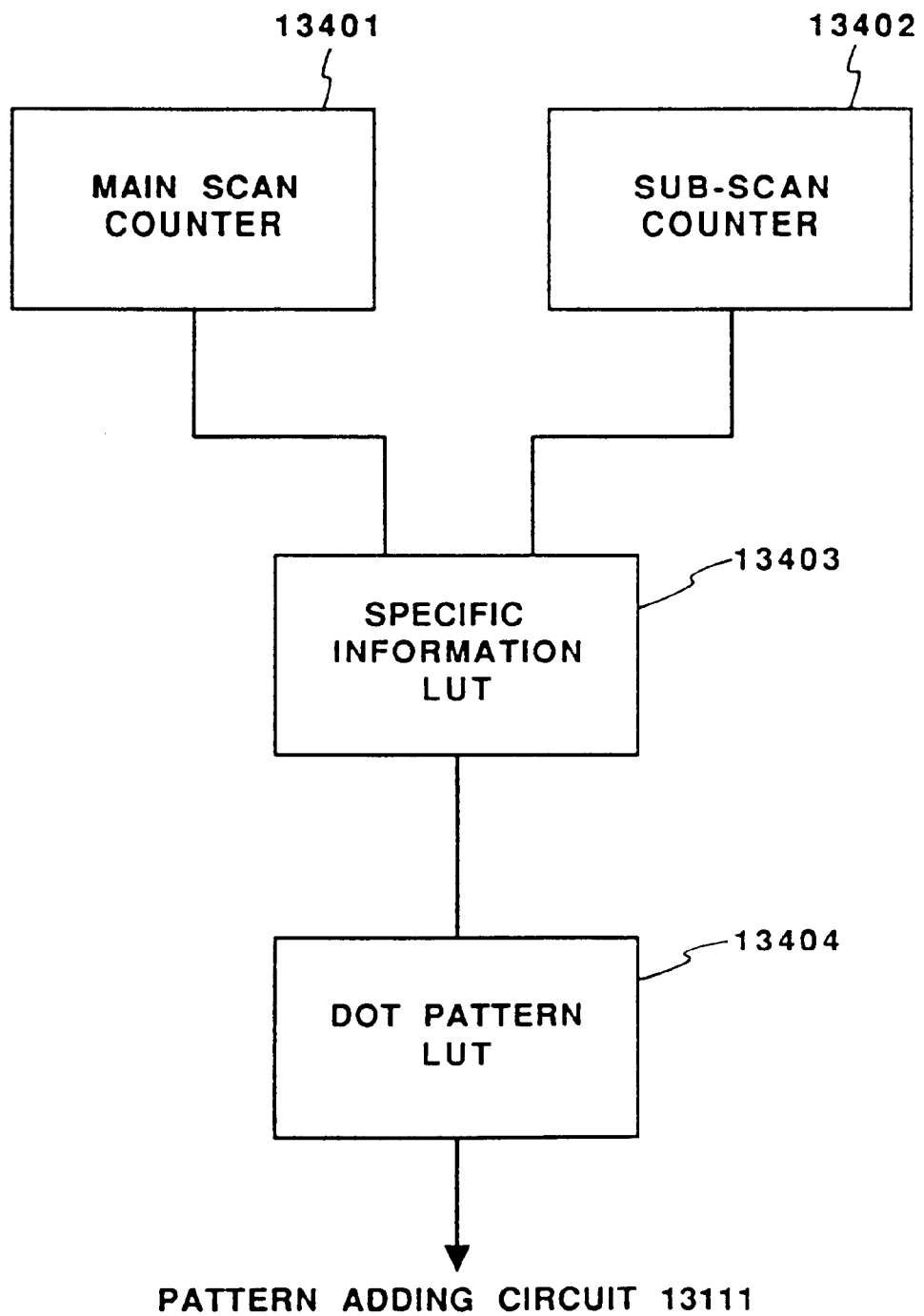
FIG. 65 is a block diagram of an added pattern generation circuit used in the twelfth embodiment.

FIG. 65 is a block diagram showing the construction of the pattern generating circuit 13112 used in the thirteenth embodiment. As will be seen from FIG. 65, this circuit 13112 is composed of a main scan counter 13401, a sub-scan counter 13402, a specific information LUT 13403 storing specific information, and a dot pattern LUT for converting the specific information into a dot pattern. The main scan counter 13401 and the sub-scan counter 13402 perform counting operations in accordance with the clock signals of the main and sub-scan directions, so as to enable a reference to the specific information LUT according to the position on the image. The specific information LUT 13403 stores the serial No. of the full-color copying machine, so that the serial No. can be output repeatedly.

In the full-color copying machine of this embodiment, image signals forming a dot pattern indicating the machine identification information is generated by making reference to the dot pattern LUT 13404 on the basis of the serial No. The dot pattern stored in the dot pattern LUT 13404 is the pattern as shown in one of FIGS. 64A, 64B, 64C and 64 D, which pattern being subjected to a correction performed by the pattern detection/correction circuit 13110.

The output from the pattern generating circuit 13112 is supplied to the pattern adding circuit 13111 which superposes this pattern output on the ordinary image signals, whereby a copy image is formed from the image signals with the pattern added thereto. The output image thus obtained has the identification information in the form of a predetermined dot pattern added to the yellow image data. It is possible to extract the added information by reading the output copy image by a specific reader or by enlarging the image and separating the yellow component. Thus, when thee is no identification information added to the image data, the dot pattern which is to be used for the addition of the information has been completely removed in the pattern detection/correction circuit 13110. Therefore, when a predetermined dot pattern is detected from the image, such dot pattern can be determined as being identification information.

As will be understood from the foregoing description, in the thirteenth embodiment of the present invention, a specific dot pattern used for coding of identification information is removed from the binarized image data, and the predetermined identification information is added by using the removed dot pattern, whereby the identification information is output in a form which is not noticeable to human eyes and which can easily be detected by specific detecting means. It is quite difficult to modify this copying machine in such a manner as to disable only the function for adding the identification information.

The present invention may be applied to a system composed of a plurality of apparatuses and also to a single apparatus. Needless to say, the present invention can ba achieved by supplying programs to the system or the apparatus. The image output function used in the invention may be an ink jet printer, a thermal transfer printer or the like, although a laser beam printer has been specifically mentioned. It is also possible to use, as the image output means, a bubble jet printer which uses a head capable of jetting liquid droplets by the force generated as a result of film boiling caused by the supply of heat energy.

It is also to be noted that the output device used in the invention may be of dot-sequential type, although a frame-sequential type device has been specifically described with reference to FIG. 66.

Furthermore, the present invention can employ, as the input device, various types of information input devices such as a host computer, a video camera, a still video camera, a color film reader or the like, as well as the described image scanner which scans an original by a CCD scanner. Furthermore, the input data may be image data which has been formed by a computer graphics technique.

Although in the foregoing description yellow color is used for printing the added pattern data, the invention does not exclude the use of various other colors such as yellowish green, gray or the like color which is not so noticeable, as well as colors having high luminosity, such as light purple or light green.

The present invention is not limited to the above embodiments and various changes and modifications can be made within the spirit and scope of the present invention. Therefore, to apprise the public of the scope of the present invention the following claims are made.

What is claimed is:

1. An image processing apparatus comprising:
   processing means for processing input image signals;
   first deciding means for deciding similarity between an image represented by the input image signals and an image of a specific original;
   second deciding means for deciding whether said first deciding means is operating properly or not; and
   control means for controlling the apparatus in accordance with the result of the decision made by said second deciding means.

2. An image processing apparatus according to claim 1, wherein said control means controls said processing means in accordance with the decision made by said second deciding means.

3. An image processing apparatus according to claim 1, wherein said control means controls said processing means on the basis of the degree of similarity when the result of decision by said second deciding means is that said first deciding means is operating properly.

4. An image processing apparatus according to claim 1, further comprising output means for outputting image signals processed by said processing means.

5. An image processing apparatus according to claim 4, wherein said output means includes communication means for communicating with an external apparatus through a communication line.

6. An image processing apparatus according to claim 4, wherein said output means is a bubble jet printer.

7. An image processing apparatus comprising:
   input means for inputting image signals;
   deciding means for deciding whether an image represented by the image signal input through said input means contains an image corresponding to a specific original;
   memory means for storing the result of the decision made by said deciding means;
   control means for controlling the apparatus in accordance with the result stored in said memory means; and
   transmitting means for transmitting the result stored in said memory means to an external device.

8. An image processing apparatus according to claim 7, wherein said memory means further stores information representing a type of the specific original.

9. An image processing apparatus according to claim 7, wherein said memory means further stores information identifying the user.

10. An image processing apparatus according to claim 7, wherein said memory means further stores information identifying the input means.

11. An image processing apparatus according to claim 7, wherein said transmitting means is connected to a public telephone line.

12. An image processing apparatus according to claim 7, wherein said transmitting means includes wireless communication means.

13. An image processing apparatus according to claim 7, wherein said transmitting means is connected to a local area network.

14. An image processing method comprising the steps of:
    processing input image signals;
    a first deciding step of deciding similarity between an image represented by the input image signals and an image of a specific original;
    a second deciding step of deciding whether the first deciding step is operating properly or not; and
    controlling the apparatus in accordance with the result of the decision made in said second deciding step.

15. An image processing method according to claim 14, wherein said controlling step controls the processing in said processing step in accordance with the decision made in said second deciding step.

16. An image processing method according to claim 14, wherein said controlling step controls the processing in said processing step on the basis of the degree of similarity when the result of decision in said second deciding step is that said first deciding step is operating properly.

17. An image processing method according to claim 14, further comprising an outputting step for outputting image signals processed in said processing step.

18. An image processing method according to claim 17, wherein said outputting step includes a communication step of communicating with an external apparatus through a communication line.

19. An image processing method according to claim 17, wherein said outputting step outputs images to a bubble jet printer.

20. An image processing method comprising the steps of:
    inputting image signals;
    deciding whether an image represented by the image signal input in said inputting step contains an image corresponding to a specific original;
    storing the result of the decision made in said deciding step;
    controlling an apparatus in accordance with the result stored in said storing step; and
    transmitting the result stored in said storing step to an external device.

21. An image processing method according to claim 20, wherein said storing step further comprises storing information representing a type of the specific original.

22. An image processing method according to claim 20, wherein said storing step further comprises storing information identifying the user.

23. An image processing method according to claim 20, wherein said storing step further comprises storing information identifying the input means.

24. An image processing method according to claim 20, wherein said transmitting step comprises transmitting using a public telephone line.

25. An image processing method according to claim 20, wherein said transmitting step comprises transmitting using a wireless communication.

26. An image processing method according to claim 20, wherein said transmitting step comprises transmitting using a local area network.

* * * * *

UNITED STATES PATENT AND TRADEMARK OFFICE
CERTIFICATE OF CORRECTION

PATENT NO.    : 6,381,030 B1
DATED         : April 30, 2002
INVENTOR(S)   : Yutaka Udagawa et al.

It is certified that error appears in the above-identified patent and that said Letters Patent is hereby corrected as shown below:

Title page,
Item [75], Inventors, "Ken-ich Ohta" should read -- Ken-ichi Ohta --.

Column 4,
Line 37, "art" should read -- part --.

Column 5,
Line 34, "forms" should read -- form --.

Column 8,
Line 18, "f-lens" should read -- f-θ-lens --.

Column 9,
Line 13, "difference" should read -- different --;
Line 20, "Te" should read -- The --; and
Line 21, "man" should read -- main --.

Column 13,
Line 12, "mans" should read -- means --; and
Line 20, "forms a" should be deleted.

Column 14,
Line 18, "lees" should read -- leaves --; and
Line 40, "mans" should read -- means --.

Column 16,
Line 9, "ben" should read -- been --;
Line 33, "of" should read -- is --;
Line 40, "administrate" should read -- administrates --;
Line 45, "control" should read -- controls --; and
Line 52, "very" should read -- every --.

Column 17,
Line 29, "he" should read -- the --.

Column 21,
Line 16, "o" should read -- of --;
Line 37, "copied" should read -- be copied --; and
Line 48, "5005." should read -- 5005, --.

UNITED STATES PATENT AND TRADEMARK OFFICE
CERTIFICATE OF CORRECTION

PATENT NO. : 6,381,030 B1
DATED : April 30, 2002
INVENTOR(S) : Yutaka Udagawa et al.

It is certified that error appears in the above-identified patent and that said Letters Patent is hereby corrected as shown below:

Column 23,
Line 39, "One" should read -- one --.

Figure 46:
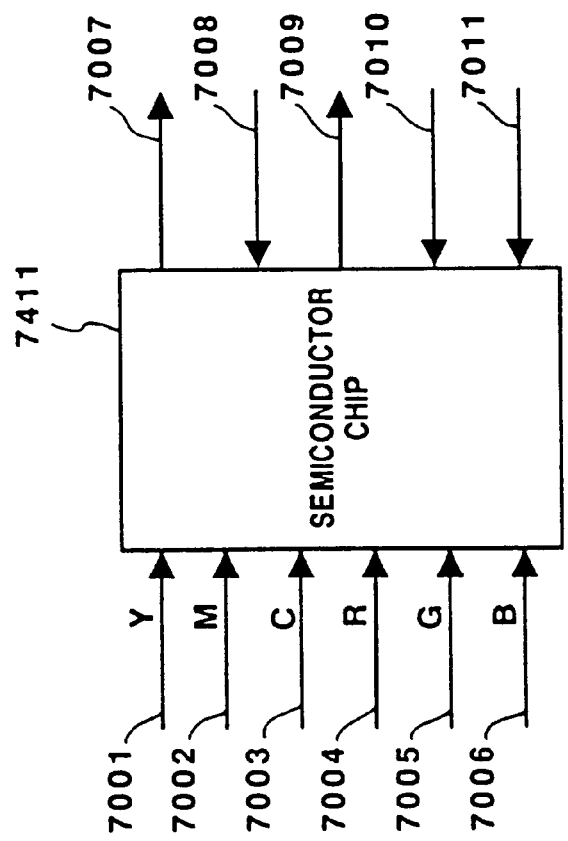
FIG. 46 is a block diagram of an essential portion of the image scanner shown in FIG. 47.

Column 25,
Line 20, "determines" should be deleted;
Line 38, "fro" should read -- for --;
Line 59, "FIG." should read -- FIG. 11. --; and
Line 64, "FIG. 4 6" should read -- FIG. 46 --.

Column 26,
Line 19, "sen" should read -- seen --; and
Line 37, "large" should read -- large as --.

Column 27,
Line 52, "hat" should read -- that --; and
Line 53, "s" should read -- a --.

Column 30,
Line 43, "light,are" should read -- light, are --.

Column 31,
Line 15, "chips" should read -- chip --.

Column 32,
Line 5, "is" should read -- are --;
Line 21, "thee" should read -- these --; and
Line 41, "ba" should read -- be --.

Signed and Sealed this

Twenty-eighth Day of January, 2003

JAMES E. ROGAN
*Director of the United States Patent and Trademark Office*